United States Patent
Mumick et al.

(10) Patent No.: US 12,389,207 B2
(45) Date of Patent: *Aug. 12, 2025

(54) SYSTEM AND METHOD FOR EXPANDED REACH RICH BUSINESS MESSAGING

(71) Applicant: Gupshup Inc., Fremont, CA (US)

(72) Inventors: Inderpal Singh Mumick, Berkeley Heights, NJ (US); Surinder Singh Anand, Highland, NJ (US)

(73) Assignee: GUPSHUP INC., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/589,452

(22) Filed: Feb. 28, 2024

(65) Prior Publication Data

US 2024/0205645 A1 Jun. 20, 2024

Related U.S. Application Data

(63) Continuation of application No. 18/167,837, filed on Feb. 11, 2023, now Pat. No. 11,924,718.

(60) Provisional application No. 63/309,415, filed on Feb. 11, 2022.

(51) Int. Cl.
| | |
|---|---|
| *H04L 29/06* | (2006.01) |
| *H04L 51/02* | (2022.01) |
| *H04L 51/046* | (2022.01) |
| *H04L 51/21* | (2022.01) |
| *H04L 51/23* | (2022.01) |
| *H04L 51/58* | (2022.01) |
| *H04W 4/14* | (2009.01) |
| *H04W 4/21* | (2018.01) |

(52) U.S. Cl.
CPC .............. *H04W 4/14* (2013.01); *H04L 51/046* (2013.01); *H04L 51/23* (2022.05); *H04L 51/58* (2022.05)

(58) Field of Classification Search
CPC .......... H04W 4/14; H04L 51/23; H04L 51/58; H04L 51/046; H04L 29/06; H04L 4/21; H04L 51/02; H04L 51/21
USPC ....................................................... 455/466
See application file for complete search history.

(56) References Cited

U.S. PATENT DOCUMENTS

| | | | | |
|---|---|---|---|---|
| 12,112,321 | B2 * | 10/2024 | Tiwari | G06F 21/57 |
| 12,112,350 | B2 * | 10/2024 | Logvinov | H04N 7/0255 |
| 12,112,582 | B2 * | 10/2024 | Ha | G06Q 40/08 |
| 12,113,930 | B2 * | 10/2024 | Zhao | H04M 15/00 |

(Continued)

*Primary Examiner* — Jude Jean Gilles
(74) *Attorney, Agent, or Firm* — Ashok Tankha

(57) ABSTRACT

A method and a system employing an expanded reach rich messaging application (ERRMA) for creating and transmitting a rich message or an equivalent rich message is provided. The ERRMA receives a request to send a rich message on a specified rich messaging channel (SRMC) to a user's mobile number. The ERRMA determines whether the user's mobile number is enabled for receiving rich messages on the SRMC. Upon a successful determination, the ERRMA creates and transmits the rich message on the SRMC to the user's mobile number. Upon an unsuccessful determination, the ERRMA determines whether the user's mobile number is enabled for receiving the rich message on an alternative rich messaging channel. Upon determining that the user's mobile number is enabled for receiving the rich message on the alternative rich messaging channel, the ERRMA creates and transmits the equivalent rich message on the alternative rich messaging channel to a user device.

9 Claims, 30 Drawing Sheets

(56) References Cited

U.S. PATENT DOCUMENTS

| | | | |
|---|---|---|---|
| 12,113,932 B2* | 10/2024 | Montero | H04M 3/42391 |
| 2020/0387887 A1* | 12/2020 | Rathod | G06Q 20/3224 |
| 2021/0359991 A1* | 11/2021 | Mumick | H04W 12/06 |
| 2021/0383399 A1* | 12/2021 | Hayes, Jr. | G06Q 20/40145 |

* cited by examiner

| Feature | RCS | GBM |
|---|---|---|
| Send Text | Have you travelled to a location in the last 10 days that require you to quarantine when you return to your city/state? | ⊙ Safe Screening<br><br>Have you travelled to a location in the last 10 days that require you to quarantine when you return to your city/state? |
| Rich Card with suggested action | Here is your current usage data overview.<br><br>72/8 GB<br>86%<br>4 days<br><br>Data usage: Jan 13 - Feb 13 cycle<br>You are getting close to using all of your data. More data might help!<br><br>Get more data | New Carrier<br><br>Here is your current usage data overview.<br><br>72/8 GB<br>86%<br>4 days<br><br>Data usage: Jan 13 - Feb 13 cycle<br>You are getting close to using all of your data. More data might help!<br><br>Get more data |

| Feature | RCS | GBM |
|---|---|---|
| Rich Card Carousel With suggested reply | | |
| Suggested Chip list | | |

FIG. 11C

| Feature | RCS | GBM |
|---|---|---|
| | Text | Text |
| | RichCard | RichCard |
| | Carousel | Carousel |
| | Suggested Chiplist | Suggested Chiplist |
| | Suggested Reply | Suggested Reply |
| | Custom Reply | All Custom Replies can be supported in GBM. |
| Suggested Action | Dial a number | Dial action |
| Suggested Action | Open a URL | Open URL action |
| Suggested Action | View a location | Not currently supported in GBM – mapped to Open a URL action to the equivalent location on Google Maps or another Map website. |
| Suggested Action | Share a location | Not currently supported in GBM – mapped to Open a URL action seeking permission from user to share their location. |
| Suggested Action | Create a calendar event | Not currently supported in GBM – mapped to Open a URL action to Google Calendar or another Calendar application. |

Organization Details

Company Name*

United Airlines

Contact Person First Name*

John

Contact Person Last Name*

Doe

Email*

John.doe@united.com

Mobile*

+12512512512

Industry Type*

Travel

Website URL* http://www.united.com

Privacy Policy URL* http://www.united.com/pp

Callback URL http://api.united.com/RichOTP_Feedback

[Edit] [Save]

Expanded Reach Mapping Configuration

Specified Channel

| | |
|---|---|
| Rich Messaging Channel | RCS |
| Entity Name | Dotgo |
| Agent Name | Safe Screening |
| Agent Id | safe-screening@rbm.goog |

Alternative Channel 1

| | |
|---|---|
| Rich Messaging Channel | Google's Business Messages |
| Entity Name | Dotgo |
| Agent Name | Safe Screening |
| Agent Id | 35e5ec04-3d3e-431a-b17a-372e4f809c21 |
| Sender Id for SMS | Mask: SafeScr<br>Code: 783212 |

Alternative Channel 2

| | |
|---|---|
| Rich Messaging Channel | WhatsApp |
| Entity Name | Dotgo |
| Sender Name | Safe Screening |
| Sender Id | 1-912-321-6239 |

Alternative Channel 3

| | |
|---|---|
| Rich Messaging Channel | PWA |
| Entity Name | Dotgo |
| Sender Name | Safe Screening |
| Sender Id for SMS | Mask: SafeScr<br>Code: 783212 |

SYSTEM AND METHOD FOR EXPANDED REACH RICH BUSINESS MESSAGING

CROSS-REFERENCE TO RELATED APPLICATIONS

This application is a continuation application of non-provisional patent application Ser. No. 18/167,837, titled "System And Method For Expanded Reach Rich Business Messaging", filed in the United States Patent and Trademark Office on Feb. 11, 2023, which claims the benefit of the provisional patent application No. 63/309,415, titled "Expanding the Reach of Rich Business Messaging", filed in the United States Patent and Trademark Office on Feb. 11, 2022. The specifications of the above referenced patent applications are incorporated herein by reference in its entirety.

The following patent application is incorporated herein in its entirety: US Nonprovisional patent application titled "A system and method for rich short messaging service", application Ser. No. 17/855,228, filed in the United States Patent and Trademark Office on Jun. 30, 2022.

BACKGROUND

Recent brand outreach methodologies include an entity, that is, a business entity, an enterprise, or an organization identified by or associated with one or more brands engaging in a two-way communication with a user via a rich business messaging channel, for example, a rich communication services (RCS) channel such as the WhatsApp® messaging channel of WhatsApp LLC, the Viber® messaging channel of Viber Media SARL, etc., by sending application-to-person (A2P) messages comprising, for example, one or more of notifications, promotions, transactions, etc., to a mobile number of the user to inform the user about transactions, coupons, promotions, news, updates, emergencies, etc., and also to enable the user to respond back to the entity by sending person-to-application (P2A) messages over the same rich business messaging channel. The reach of rich business messaging channels is large and growing, but it is still limited to a subset of users that the entity wants to target, and is not as widespread as the reach of a short message service (SMS). For example, the RCS channel is enabled for users who have the Android® Messages client of Google LLC on an Android® device and have enabled RCS capability. Similarly, in another example, the WhatsApp® messaging channel is enabled for users who have installed the WhatsApp® client on a smartphone such as an Android® device or an iPhone® Operating System (iOS) device provided by Apple Inc., and have signed in with a valid phone number. In another example, Apple Business Chat (ABC) of Apple Inc., is enabled for iOS users on the iMessage® client of Apple Inc. Similarly, the rich business messaging channel, for example, Google Business Messages (GBM) of Google LLC is enabled for users with an Android® device, and for users who have installed the Google® Maps client of Google LLC on an iOS device. The collective reach of all of these rich business messaging channels is significantly larger than the individual reach of each of these rich business messaging channels. Therefore, there is a long-felt need for a rich messaging service configured to expand the reach of rich business messaging channels.

In general, messages comprising rich elements such as image content, audio content, video content, contacts, other rich media content, etc., and verified sender identities, are referred to as rich messages. These rich messages are sent to a user device using unique application programming interfaces (APIs) designed specific to different rich business messaging channels, for example, rich communication services (RCS), WhatsApp® of WhatsApp LLC, iMessage® of Apple, Inc., Viber® of Viber Media SARL, Telegram® of Telegram FZ-LLC, Facebook® Messenger of Facebook, Inc., Google Business Messages of Google LLC, Signal® Private Messenger of Signal Technology Foundation, etc. However, these APIs are designed for processing and sending rich messages only to users of one specified rich business messaging channel for which they were designed and implemented. Due to the limited reach of each of these individual rich business messaging channels, the entity is unable to send the rich messages to its entire target audience of users. Hence, there is a long-felt need for a method and a system for expanding the reach of rich business messaging by processing rich messages received for one specified rich messaging channel, for example, RCS, creating equivalent rich messages, and automatically sending the created equivalent rich messages to a user device over an alternative rich business messaging channel, for example, Google Business Messages, WhatsApp®, etc., if the user is not available on the one specified rich messaging channel, but is available on the alternative rich business messaging channel.

Moreover, there is a long-felt need for a method and a system for allowing existing applications that support sending of rich messages to one specified rich messaging channel to benefit from a rich messaging service that expands the reach of rich messaging channels by allowing the rich messages to be delivered over other rich messaging channels. Furthermore, rich communication services (RCS) are not supported on the iPhone® and other iOS devices; on legacy Android® devices that do not have Google® Messages or another messaging client that supports RCS; on Android® devices where the Google® Messages client has been installed but has not been selected as the default SMS client; and on Android® devices where RCS chat features have not been launched by the carrier of a subscriber identity module (SIM). On the other hand, the Google Business Messages channel is enabled on a large percentage of the devices that do not support RCS. Furthermore, Google Business Messages supports most of the rich messaging elements supported by RCS, for example, media, standalone rich cards, rich card carousels, suggested replies, suggested actions, chip lists, etc. Hence, there is a long-felt need for a method and a system that allows RCS applications that support sending and receiving of RCS messages to benefit from a rich messaging service that expands the reach of RCS by allowing RCS applications to send and receive RCS messages over the Google Business Messages channel.

SUMMARY OF THE INVENTION

This summary is provided to introduce a selection of concepts in a simplified form that are further disclosed in the detailed description of the invention. This summary is not intended to determine the scope of the claimed subject matter.

The method and the system disclosed herein address the above-recited need for expanding the reach of rich messaging channels. Moreover, the method and the system disclosed herein create and transmit rich messages comprising rich elements, for example, image content, audio content, video content, contacts, rich cards, carousels, interactive buttons, and other rich media content. Furthermore, the method and the system disclosed herein address the above-recited need for enabling processing of messages sent as rich messages for one specified rich messaging channel to create equivalent rich messages and automatically sending the created equivalent rich messages over an alternative rich messaging channel, if the user has access to the alternative rich messaging channel. Furthermore, the method and the system disclosed herein address the above-recited need for enabling existing rich messaging applications that support sending of rich messages to one specified rich messaging channel to benefit from the expanded reach of the rich messaging service by allowing rich messages to be delivered over other rich messaging channels. Furthermore, the method and the system disclosed herein address the above-recited need for allowing Rich Communication Services (RCS) applications that support sending and receiving of RCS messages to benefit from a rich messaging service that expands the reach of RCS by allowing RCS applications to send and receive RCS messages over other rich messaging channels, for example, the Google Business Messages channel.

The method and the system disclosed herein send rich messages on one or more data messaging channels or rich messaging channels, for example, Rich Communication Services (RCS), WhatsApp® of WhatsApp LLC, iMessage® of Apple, Inc., Business Chat® of Apple, Inc., Viber® of Viber Media SARL, Telegram® of Telegram FZ-LLC, Facebook® Messenger of Facebook, Inc., Google Business Messages of Google LLC, Signal® Private Messenger of Signal Technology Foundation, or any other messaging channel that uses data to communicate a message or that support rich messaging features and rich elements comprising, for example, text, media, images, videos, rich cards, rich card carousels, suggested reply buttons, suggested action buttons, and suggested chip lists. A user can select or tap a suggested reply button or a suggested action button to send a response message or to take an action on a user device. A suggested reply allows the user to select or tap on an interactive button displayed on the user device to communicate a response to an entity, for example, a business entity, an enterprise, or an organization identified by or associated with one or more brands. A suggested action allows the user to select or tap on an interactive button to take an action on the user device, for example, make a phone call, open a website, share a location, etc. On the RCS channel, the suggested replies and the suggested actions are sent as part of a suggested chip list, or along with a standalone rich card, or with a rich card as part of a carousel. Other messaging channels also support sending of interactive buttons in the form of suggested replies and suggested actions, though these rich interactive elements may be referred by a different term. For example, on the WhatsApp® instant messaging application, a suggested reply is called a quick reply and a suggested action is called a call-to-action, and on the Facebook® Messenger, a suggested reply is called a quick reply and a suggested action is in the form of a button.

The data messaging channels or the rich messaging channels disclosed above are supported by a data messaging application on the user device, and a data messaging platform such as WhatsApp®, iMessage®, Viber®, etc. Most of these data messaging platforms support business messaging that enable an entity, or a developer on behalf of an entity, or an application on behalf of an entity, to send and receive messages over a data network to and from users of the data messaging applications. Some data messaging platforms such as Signal® do not currently support business messaging but may do so in the future. Some of the rich messaging platforms, for example, Rich Communication Services (RCS), WhatsApp®, iMessage®, Viber®, etc., identify the user by their mobile number. Other rich messaging platforms, for example, Facebook® Messenger, not only allow users to use an identifier other than a mobile number, but also permit users to link a mobile number with their account. Some other rich messaging platforms, for example, Google Business Messages (GBM), provide a channel-specific identifier such as a conversation identifier (ID), to identify a user interacting with an entity, which is not linked to the mobile number of the user. The entity or the developer communicating with the user on rich messaging channels such as GBM need an additional mechanism to link the mobile number with the channel-specific identifier. In an embodiment, a chatbot of the entity may ask the user to provide and validate a mobile number, thereby establishing a mapping between the channel-specific identifier and the user's mobile number. As used herein, "channel" exemplarily refers to a short message service (SMS) channel, an RCS channel, a WhatsApp® messaging channel, the iMessage® messaging channel, the Viber® messaging channel, etc. Also, as used herein, "rich messaging channel", "data messaging channel", "data messaging application", "data messaging platform", and "rich messaging platform", exemplarily refer to RCS, WhatsApp®, iMessage®, Viber®, etc.

The method and the system disclosed herein employ an expanded reach rich messaging application (ERRMA) configured to define computer program instructions executable by at least one processor for creating and transmitting one of a rich message and an equivalent rich message. The rich message comprises one of a text, media, a rich card, a rich card carousel, a suggested reply button, a suggested action button, a suggested chip list, and any combination thereof. The ERRMA receives a request to send a rich message on a specified rich messaging channel from an entity, for example, an agent representing a brand of a product, a service, an organization, an enterprise, etc., also referred to herein as a "sender", to a mobile number of a user. Using the rich message, the entity seeks to engage in a two-way communication with the user. The ERRMA determines whether the user's mobile number is enabled for receiving the rich message on the specified rich messaging channel. Upon successful determination that the user's mobile number is enabled for receiving the rich message on the specified rich messaging channel, the ERRMA creates and transmits the rich message on the specified rich messaging channel to the user's mobile number. Upon determining that the user's mobile number is not enabled for receiving the rich message on the specified rich messaging channel, the ERRMA determines whether the user's mobile number is enabled for receiving the rich message on an alternative rich messaging channel. Upon determining that the user's mobile number is enabled for receiving the rich message on the alternative rich messaging channel, the ERRMA creates and transmits an equivalent rich message on the alternative rich messaging channel to a user device. The user device is addressed by the user's mobile number or an identifier mapped to the user's mobile number.

In an embodiment, the expanded reach rich messaging application (ERRMA) determines whether the user's mobile number is enabled for one of the specified rich messaging channel and the alternative rich messaging channel, based on a status response to an explicit or implicit capability check command for Rich Communication Services (RCS) or to an equivalent command on other rich messaging channels. An explicit capability check is done by sending an RCS capability check command to one or more RCS Messaging as a Platforms (MaaPs) and processing the response to determine if the user's mobile number is enabled for RCS or not, and determine the list of capabilities and features that it supports. An implicit capability check is done by sending the RCS message to the MaaP and processing the response to determine if the message was sent successfully or not. If the message is sent successfully, it implies that the user's mobile number is enabled for RCS and supports the rich features being used in the message. On the other hand, if the mobile number is not enabled for RCS, the MaaP will send back a response indicating that the user's mobile number is not RCS enabled. Using implicit capability check instead of an explicit capability check can help reduce the overall processing by replacing two API requests to the MaaP for RCS enabled mobile numbers (one for capability check and another for sending the message) with a single request. In another embodiment, the ERRMA creates and refers to a local cache to determine whether the user's mobile number is enabled for one of the specified rich messaging channel and the alternative rich messaging channel. In another embodiment, the ERRMA performs one or more of an explicit check, an implicit check, or any combination thereof, depending upon on the features supported by the rich messaging channel(s) to determine whether the user's mobile number is enabled for one of the specified rich messaging channel and the alternative rich messaging channel. The specified rich messaging channel and the alternative rich messaging channel comprise, for example, any one of an RCS channel, an instant messaging channel such as the WhatsApp® messaging channel, iMessage®, Telegram®, Signal®, etc., a business messaging channel such as Google Business Messages, Business Chat®, etc., a social media messaging channel, for example, Facebook® Messenger, Viber®, or any other messaging channel.

In an embodiment, the expanded reach rich messaging application (ERRMA) receives one or more messages from the user's mobile number over the alternative rich messaging channel and sends the message(s) to the entity over the specified rich messaging channel. The message(s) received from the user's mobile number comprises, for example, one or more of a user response to a suggested reply, an indication of the user selecting a suggested action, a text, and a media message composed by the user. In an embodiment, the rich message further comprises one or more of multiple interactive buttons. The interactive buttons comprise, for example, a suggested reply button, a suggested action button, and an entity-specific action button. The ERRMA receives a selection of the suggested reply button or the suggested action button from the user device. The selection of the suggested reply button using a user device of the user allows the user to respond to the entity or send a user response to the entity. The selection of the suggested action button or the entity-specific action button allows the user to execute an action on the user device. In another embodiment, the ERRMA receives a status message from the alternative rich messaging channel and sends the status message to the entity on the specified rich messaging channel. Sending of the status message comprises sending one or more of a delivery receipt and a read receipt to the entity.

In an embodiment, the expanded reach rich messaging application (ERRMA) receives the rich message from a rich message application programming interface (API) for the specified rich messaging channel. The ERRMA identifies whether a recipient of the rich message is active on the specified rich messaging channel or on one or more of multiple alternative rich messaging channels. The ERRMA creates an equivalent rich message if the recipient of the rich message is active on one or more of the alternative rich messaging channels. The ERRMA transmits the created equivalent rich message to a user device of the recipient via one or more of the alternative rich messaging channels. In an embodiment, the ERRMA transmits the rich message as a standard short message service (SMS) message if the recipient of the rich message is identified as inactive on the specified rich messaging channel and one or more of the alternative rich messaging channels. In an embodiment, the ERRMA concurrently sends the created equivalent rich message over multiple rich messaging channels to increase chances of delivery of the created equivalent rich message. The ERRMA revokes the created equivalent rich message from other of the multiple rich messaging channels as soon as the created equivalent rich message is delivered via one of the multiple rich messaging channels. In an embodiment, the ERRMA monitors the delivery of one of the rich message and the equivalent rich message to the user device. In an embodiment, the ERRMA delivers the equivalent rich message to the user device via a second rich messaging channel in case of a failure of the delivery or a delay in the delivery of the rich message to the user's mobile number via a first rich messaging channel. The second rich messaging channel is one of an alternative data messaging channel and an SMS channel. In an embodiment, the ERRMA determines whether the user's mobile number is linked to a business messaging channel-specific identifier, for example, a Google Business Messages channel-specific identifier, and transmits the created equivalent rich message to the business messaging channel-specific identifier.

The one or more of the alternative rich messaging channels are selected based on one or more parameters comprising, for example: size of the rich message; cost of sending the rich message via the specified rich messaging channel and one or more of the alternative rich messaging channels in terms of standard pricing and dynamic pricing based on traffic patterns; history of the recipient in terms of message delivery status, message delivery time, message read status, message read time, and user response; and maintenance of consistency by sending the rich message on a single rich messaging channel instead of switching between multiple rich messaging channels.

In an embodiment, the expanded reach rich messaging application (ERRMA) determines whether the mobile number is enabled for a data messaging application, for example, rich communication services (RCS), WhatsApp®, iMessage®, Viber®, or any other data messaging application configured to support rich messages to be transmitted to the mobile number via RCS, WhatsApp®, iMessage®, Viber®, or any other data messaging application. For some data messaging applications, for example, Facebook® Messenger, that may allow an identifier other than a mobile number, the ERRMA determines whether the user's mobile number is linked to the data messaging application. The user's mobile number receives the rich message transmitted by the ERRMA. The rich message is delivered into a data messaging application, for example, Android® Messages or Samsung® Messages on a user device with a subscriber identity module (SIM) that represents the user's mobile number, or on another data messaging application such as iMessage®, WhatsApp®, Viber®, etc., on the user device where the data messaging application is registered with the user's mobile number.

The methods disclosed above are executed using one or more application programming interfaces (APIs) configured for sending and receiving rich messages over one or more of a rich communication services (RCS) channel, a rich messaging channel, a rich business messaging channel, an instant messaging channel, a business messaging channel, and a social media messaging channel, and one or more protocols configured for sending and receiving the rich messages. The APIs comprise, for example: an RCS Messaging as a Platform (MaaP) Chatbot API specified by Global System for Mobile Communications Association (GSMA) in the official document FNW.11, an RCS Business Messaging (RBM) API specified by Google LLC, WhatsApp® API, Viber® API, Facebook® Messenger API, Google Business Messages API, Apple® Business Chat API, etc. In an embodiment, the API for sending rich messages is a pre-existing API for rich messaging that is already in use. In another embodiment, the API is a new API configured for sending rich messages comprising features that make it easier or efficient to send rich messages on multiple rich messaging channels. For example, a new API for sending rich messages comprises an attribute to select a specific template to use for creating an equivalent rich message from a rich message specified in an API call. Another example of a new API supports a callback method that allows the sender to get notified when a user clicks on a suggested action button. Similarly, in an embodiment, the protocol for sending rich messages is a pre-existing protocol, for example, the GSMA FNW.11, the RCS MaaP Chatbot API, Google RBM API, WhatsApp® Business On-Premise API, WhatsApp® Business Cloud API, Extensible Messaging and Presence Protocol (XMPP), etc., that is already in use for rich messaging. In another embodiment, the protocol for sending rich messages is a new protocol, that allows the sender to be notified when a user clicks on a suggested action button. In an embodiment, the ERRMA provides the rich message to the sender at the same cost or a lower cost as a conventional short message service (SMS) message. In another embodiment, the ERRMA provides the rich messaging on an alternative channel to the sender at a lower cost compared to the cost of the rich messaging channel associated with the API used by the sender to send the rich message. In yet another embodiment, the ERRMA provides the rich messaging on an alternative channel to the sender if there is a delivery failure on the rich channel associated with the API used by the sender to send the rich message.

In an embodiment, the rich message further comprises one or more of suggested replies and suggested actions displayed as interactive buttons on the user device. These interactive buttons enable the user to convey a response to the entity when the user selects, taps, or clicks on the suggested reply button. The interactive buttons also enable the user to take certain actions, for example, calling a number, opening a website, or sharing a location, on the user device when the user clicks on the suggested action button. The ERRMA receives a selection of one of the suggested replies from the user device, or an indication of the user taking an action by clicking on the suggested action button on the user device from the alternative rich messaging channel, for example, the Google Business Messages channel, and informs the entity and/or the developer on the specified rich messaging channel such as the rich communication services (RCS) channel.

In an embodiment, the method disclosed herein employs the expanded reach rich messaging application (ERRMA) for exchanging rich communication services (RCS) messages via an alternative rich business messaging channel, for example, a Google Business Messages channel. In this embodiment, the ERRMA receives a request to send the RCS message on an RCS channel from an entity to a mobile number of a user. The RCS message is created using an application programming interface (API). The ERRMA determines whether the user's mobile number is enabled for receiving the RCS message on the RCS channel. Upon determination that the user's mobile number is not enabled for receiving the RCS message on the RCS channel, the ERRMA determines whether the user's mobile number has exchanged equivalent RCS messages on the alternative rich business messaging channel. Upon successful determination that the user's mobile number has exchanged the equivalent RCS messages on the alternative rich business messaging channel, the ERRMA determines a channel-specific identifier on the alternative rich business messaging channel mapped to the user's mobile number; creates an equivalent RCS message on the alternative rich business messaging channel for the user's mobile number by translating the RCS message into a rich business message; and transmits the created equivalent RCS message on the alternative rich business messaging channel to the channel-specific identifier on the alternative rich business messaging channel mapped to the user's mobile number. Upon determination that the user's mobile number has not exchanged the equivalent RCS messages on the alternative rich business messaging channel, the ERRMA creates an internal identifier configured to securely map to the user's mobile number; creates an equivalent short message service (SMS) message comprising a uniform resource locator (URL) encoded with the internal identifier; transmits the created equivalent SMS message with the URL to the user's mobile number; and exchanges the equivalent RCS messages on the alternative rich business messaging channel upon clicking the URL by the user.

In an embodiment, the expanded reach rich messaging application (ERRMA) transmits subsequent equivalent RCS messages to the mapped rich business messaging identifier on the rich business messaging channel once the URL has been clicked. In an embodiment, a username of the user, a universally unique identifier, and a globally unique identifier are excluded in the URL transmitted to the user's mobile number. In an embodiment, the ERRMA receives a mapping between the user's mobile number and a business messaging channel-specific identifier and stores the mapping for future use. Furthermore, in an embodiment, the ERRMA maintains a mapping of the user's mobile number and the internal identifier used to construct the URL instead of including the user's mobile number in the URL transmitted to the user's mobile number.

In another embodiment, the method disclosed herein employs the expanded reach rich messaging application (ERRMA) for creating and transmitting a rich message as follows. The ERRMA receives a request to send a rich message on a specified rich messaging channel from an entity to a mobile number of a user. The ERRMA determines whether the user's mobile number is enabled for receiving the rich message on the specified rich messaging channel. Upon successful determination that the user's mobile number is enabled for receiving the rich message on the specified rich messaging channel, the ERRMA creates and transmits the rich message on the specified rich messaging channel to the user's mobile number. Upon determination that the user's mobile number is not enabled for receiving the rich message on the specified rich messaging channel, the ERRMA determines whether the user's mobile number has exchanged a rich communication services (RCS) message with the entity on an alternative rich business messaging channel. Upon successful determination that the user's mobile number has exchanged the RCS message with the entity on the alternative rich business messaging channel, the ERRMA determines a rich business messaging channel-specific identifier of the user mapped to the user's mobile number. In an embodiment, a mapping between the user's rich business messaging channel-specific identifier and the user's mobile number already exists in the ERRMA. The ERRMA creates an equivalent rich message on the alternative rich business messaging channel. The ERRMA transmits the created equivalent rich message to the user's mobile number using the rich business messaging channel-specific identifier of the user.

In another embodiment, the method disclosed herein employs the expanded reach rich messaging application (ERRMA) for creating and transmitting a rich message on an alternative rich business messaging channel that uses a mobile number as an identifier for users. The ERRMA receives a request to send a rich message on a specified rich messaging channel from an entity to a mobile number of a user. The ERRMA determines whether the user's mobile number is enabled for receiving the rich message on the specified rich messaging channel. Upon determination that the user's mobile number is not enabled for receiving the rich message on the specified rich messaging channel, the ERRMA creates and transmits a rich message on the alternative rich business messaging channel. In another embodiment, upon determination that the user's mobile number is not enabled for receiving the rich message on the specified rich messaging channel, the ERRMA creates and transmits a rich message on an alternative rich business messaging channel via user's mobile number. For example, if the user's mobile number is enabled for receiving the rich message on WhatsApp®, the ERRMA transmits rich messages to the mobile number via WhatsApp®.

In one or more embodiments, related systems comprise circuitry and/or programming for executing the methods disclosed herein. The circuitry and/or programming comprise one or any combination of hardware, software, and/or firmware configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description of the invention, is better understood when read in conjunction with the appended drawings. For illustrating the embodiments herein, exemplary constructions of the embodiments are shown in the drawings. However, the embodiments herein are not limited to the specific methods and components disclosed herein. The description of a method step or a component referenced by a numeral in a drawing is applicable to the description of that method step or that component shown by that same numeral in any subsequent drawing herein.

FIGS. 11A-11D exemplarily illustrate mapping of features of rich messages sent over a rich communication service (RCS) channel and a Google Business Messages (GBM) channel.

FIGS. 12A-12B exemplarily illustrate screenshots of user interfaces provided by an expanded reach rich messaging application (ERRMA) provider for an expanded reach rich messaging service registration.

DETAILED DESCRIPTION OF THE INVENTION

Various aspects of the disclosure herein are embodied as a system, a method, or a non-transitory, computer-readable storage medium having one or more computer-readable program codes stored thereon. Accordingly, various embodiments of the disclosure herein take the form of an entirely hardware embodiment, an entirely software embodiment comprising, for example, microcode, firmware, software, etc., or an embodiment combining software and hardware aspects that are referred to herein as a "system", a "module", an "engine", a "circuit", or a "unit".

Figure 1A:
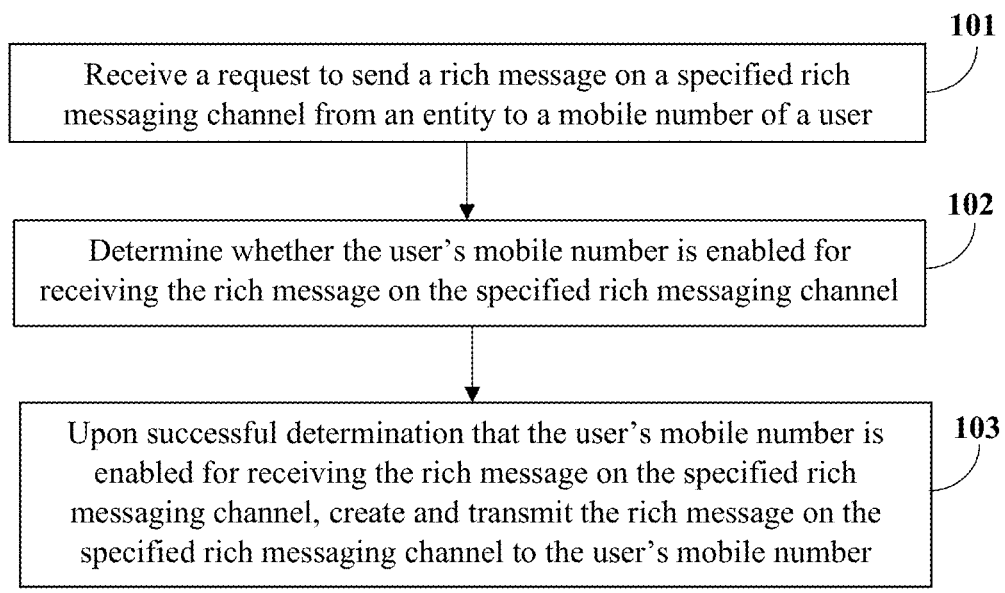
FIG. 1A illustrates a flowchart of an embodiment of a method for creating and transmitting a rich message.

FIG. 1A illustrates a flowchart of an embodiment of a method for creating and transmitting a rich message. As used herein, "rich message" refers to a message that comprises one or more of a text, a media, a rich card, a rich card carousel, and interactive buttons; sent with an entity identity such as a brand identity, and an optional verification mark. The interactive buttons comprise, for example, one or more of a suggested reply button and a suggested action button that a user can click or tap to send a response message or to take an action on a user device. As used herein, the term "user" refers to an individual to whom an entity wants to target rich messages. Also, as used herein, the term "entity" refers to one of a business entity, a company, an enterprise, a division of the enterprise, an entity used by the enterprise, an organization, etc., identified by or associated with one or more brands of products and/or services, and that intends to send a rich message to a user. The term "entity" refers to the name of a business, a company, an enterprise, an organization, etc., that sends the rich message or an equivalent rich message to a user device of the user. The entity is, for example, a for-profit business, a not-for-profit entity, a governmental entity, or a small business. Wherever reference is made to an entity taking or receiving an action, the reference refers to a developer or another person who takes or receives the action on behalf of the entity, or an application that takes or receives the action on behalf of the entity.

The method disclosed herein employs an expanded reach rich messaging application (ERRMA) configured to define computer program instructions executable by at least one processor for creating and transmitting a rich message on a specified rich messaging channel when a mobile number of a user is enabled for the specified rich messaging channel or for creating and transmitting an equivalent rich message on an alternative rich messaging channel to the user device. As used herein, "equivalent rich message" refers to a rich message that is specific to the alternative rich messaging channel. The specified rich messaging channel and the alternative rich messaging channel comprise, for example, any one of a rich communication services (RCS) channel, WhatsApp® messaging channel of WhatsApp LLC, iMessage® of Apple, Inc., Telegram® of Telegram FZ-LLC, Viber® of Viber Media SARL, Signal® of Signal Technology Foundation, Google Business Messages of Google LLC, Business Chat® of Apple, Inc., Facebook® Messenger of Facebook, Inc., or any other messaging channel. The user device is addressed by the user's mobile number or by an identifier mapped to the user's mobile number.

In an embodiment, the expanded reach rich messaging application (ERRMA) is implemented as a web-based platform hosted on a server or a network of servers accessible via a network. In another embodiment, the ERRMA is implemented in a cloud computing environment. As used herein, "cloud computing environment" refers to a processing environment comprising configurable, computing, physical, and logical resources, for example, networks, servers, storage media, virtual machines, applications, services, etc., and data distributed over a network, for example, the internet. The cloud computing environment is one of a private cloud, a public cloud, a hybrid cloud, etc. The cloud computing environment provides an on-demand network access to a shared pool of the configurable computing physical and logical resources. In an embodiment, the ERRMA is a cloud computing-based platform implemented as a service for creating and transmitting a rich message. For example, the ERRMA is configured as a software as a service (SaaS) platform or a cloud-based software as a service (CSaaS) platform that creates and transmits a rich message. In another embodiment, the ERRMA is implemented as a cloud platform service also known as Platform as a Service (PaaS). In another embodiment, the ERRMA is implemented as an on-premise software installed and run on computers on the premises of an organization.

In the method disclosed herein, the ERRMA receives a request 101 to send a rich message on a specified rich messaging channel from an entity to a mobile number of a user. In an embodiment, the rich message comprises one or more of a text, media, a rich card, a rich card carousel, a suggested reply button, a suggested action button, and a suggested chip list as exemplarily illustrated in FIGS. 7A-9C. In another embodiment, the rich message comprises an identity of the entity, herein exemplarily referred to as a "brand identity". The brand identity comprises, for example, one or more of a brand name, a brand icon, and a brand logo of the entity or the brand requesting to transmit the rich message to the user's mobile number as exemplarily illustrated in FIGS. 7A-9C. In an embodiment, a service provider verifies the brand identity. On successful verification of the brand identity, a verification mark, for example, a checkmark, is disposed next to one or more of the brand name, the brand icon, and the brand logo, for indicating that the entity or the brand is verified and can be trusted by the recipient of the rich message. In another embodiment, the rich message comprises images, for example, where a uniform resource locator (URL) link to a webpage is enhanced with an image of the webpage. In another embodiment, the rich message further comprises one or more interactive buttons as exemplarily illustrated in FIG. 7A-9C. The interactive buttons comprise, for example, suggested replies and/or suggested action buttons that a user can select, click, or tap to send a response message and/or take an action on the user device, respectively. The interactive buttons allow the user to convey suggested replies to the entity or to take one or more suggested actions. The user can respond to the entity by selecting one of the suggested replies, or can take an action on the user device by selecting one of the suggested actions. A suggested reply allows the user to select, click, or tap on the interactive button displayed on a graphical user interface (GUI) of a messaging client to communicate a response to the entity as exemplarily illustrated in FIGS. 7A-9C. A suggested action allows user to select, click, or tap on the interactive button to take an action on the device, for example, make a phone call, open a website, share a location, etc. The expanded reach rich message application (ERRMA) receives a selection of one of the suggested replies made by the user by selecting a suggested reply button, or an indication of the user selecting a suggested action by selection of a suggested action button from the user device, and informs the entity and/or the developer.

In the method disclosed herein, the expanded reach rich message application (ERRMA) determines 102 whether the mobile number of the user, that is, the recipient, is enabled for receiving the rich message on the specified rich messaging channel, by one of executing a command, calling an application programming interface (API) method, and searching from a database. The method for determining whether the user's mobile number is enabled on the specified rich messaging channel varies depending on the rich messaging channel. In an embodiment the ERRMA executes a rich communication services (RCS) contacts capability check command for the user's mobile number to determine whether the user's mobile number is enabled for RCS and creates the rich message to be transmitted to the mobile number via RCS. In another embodiment, the mobile number is enabled for RCS, if the user has an RCS-capable client application installed on the user device, which can receive RCS messages sent to the user's mobile number. In another embodiment, the ERRMA executes a WhatsApp® Business API contacts command of the WhatsApp Business Platform On-Premises API to verify whether the user's mobile number belongs to a valid WhatsApp® account and to get the WhatsApp® identifier (ID) for the mobile number in order to send a message. In another embodiment, the ERRMA determines whether the mobile number is enabled for WhatsApp® messages, and creates the rich message to be transmitted to the mobile number via the WhatsApp® messaging channel. The mobile number is enabled for WhatsApp®, if the user has the WhatsApp® application installed on the user device, which can receive WhatsApp® messages sent to the mobile number. Upon successful determination that the user's mobile number is enabled for receiving the rich message on the specified rich messaging channel, the ERRMA creates and transmits 103 the rich message on the specified rich messaging channel to the user's mobile number. In an embodiment, the created rich message is the same message sent to the ERRMA by the entity in its request to send the rich message on the specified rich messaging channel to the user's mobile number.

In an embodiment, the expanded reach rich message application (ERRMA) delivers the rich message to the user device via an alternative rich messaging channel if there is a delivery failure or a delay in the delivery of the rich message to the user device via the specified rich messaging channel. The specified rich messaging channel is, for example, the RCS messaging channel, the WhatsApp® messaging channel, etc., and the alternative rich messaging channel is, for example, Google Business Messages, Facebook® Messenger, RCS, WhatsApp®, or any other messaging channel that uses data to communicate a message or that supports rich messaging features and rich elements comprising, for example, one or more of images, videos, rich cards, carousels, interactive buttons, etc. In an embodiment, the ERRMA transmits rich messages to the mobile number via the specified rich messaging channel. In another embodiment, the ERRMA transmits equivalent rich messages on the alternative rich messaging channel enabled on the user's mobile number or on the identifier that maps to the user's mobile number. In another embodiment, the ERRMA determines whether the user's mobile number is enabled for one or more of multiple rich messaging platforms, that is, data messaging applications, for example, RCS, WhatsApp®, iMessage® of Apple, Inc., Viber® of Viber Media SARL, etc., and determines the type of rich message to be transmitted to the mobile number via the rich messaging platforms for which the mobile number is enabled. The rich message is sent over a data link, for example, a mobile data link or Wi-Fi® of Wi-Fi Alliance Corporation. The rich message is delivered to a user device in the RCS client, the WhatsApp® instant messaging application, or in another data messaging application that is registered with the user's mobile number.

In an embodiment, the expanded reach rich message application (ERRMA) determines whether the user's mobile number is linked to a user profile. The ERRMA transmits the created rich message to the user profile on one or more of multiple rich messaging platforms, for example, Facebook® Messenger, Apple Business Chat®, etc., if the user's mobile number is linked to the user profile. In an embodiment, the user profile is a part of a profile stored by one or more entities comprising, for example, Facebook, Inc., and Apple, Inc. In an embodiment, the ERRMA transmits the created rich message to the user profile on one or more of multiple rich messaging platforms if the user's mobile number is linked to an associated user account. In another embodiment, the ERRMA determines whether the user's mobile number is linked to a chatbot created by the entity or a rich messaging platform, for example, Facebook® Messenger, Apple Business Chat®, etc., where the user has linked their mobile number with their account. The ERRMA transmits the created rich message to the chatbot of the entity on one or more of the rich messaging platforms, for example, Facebook® Messenger, Apple Business Chat®, etc.

In another embodiment, the expanded reach rich message application (ERRMA) determines whether the user's mobile number is linked to a user profile on a rich messaging channel, for example, the Google Business Messages (GBM) channel, and finds the GBM channel-specific identifier (ID) mapped to the mobile number. The ERRMA creates an equivalent rich message on the GBM channel for the mobile number and transmits the created equivalent rich message to the GBM channel-specific ID of the user. In another embodiment, the ERRMA determines whether the user's mobile number is linked to a business messaging channel-specific identifier, for example, the GBM conversation ID, and transmits the created equivalent rich message to the GBM conversation ID of the user.

Figure 7A:
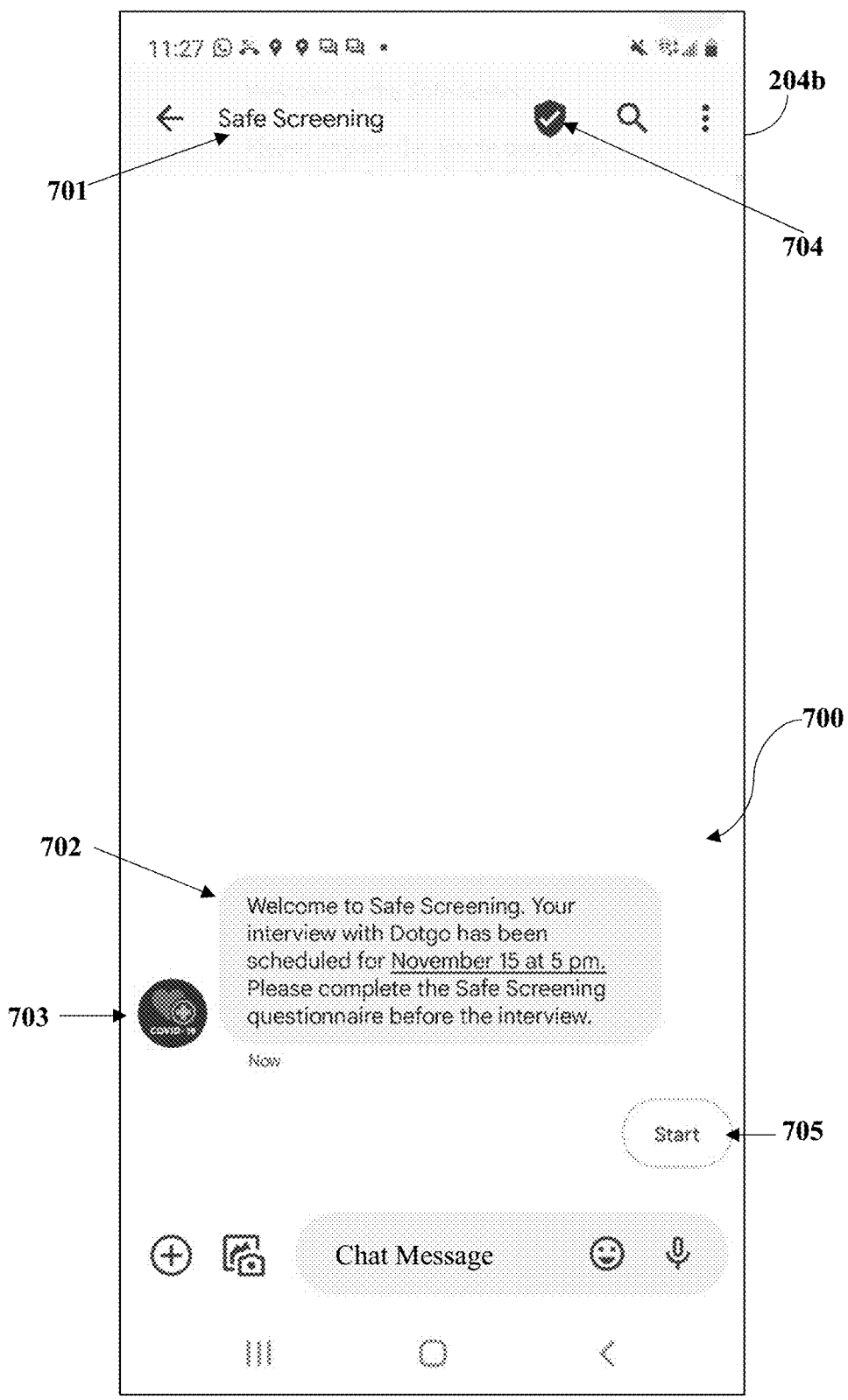
FIG. 7A exemplarily illustrates a screenshot of a graphical user interface rendered by a messaging client on a user device, displaying a rich message received from a verified sender identifier of an entity.

The user device associated with the user's mobile number receives the transmitted rich message as exemplarily illustrated in FIG. 7A. In an embodiment, the user device receives the rich message from a sender identifier (ID), for example, a sender named "Safe Screening", as exemplarily illustrated in FIG. 7A. In another embodiment, the user device receives the rich message from a sender ID of the entity, for example, "RichSMS", "United Airlines", "ALDI", "MMA Connect", "Newark Museum", etc. In another embodiment, if the user is not enabled for rich messaging channels, the expanded reach rich message application (ERRMA) sends a message as a short message service (SMS) message.

The various embodiments of the method disclosed above are executed using one or more of an application program interfaces (APIs) configured for sending and receiving rich messages over a rich communication service (RCS) channel, a rich messaging channel, a rich business messaging channel, an instant messaging channel, a business messaging channel, and a social media messaging channel, and one or more protocols configured for sending and receiving rich messages over the RCS channel, the rich messaging channel, the rich business messaging channel, the instant messaging channel, the business messaging channel, and the social media messaging channel; an API and a protocol configured for sending rich messages over the WhatsApp® channel; an API and a protocol configured for sending rich messages over Google Business Messages, Apple Business Chat®, etc.; an API and a protocol configured for sending rich messages over the Facebook® Messenger channel, the Viber® channel, etc.; and an API or a protocol configured for sending rich messages. In an embodiment, the API for sending rich messages is a pre-existing API for rich messaging that is already in use. In another embodiment, the API is a new API configured for sending rich messages. For example, a new API for sending rich messages comprises an attribute to select a specific template to use for creating a rich message. Another example of a new API supports a callback method that allows the sender to get notified when a user clicks on a suggested action button. Similarly, in an embodiment, the protocol for sending rich messages is a pre-existing protocol, that is already in use for rich messaging. In another embodiment, the protocol for sending rich messages is a new protocol with extensions that allow the entity, that is, the sender, to be notified when a user clicks on a suggested action button. In an embodiment, the expanded reach rich message application (ERRMA) provides the rich message to the entity at the same cost or a lower cost as a conventional short message service (SMS) message.

Figure 1B:
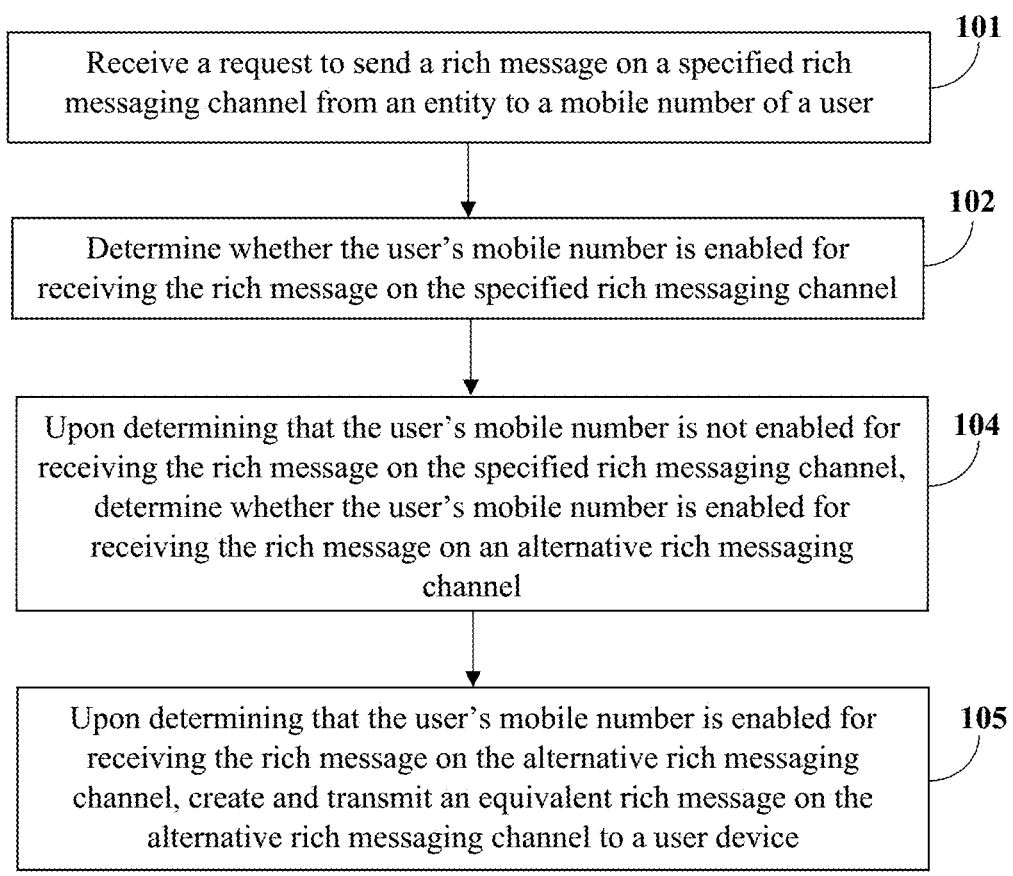
FIG. 1B exemplarily illustrates a flowchart of another embodiment of the method for creating and transmitting a rich message.

FIG. 1B exemplarily illustrates a flowchart of another embodiment of the method for creating and transmitting a rich message. The method disclosed herein employs the expanded reach rich messaging application (ERRMA) for creating and transmitting the rich message. The ERRMA receives 101 a request to send a rich message on a specified rich messaging channel from an entity or a developer on behalf of the entity, to a mobile number of a user. The ERRMA determines 102 whether the user's mobile number is enabled for receiving the rich message on the specified rich messaging channel. Upon determination that the user's mobile number is not enabled for receiving the rich message on the specified rich messaging channel, the ERRMA determines 104 whether the user's mobile number is enabled for receiving the rich message on an alternative rich messaging channel. Upon determination that the user's mobile number is enabled for receiving the rich message on the alternative rich messaging channel, the ERRMA creates and transmits 105 an equivalent rich message on the alternative rich messaging channel to a user device. For example, the ERRMA creates a Google Business Message (GBM) i.e., equivalent rich message, and transmits the GBM message to the user over a GBM channel, i.e., alternative rich messaging channel, if the user's mobile number is not enabled for receiving the rich message on the rich communication services (RCS) channel i.e., specified rich messaging channel, as disclosed in the detailed description of FIG. 4. The user device addressed by the user's mobile number or an identifier mapped to the user's mobile number.

The user device associated with the mobile number receives the transmitted equivalent rich message. In an embodiment, the user device receives the transmitted equivalent rich message from a sender identifier (ID), for example, a sender named "Safe Screening", as exemplarily illustrated in FIG. 7A. In another embodiment, the user receives the equivalent rich message from a sender ID of the entity, for example, "United Airlines", "Walmart", "Pizza Hut", "Joe's Pizza Store", "NJ Department of Health", "Newark Museum", etc. In another embodiment, if the user is not enabled for rich messaging channels, then the expanded reach rich message application (ERRMA) sends a message as a short message service (SMS) message.

Figure 1C:
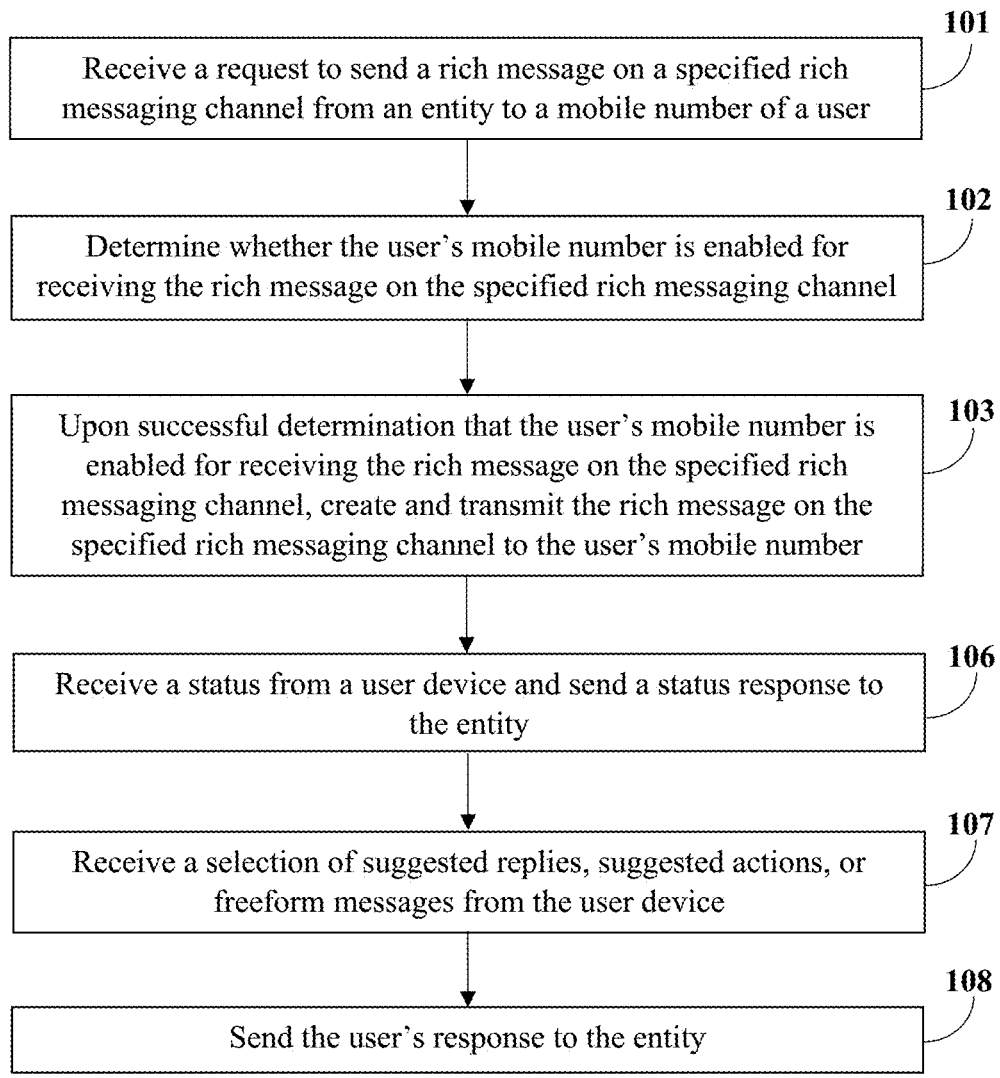
FIG. 1C exemplarily illustrates a flowchart of another embodiment of the method for creating and transmitting a rich message.

FIG. 1C exemplarily illustrates a flowchart of another embodiment of the method for creating and transmitting a rich message. In the method disclosed herein, the expanded reach rich message application (ERRMA) receives a request 101 to send a rich message on a specified rich messaging channel from an entity to a mobile number of a user. The ERRMA determines 102 whether the user's mobile number is enabled for receiving the rich message on the specified rich messaging channel. Upon successful determination that the user's mobile number is enabled for receiving the rich message on the specified rich messaging channel, the ERRMA creates and transmits 103 the rich message on the specified rich messaging channel to the user's mobile number. The ERRMA receives 106 a status from a user device of the user and sends a status response to the entity or a developer on behalf of the entity. The status response indicates one or more of a delivery of the rich message to the user device, that is, a delivery receipt; a timeout without delivery of the rich message; a confirmation of the rich message having been read, that is, a read receipt; the rich messaging channel used to transmit the rich message; an indication that the user's mobile number is not enabled for any of the rich messaging channels, etc. The rich message further comprises one or more interactive buttons as exemplarily illustrated in FIGS. 7A-9C. The interactive buttons comprise, for example, a suggested reply button, a suggested action button, and an entity-specific button, that a user can select, click, or tap to send a response message and/or take an action on the user device. These interactive buttons allow the user to convey a response to the entity when the user selects, taps, or clicks on the suggested reply button, or enable the user to take certain actions, for example, calling a number, opening a website, or sharing a location, on the user device when the user clicks on the suggested action button. A suggested reply allows the user to select, click, or tap on the interactive button displayed on a graphical user interface (GUI) of a messaging client to communicate a response to the entity or allows the user to compose a text or media message to the entity as exemplarily illustrated in FIGS. 7A-9C. A suggested action button and/or an entity-specific button allows the user to select, click, or tap on the interactive button to take an action on the user device, for example, make a phone call, open a website, share a location, etc. The ERRMA receives 107 a selection of one of the suggested replies from the user device, or an indication of the user taking an action by clicking on the suggested action button on the user device, or freeform messages from the user device, and informs the entity and/or the developer. The ERRMA sends 108 the user's response, that is, one of the suggested replies or suggested actions selected by the user, or a text or a media message sent by the user to the entity and/or the developer. In an embodiment, the ERRMA sends the status response and the user's response together to the entity and/or the developer.

Figure 1D:
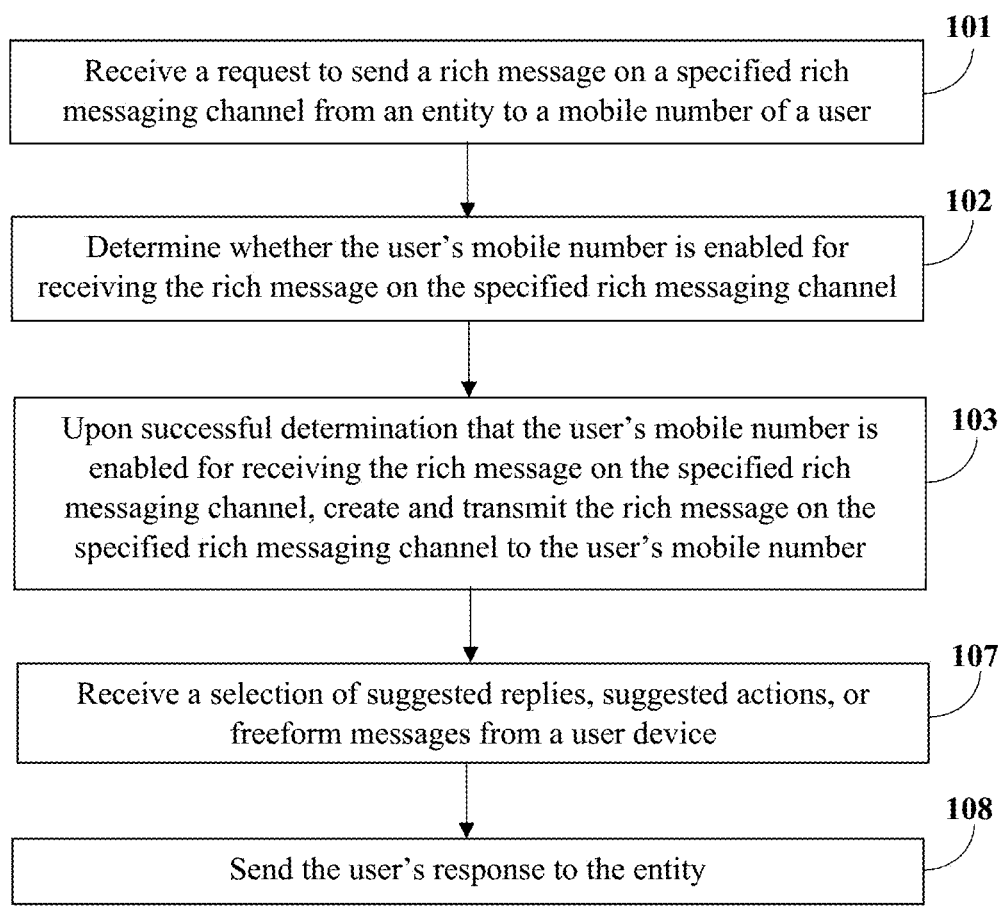
FIG. 1D exemplarily illustrates a flowchart of an embodiment of the method for creating and transmitting a rich message.

FIG. 1D exemplarily illustrates a flowchart of an embodiment of the method for creating and transmitting a rich message. In the method disclosed herein, the expanded reach rich message application (ERRMA) receives a request 101 to send a rich message on a specified rich messaging channel from an entity to a mobile number of a user. The ERRMA determines 102 whether the user's mobile number is enabled for receiving the rich message on the specified rich messaging channel. Upon successful determination that the user's mobile number is enabled for receiving the rich message on the specified rich messaging channel, the ERRMA creates and transmits 103 the rich message on the specified rich messaging channel to the user's mobile number. The rich message further comprises one or more interactive buttons, for example, suggested reply and/or suggested action buttons that a user can select, click, or tap to send a response message and/or take an action on a user device of the user, respectively. The suggested reply button enables the user to convey a response to the entity, and the suggested action button enables the user to take an action suggested by the entity on a user device. The ERRMA receives 107 a selection of one of the suggested replies from the user device, or an indication of the user selecting a suggested action or a freeform message from the user device. The user responds back to the entity and/or the developer, by selecting one of the suggested replies or the suggested actions, or by typing a text message, or by sending a media such as an image, an audio, or a video. The ERRMA sends 108 the user's response, that is, one of the suggested replies or suggested actions selected by the user, or a text, or a media message sent by user to the entity and/or the developer.

Figure 1E:
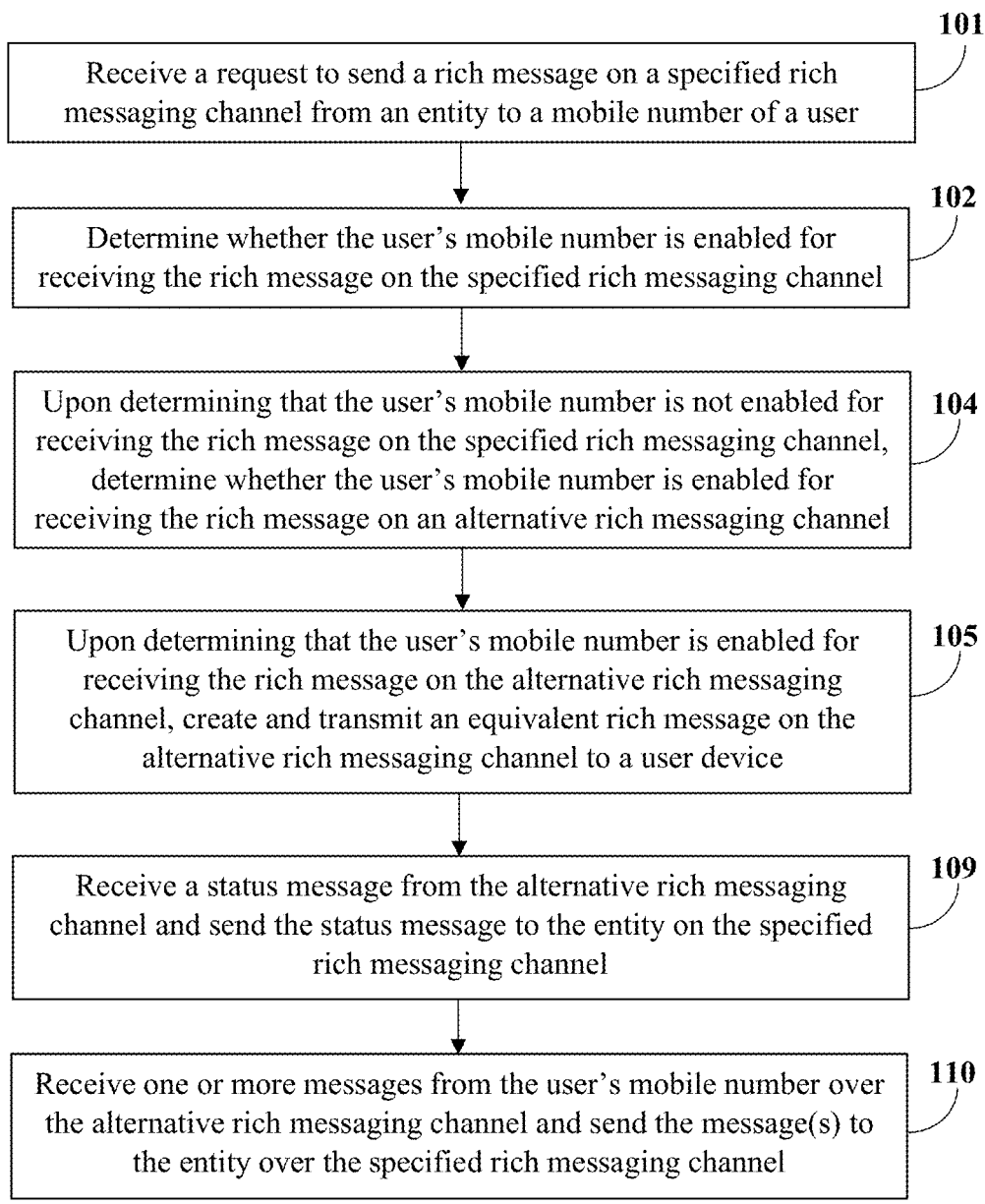
FIG. 1E exemplarily illustrates a flowchart of an embodiment of a method for creating and transmitting an equivalent rich message.

FIG. 1E exemplarily illustrates a flowchart of an embodiment of a method for creating and transmitting an equivalent rich message. In the method disclosed herein, the expanded reach rich message application (ERRMA) receives 101 a request to send a rich message on a specified rich messaging channel from an entity and/or a developer on behalf of the entity, to a mobile number of a user. The ERRMA determines 102 whether the user's mobile number is enabled for receiving the rich message on the specified rich messaging channel. Upon determining that the user's mobile number is not enabled for receiving the rich message on the specified rich messaging channel, the ERRMA determines 104 whether the user's mobile number is enabled for receiving the rich message on an alternative rich messaging channel. Upon determining that the user's mobile number is enabled for receiving the rich message on the alternative rich messaging channel, the ERRMA creates and transmits 105 an equivalent rich message on the alternative rich messaging channel to a user device addressed by one of the user's mobile number and an identifier mapped to the user's mobile number. The ERRMA receives 109 a status message from the alternative rich messaging channel and sends the status message to the entity and/or the developer, on the specified rich messaging channel. Sending the status message comprises sending one or more of a delivery receipt and a read receipt to the entity. The ERRMA receives 110 one or more messages from the user's mobile number over the alternative rich messaging channel and sends the message(s) to the entity over the specified rich messaging channel. The message(s) received from the user's mobile number comprises one or more of a user response to a suggested reply, an indication of the user selecting a suggested action, a text, and a media message composed by the user.

Figure 1F:
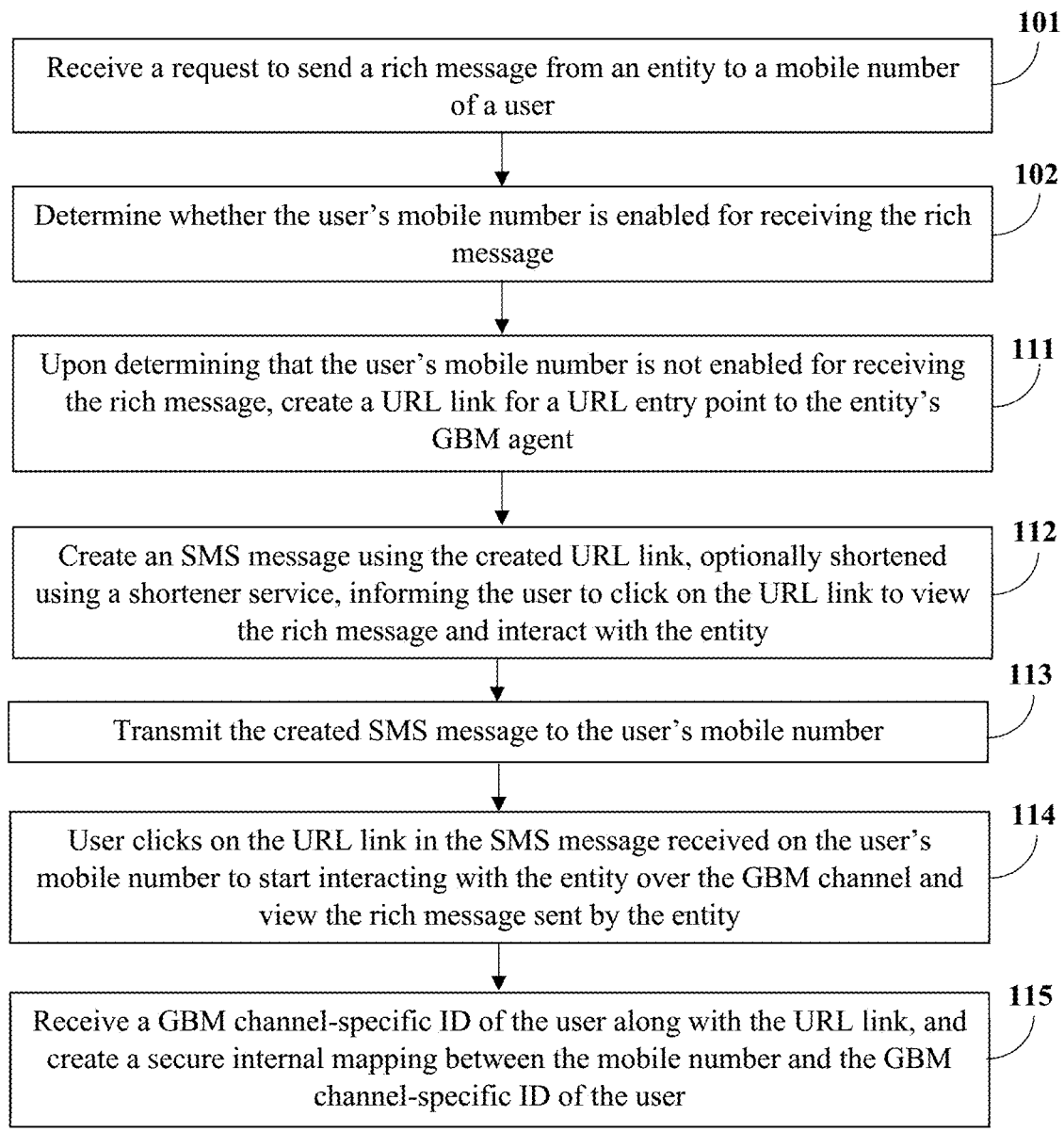
FIG. 1F exemplarily illustrates a flowchart of an embodiment of a method for creating and transmitting a short message service message with an embedded link.

FIG. 1F exemplarily illustrates a flowchart of an embodiment of a method for creating and transmitting a short message service (SMS) message with an embedded link. In the method disclosed herein, the expanded reach rich message application (ERRMA) receives 101 a request to send a rich message from an entity and/or a developer on behalf of the entity, to a mobile number of a user. The ERRMA determines 102 whether the user's mobile number is enabled for receiving the rich message. Upon determining that the user's mobile number is not enabled for receiving the rich message on a specified rich messaging channel, the ERRMA creates 111 a uniform resource locator (URL) link for a URL entry point to the entity's rich business messaging agent, for example, a Google Business Messages (GBM) agent. The ERRMA creates 112 an SMS message using the created URL link, optionally shortened using a shortener service, informing the user to click on the URL link to view the rich message and interact with the entity. The ERRMA transmits 113 the created SMS message to the user's mobile number. The user clicks 114 on the URL link in the SMS message received on the user's mobile number to start interacting with the entity over the GBM channel and view the rich message sent by the entity. The ERRMA receives 115 a GBM channel-specific identifier (ID) of the user along with the URL link, and creates a secure internal mapping between the mobile number and the GBM channel-specific ID of the user. The secure internal mapping prevents the user's mobile number from being included in the URL link and secures the URL link. A URL link must be encoded or encrypted if the URL link contains the user's mobile number in order to ensure the security of the URL link. In order to improve performance, the secure internal mapping is stored in a cache (in memory).

Figure 1G:
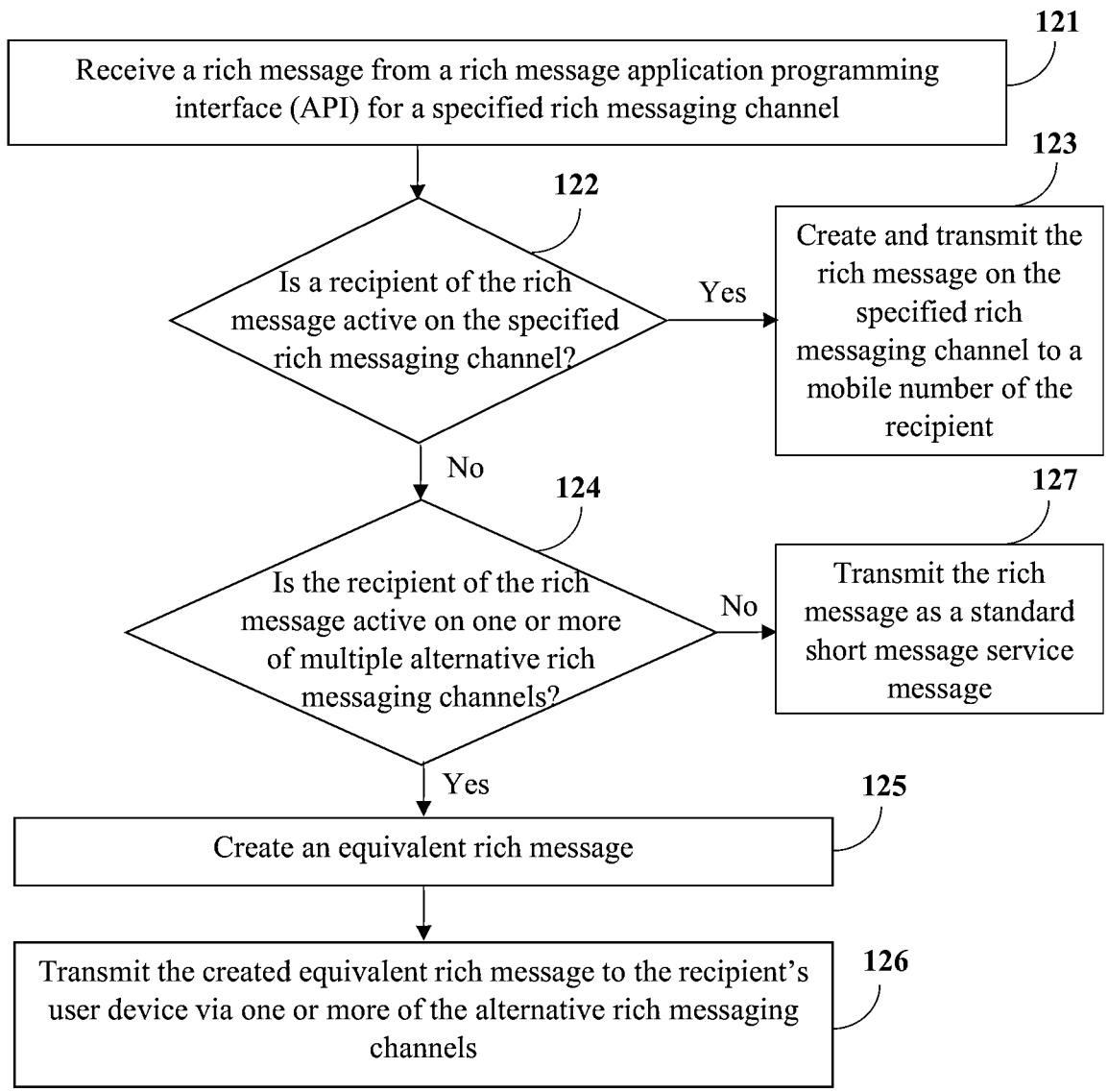
FIG. 1G exemplarily illustrates a flowchart of an embodiment of a method for creating and transmitting a rich message and alternatively an equivalent rich message and a short message service message to a user device.

FIG. 1G exemplarily illustrates a flowchart of an embodiment of a method for creating and transmitting a rich message and alternatively an equivalent rich message and a short message service (SMS) message to a user device. In the method disclosed herein, the expanded reach rich message application (ERRMA) receives 121 the rich message from a rich message application programming interface (API) for a specified rich messaging channel. The ERRMA identifies 122 whether a recipient of the rich message is active on the specified rich messaging channel. If the recipient of the rich message is active on the specified rich messaging channel, the ERRMA creates and transmits 123 the rich message on the specified rich messaging channel to a mobile number of the recipient. If the recipient of the rich message is inactive on the specified rich messaging channel, the ERRMA identifies 124 whether the recipient of the rich message is active on one or more of multiple alternative rich messaging channels. In an embodiment, the ERRMA selects one or more of the alternative rich messaging channels based on one or more parameters comprising, for example, size of the rich message; cost of sending the rich message via the specified rich messaging channel and the alternative rich messaging channel(s) in terms of standard pricing and dynamic pricing based on traffic patterns; history of the recipient in terms of message delivery status, message delivery time, message read status, message read time, and user response; and maintenance of consistency by sending the rich message on a single rich messaging channel instead of switching between multiple rich messaging channels. If the recipient of the rich message is active on the alternative rich messaging channel(s), the ERRMA creates 125 an equivalent rich message for transmission to the alternative rich messaging channel(s). The ERRMA transmits 126 the created equivalent rich message to the recipient's user device via the alternative rich messaging channel(s). If the recipient of the rich message is identified as inactive on the specified rich messaging channel and the alternative rich messaging channel(s), the ERRMA transmits 127 the rich message as a standard short message service (SMS) message. In an embodiment, the ERRMA concurrently sends the created equivalent rich message over multiple rich messaging channels to increase chances of delivery of the created equivalent rich message. In an embodiment, the ERRMA revokes the created equivalent rich message from other rich messaging channels as soon as the created equivalent rich message is delivered via one of the rich messaging channels.

Figure 2:
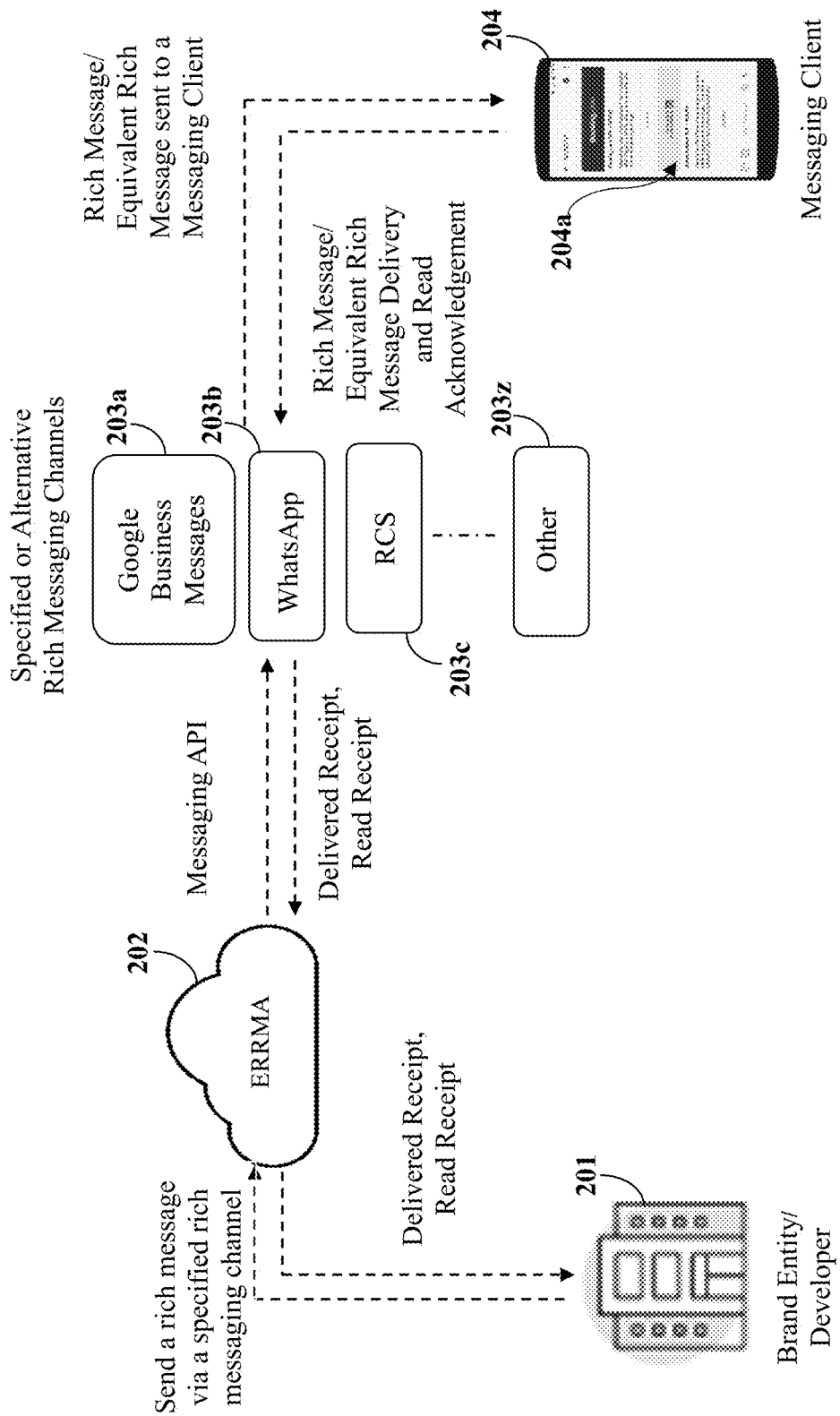
FIG. 2 exemplarily illustrates a schematic showing a process flow of an embodiment of the method for creating and transmitting a rich message triggered by a brand entity or a developer on behalf of the brand entity.

FIG. 2 exemplarily illustrates a schematic showing a process flow of an embodiment of the method for creating and transmitting a rich message triggered by a brand entity or a developer 201 on behalf of the brand entity. For purposes of illustration, an entity that wants to send a rich message to a user is identified by or associated with a brand of the entity or a brand of a product and/or a service of the entity, and is herein exemplarily referred to as a "brand entity". The method disclosed herein is executed using one or more application programing interfaces (APIs) configured for sending and receiving rich messages over one or more of a rich communication services (RCS) channel, an instant messaging channel, a business messaging channel, and a social media messaging channel, and one or more protocols configured for sending and receiving the rich messages. In another embodiment, the method disclosed herein is executed using an API provided to the developer 201 by the expanded reach rich message application (ERRMA) 202. The brand entity/developer 201 accesses the ERRMA 202 to create and transmit a rich message to a mobile number of a user via a specified rich messaging channel, for example, a Google Business Messages (GBM) messaging channel 203a, a WhatsApp® messaging channel 203b, a rich communication services (RCS) channel 203c, or any other rich messaging channel 203z. In an embodiment as exemplarily illustrated in FIG. 2, the ERRMA 202 is configured as a cloud platform implemented as a service, accessible by using the APIs. The brand entity/developer 201 may choose transmission of the rich message from a verified sender identifier (ID), for example, the sender ID "Safe Screening" as exemplarily illustrated in FIG. 7A, without the need to use the brand entity's own sender ID. In an embodiment, one or more brand entities may choose transmission of the rich message from a verified sender ID, for example, "United Airlines", "Walmart", "Pizza Hut", "Joe's Pizza Store", "NJ Department of Health", "Newark Museum", "Rich Message", "Rich Agents", etc., whereas one or more other brand entities may choose transmission of the rich message from another non-verified sender ID, for example, "MMA Connect", "United Airlines", etc. In another embodiment, the brand entity/developer 201 may also choose transmission of the rich message from their own sender ID, for example, using their own brand name.

In another embodiment, the expanded reach rich message application (ERRMA) 202 sends messages on the specified rich messaging channel, for example, the rich communication services (RCS) channel, from the RCS Agent ID/Sender ID chosen by the brand entity/developer 201. Furthermore, in most cases, the brand entity will need to launch an agent on an alternative rich messaging channel, for example, the Google Business Messages (GBM) channel, the WhatsApp® business messaging channel, or the Facebook® Messenger channel, and generate a brand entity-specific Sender ID. In another embodiment, the brand entity's own sender ID is a verified sender ID. In another embodiment, the brand entity's own sender ID is not a verified sender ID. In an embodiment, the sender ID that the ERRMA 202 uses to transmit the rich message is visible to the user, for example, as an alphanumeric string, as a phone number, as a short code, or any combination thereof.

The expanded reach rich message application (ERRMA) 202 receives a request to send a rich message on a specified rich messaging channel, for example, a rich communication services (RCS) channel 203c, from a brand entity/developer 201 to a mobile number of a user, as exemplarily illustrated in FIG. 2. The ERRMA 202 determines whether the user's mobile number is enabled for receiving the rich message on the specified rich messaging channel. Upon successful determination that the user's mobile number is enabled for receiving the rich message on the specified rich messaging channel, the ERRMA 202 creates and transmits the rich message on the specified rich messaging channel, for example, the RCS channel 203c. The ERRMA 202 transmits the created rich message from the sender ID specified by the developer, to the user's mobile number.

Figure 11B:
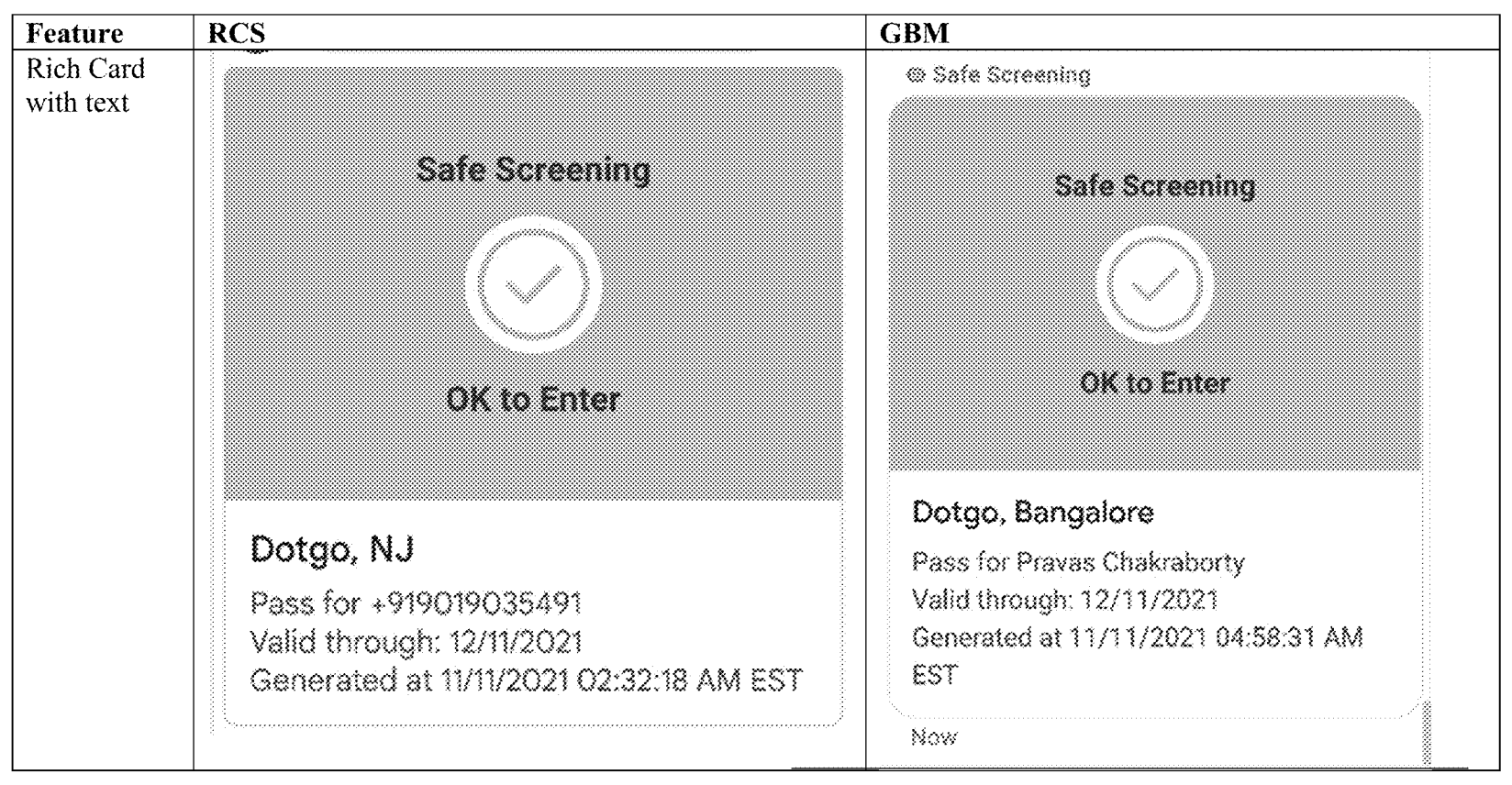

In an embodiment, upon determining that the user's mobile number is not enabled for receiving the rich message on the specified rich messaging channel, the expanded reach rich message application (ERRMA) 202 determines whether the user's mobile number is enabled for receiving the rich message on an alternative rich messaging channel. Upon determining that the user's mobile number is enabled for receiving the rich message on the alternative rich messaging channel, the ERRMA 202 creates and transmits an equivalent rich message on the alternative rich messaging channel, for example, the Google Business Messages (GBM) channel 203a, the WhatsApp® messaging channel 203b, or another rich messaging channel 203z to a user device 204 of the user. The ERRMA 202 determines rich data messaging capabilities of one or more of the messaging channels 203a to 203z for which the user's mobile number is enabled and maps a request for a rich message from the brand entity/developer 201 to messaging channel-specific capabilities, to create and transmit the equivalent rich message to the user's mobile number, as disclosed in detailed description of FIGS. 11A-11D. In order to create the equivalent rich message on the alternative rich messaging channel, ERRMA will take each element of the message in the specified channel, for example, text, rich card, rich card carousel, suggested reply or suggested action in the RCS and find the equivalent messaging element in the alternative messaging channel. For RCS as the specified rich messaging channel and GBM as the alternative rich messaging channel, the mapping of the messaging elements is disclosed in the detailed description of FIGS. 11A-11D. For some of the messaging elements in the specified rich messaging channel, there may not be an exact equivalent messaging element in the alternative rich messaging channel. For example, RCS supports the Suggested Action "Share a Location", but GBM does not have an equivalent Suggested Action. FIG. 11D specifies how ERRMA will map such elements in GBM. The method for determining whether the user's mobile number is enabled on the specified rich messaging channel varies depending on the rich messaging channel, as disclosed in the detailed description of FIG. 1. The ERRMA 202 creates the equivalent rich message on the alternative rich messaging channel enabled on the user's mobile number or on an identifier that maps to the user's mobile number.

The user device 204 is addressed by one of the user's mobile number and an identifier of the user's mobile number. The user device 204 comprises a messaging client 204a installed thereon for receiving messages. In an embodiment, the ERRMA 202 determines whether the user's mobile number is enabled for rich communication services (RCS) and creates the rich message to be transmitted to the user's mobile number via the RCS channel 203c. The RCS channel 203c supports rich elements comprising, for example, a rich card carousel, suggested responses, and a suggested chip list, that are configured to be used to implement interactive buttons for user actions or replies such as copy, confirm, complete transaction, report potential fraud, unauthorized access, did not request, unrecognized transaction, open a website, open a map location, share a location, call a number, or user replies such as Yes or No, select a value from a list of menu options such as a list of symptoms or a list of countries, select a menu option where a user can tap on an interactive button, as exemplarily illustrated in FIGS. 7A-9C. The RCS channel 203c supports these rich elements to allow a user to complete an action without leaving the messaging client 204a or without having to type a reply as in person-to-application (P2A) messaging. In an embodiment, the ERRMA 202 implements one or more interactive buttons for suggested replies and suggested actions, based on details specified in a rich message template by the brand entity or the developer 201 on behalf of the brand entity. If the user's mobile number is not enabled for RCS, the ERRMA 202 creates an equivalent rich message on an alternative rich messaging channel, for example, the Google Business Messages (GBM) channel 203a, enabled on an identifier that maps to the user's mobile number. In this example, the ERRMA 202 transmits the created equivalent rich message on the GBM channel 203a to the identifier mapped to the user's mobile number.

In another embodiment, the expanded reach rich message application (ERRMA) 202 determines whether the user's mobile number is enabled for another alternative rich messaging channel, for example, the WhatsApp® instant messaging channel 203b, hereinafter referred to as "WhatsApp", and creates the equivalent rich message to be transmitted to the user's mobile number via WhatsApp. In an example, messaging channels such as WhatsApp may support delivery of images of the brand entity's logo, but may not support other rich elements to implement interactive buttons that users can click to complete an action. For such messaging channels, the ERRMA 202 sends a menu of options for suggested replies and suggested actions, for example, "send or type 1 to confirm, 2 to report fraud". In another embodiment, the ERRMA 202 determines whether the user's mobile number is enabled for one or more of the alternative rich messaging channels, for example, iMessage®, Viber®, RCS, WhatsApp®, etc., and determines a type of the equivalent rich message to be transmitted to the user's mobile number via the enabled alternative rich messaging channel(s) 203a, 203b, and/or 203z.

The expanded reach rich message application (ERRMA) 202 allows the brand entity/developer 201 to transmit the rich message to the user's mobile number over data, to a data messaging client, for example, a rich communication services (RCS) client, a WhatsApp® client, a Google Business Messages client, an iMessage® client, a Viber® client, etc. The ERRMA 202 sends the rich message over a data link comprising, for example, a mobile data link or a Wi-Fi® data link. The ERRMA 202 delivers the rich message into the messaging client 204a, that is, the data messaging client, on the user device 204 associated with the user's mobile number. The ERRMA 202 monitors the delivery of the rich message or the equivalent rich message to the user device 204. In an embodiment, depending on the preference of the brand entity/developer 201, the ERRMA 202 transmits/delivers the equivalent rich message to the user's mobile number via a second alternative rich messaging channel in case of a delivery failure or a delay in the transmission/delivery of the rich message to the user's mobile number via a first alternative rich messaging channel. In an embodiment, the second alternative rich messaging channel is one of an alternative data messaging channel and a short message service (SMS) channel. In another embodiment, the ERRMA 202 transmits a different equivalent rich message to the user device 204 via a second, third, fourth, etc., alternative rich messaging channel. For example, if the second alternative messaging channel is the WhatsApp® instant messaging channel 203b, the ERRMA 202 creates an equivalent rich message specific to WhatsApp® and transmits the equivalent rich message to the user device 204 via the WhatsApp® instant messaging channel 203b. Similarly, if the third alternative messaging channel is the Google Business Messages (GBM) channel 203a, the ERRMA 202 creates an equivalent rich message specific to GBM and transmits the equivalent rich message to the user device 204 via the GBM channel 203a. In another embodiment, the ERRMA 202 transmits the rich message to the user device 204 via more than one alternative rich messaging channel(s) to increase the reliability of delivery of the rich message. The additional rich messaging channels comprise, for example, short message service (SMS) channels and alternative data messaging channels that permit rich messages. In an embodiment, the ERRMA 202 revokes the rich message from the first alternative rich messaging channel(s) before transmitting the rich message via the second alternative rich messaging channel.

In an embodiment, the routing logic of the expanded reach rich message application (ERRMA) 202 comprises determining whether the user identified by the mobile number is available on one or more alternative rich messaging channels, for example, WhatsApp®, Viber®, RCS, etc. The ERRMA 202 selects one or more of the alternative rich messaging channels based on one or more of multiple parameters comprising, for example: size of the rich message; cost of sending the rich message via one or more of the alternative rich messaging channels based on standard pricing as well as dynamic pricing based on traffic patterns; history of the recipient in terms of message delivery status and time, message read status and time, and user response; and maintaining consistency by sending the rich message on a single rich messaging channel instead of switching between multiple rich messaging channels. In an embodiment, the ERRMA 202 sends the rich message concurrently over multiple alternative rich messaging channels that are enabled to increase chances of delivery of the rich message. Furthermore, the ERRMA 202 revokes the rich message from all other alternative rich messaging channels that are enabled as soon as the rich message is delivered via one of the alternative rich messaging channels.

Furthermore, in an embodiment, the expanded reach rich message application (ERRMA) 202 determines the developer's preference in terms of the order of the rich messaging channel to be used to transmit the rich message, and the user's availability on one or more rich messaging channels. Furthermore, in an embodiment, the ERRMA 202 enhances the rich message through one or more of multiple automatic enhancements comprising, for example, replacing uniform resource locator (URL) links with one or more of an image, a video, and other rich media; and automatically adding interactive buttons to convey suggested replies or suggested actions to the rich message based on content of the rich message. For example, (1) in case of a one-time-password (OTP), the ERRMA 202 adds a suggested action of Copy to the rich message; (2) in case of a message with a URL, the ERRMA 202 adds a suggested action to open a website, to the rich message; and (3) based on content, the ERRMA 202 adds a suggested action to open a map location, share a location, select a menu option, etc. The creation of the rich message, therefore, comprises addition of the automatic enhancements to the message received from the brand entity/developer 201.

After transmitting the created rich message or the created equivalent rich message to the user's mobile number, the expanded reach rich message application (ERRMA) 202 receives an acknowledgement of the rich message or the equivalent rich message being delivered to the messaging client 204a on the user device 204. In an embodiment, the ERRMA 202 receives a read receipt indicating that the rich message has been read or seen by the user. The ERRMA 202 transmits the read receipt indicating that the message has been read by the user to the brand entity or the developer 201 on behalf of the brand entity. The ERRMA 202 transmits, for example, a delivery receipt, that is, an acknowledgement regarding delivery of the rich message or the equivalent rich message to the user device 204; and a read receipt, that is, an acknowledgement that the rich message or the equivalent rich message was read by the user, to the brand entity or the developer 201 on behalf of the brand entity. If the equivalent rich message is transmitted to the user's mobile number via an alternative rich messaging channel, the ERRMA sends the delivery receipt status and the read receipt status received on the alternative rich messaging channel to the brand entity or the developer on behalf of the brand entity 201 on the specified rich messaging channel on which the ERRMA 202 received a request to send the rich message to the user's mobile number. In an embodiment, the ERRMA 202 transmits the delivery receipt, that is, an acknowledgement regarding delivery of the rich message or the equivalent rich message; and the read receipt by invoking a callback uniform resource locator (URL) specified in the rich message template by the brand entity or the developer 201 on behalf of the brand entity, along with required parameter(s), as relevant.

Furthermore, where interactive buttons to convey one or more of suggested replies and suggested actions are provided in the rich message, the expanded reach rich messaging application (ERRMA) 202 receives an acknowledgement regarding selection of one of the options from the user device 204 over the alternative rich messaging channel. The ERRMA 202 conveys the received selection of one of the suggested replies and the suggested actions from the user device 204 to the brand entity/developer 201 over the specified rich messaging channel. In an embodiment, the ERRMA 202 receives messages from the user device 204 over the alternative rich messaging channel and sends the messages to the brand entity/developer 201 over the specified rich messaging channel. The messages received from the user device 204 comprise, for example, one or more of a user response to a suggested reply, an indication of user selecting a suggested action, a text or a media message composed by the user.

Figure 3:
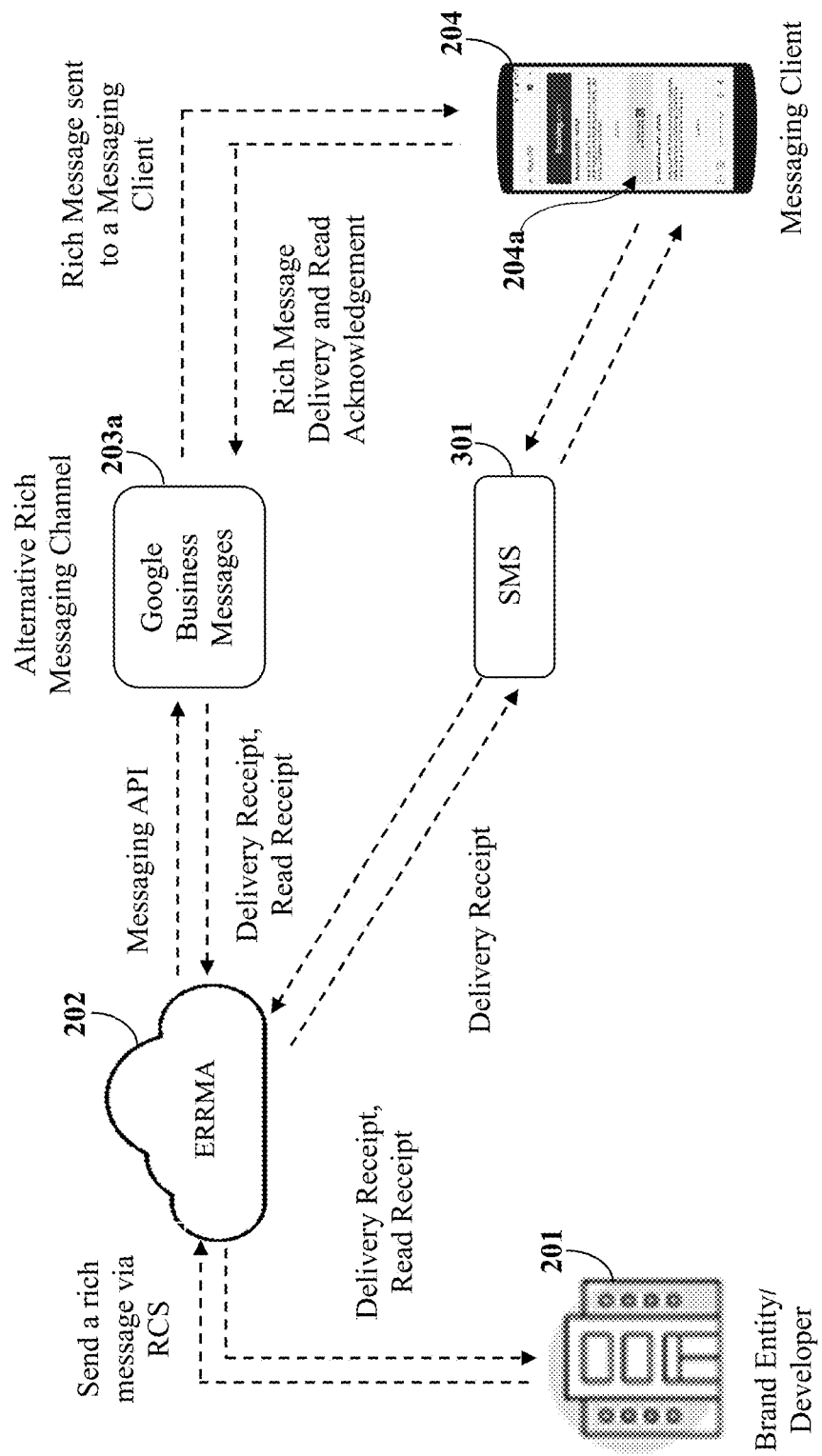
FIG. 3 exemplarily illustrates a schematic showing a process flow of an embodiment of the method for creating and transmitting a rich message by a brand entity and/or a developer on behalf of the brand entity, when a specified rich messaging channel is a rich communication services channel, and an alternative rich messaging channel is a Google Business Messages channel.

FIG. 3 exemplarily illustrates a schematic showing a process flow of an embodiment of the method for creating and transmitting a rich message by an entity, herein exemplarily referred to as a "brand entity", and/or a developer 201 on behalf of the brand entity, when a specified rich messaging channel is a rich communication services (RCS) channel, and an alternative rich messaging channel is a Google Business Messages (GBM) channel. The brand entity/developer 201 accesses the expanded reach rich message application (ERRMA) 202 to create and transmit a rich message to a mobile number of a user via the RCS channel. The ERRMA 202 receives a request to send a rich message to the user's mobile number via the specified rich messaging channel, that is, the RCS channel, from the brand entity/developer 201 as exemplarily illustrated in FIG. 3. The ERRMA 202 determines whether the user's mobile number is enabled for receiving the rich message on the RCS channel. Upon successful determination that the user's mobile number is RCS-enabled, the ERRMA 202 creates and transmits the rich message on the RCS channel to the user's mobile number. The rich message is delivered into a messaging client 204a, that is, a data messaging application, on a user device 204 associated with the user's mobile number. The ERRMA 202 monitors the delivery of the rich message to the user's mobile number.

Upon determining that the user's mobile number is not enabled for receiving the rich message on the rich communication services (RCS) channel, the expanded reach rich message application (ERRMA) 202 creates an equivalent rich message on an alternative rich messaging channel, for example, the Google Business Messages (GBM) channel 203a, enabled on one of the user's mobile number and an identifier that maps to the user's mobile number. The ERRMA 202 transmits the created equivalent rich message on the GBM channel 203a to the user's mobile number or the identifier that maps to the user's mobile number.

Figure 10:
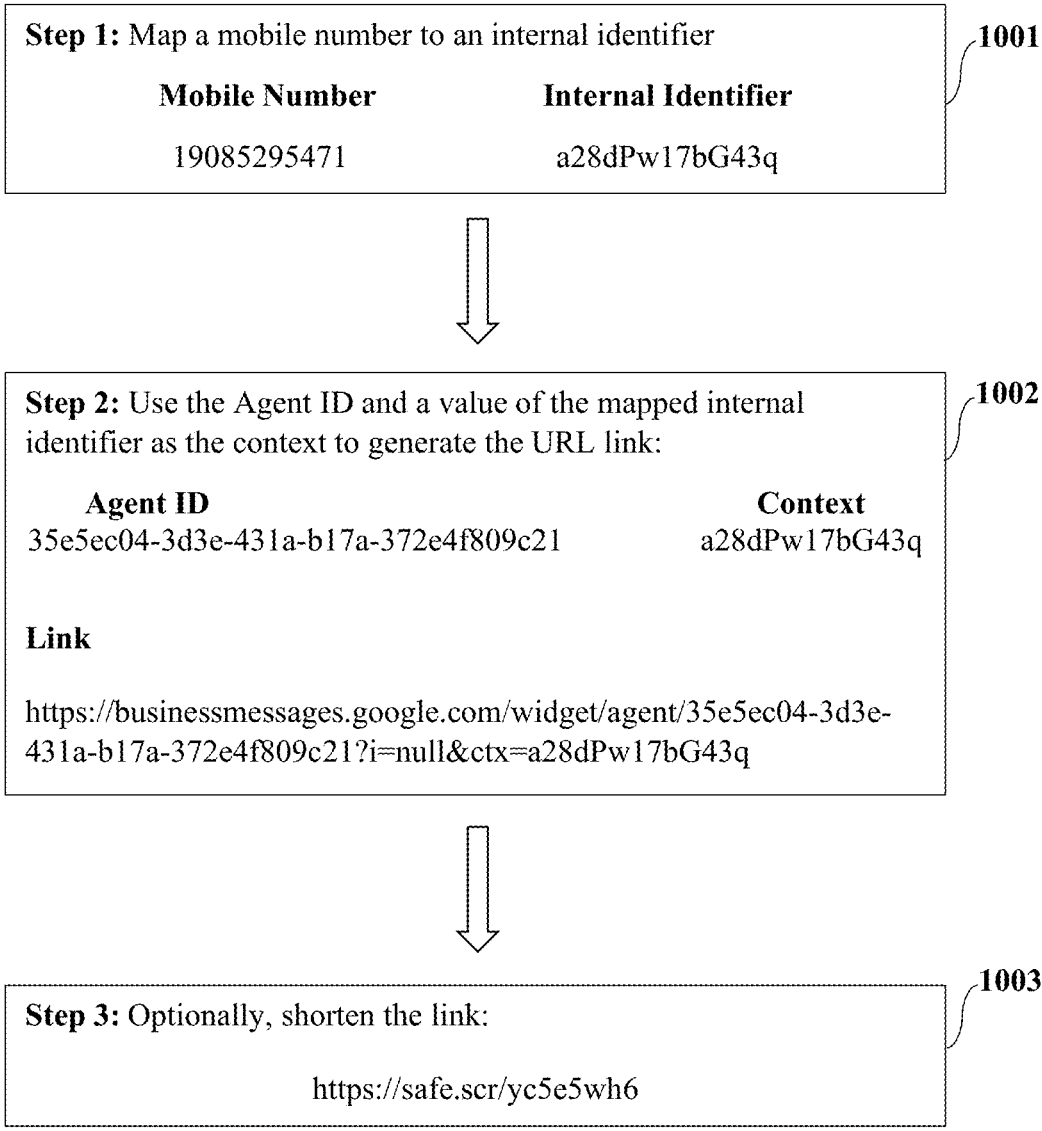
FIG. 10 exemplarily illustrates a flowchart of an embodiment of a method for generating a uniform resource locator (URL) for allowing an exchange of equivalent rich communication services messages on a rich business messaging channel.

Upon determining that the user's mobile number has not previously exchanged the equivalent rich communication services (RCS) message on the Google Business Messages (GBM) channel 203a, the expanded reach rich messaging application (ERRMA) 202 creates a uniform resource locator (URL) link, as exemplarily illustrated in FIG. 10, for a URL entry point to the brand entity's GBM agent with the user's mobile number as the custom context value. In an embodiment, the ERRMA 202 creates and transmits an equivalent short message service (SMS) message with the URL link via an SMS channel 301 to the user's mobile number. For example, the ERRMA 202 creates an SMS message using the generated URL link, optionally shortened using a shortener service, informing the user to click on the URL link to view the rich message and interact with the brand entity. Upon receiving the SMS message on the user device 204, the user clicks on the URL link to exchange rich messages with the brand entity. The user clicks on the URL link in the SMS message received on the user's mobile number to start interacting with a chatbot or an application of the brand entity that exchanges messages with user using an RCS APIs, but user is able to exchange the rich messages with the brand entity on the GBM channel 203a. After transmitting the created SMS message to the user's mobile number, the ERRMA 202 receives an acknowledgement regarding delivery of the SMS message to the user device 204. The ERRMA 202 transmits a delivery receipt to the brand entity as an acknowledgement regarding delivery of the SMS message to the user device 204.

Figure 4:
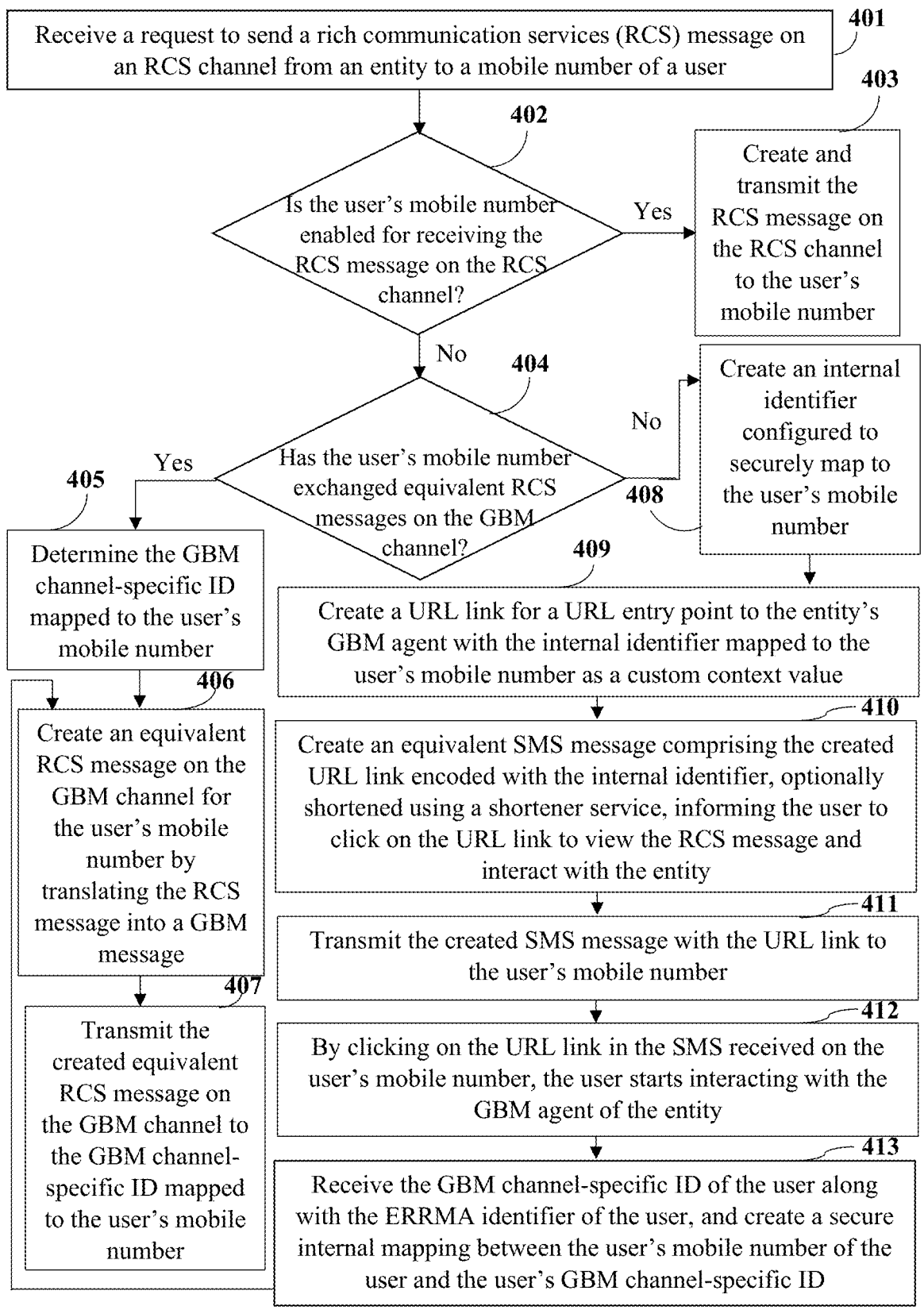
FIG. 4 exemplarily illustrates a flowchart of an embodiment of a method for exchanging rich communication services messages via a rich business messaging channel, for example, a Google Business Messages channel.

FIG. 4 exemplarily illustrates a flowchart of an embodiment of a method for exchanging rich communication services (RCS) messages via a rich business messaging channel, for example, a Google Business Messages (GBM) channel. The method disclosed herein and FIG. 4 illustrates one embodiment of the process flow for one pair of a specified rich messaging channel, that is, the RCS messaging channel, and an alternative rich messaging channel, that is, the GBM channel. The similar process flow is applicable for other different pairs of the specified rich messaging channel and the alternative rich messaging channel. The method employs the expanded reach rich messaging application (ERRMA) for managing actions associated with creating and transmitting an equivalent RCS message on the GBM channel. The ERRMA receives 401 a request to send the RCS message on an RCS channel from an entity to a mobile number of a user. The RCS message is created using an application programming interface (API). The ERRMA determines 402 whether the user's mobile number is enabled for receiving the RCS message on the RCS channel. Upon successful determination that the user is enabled for receiving the RCS message on the RCS channel, the ERRMA creates and transmits 403 the RCS message on RCS channel to the user's mobile number. Upon determining that the user's mobile number is not enabled for receiving the RCS message on the RCS channel, the ERRMA determines 404 whether the user's mobile number has previously exchanged equivalent RCS messages with the entity on the GBM channel. Upon successfully determining that the user's mobile number has previously exchanged equivalent RCS messages with the entity on the GBM channel, the ERRMA determines or finds 405 the GBM channel-specific identifier (ID), for example, a conversation ID, mapped to the user's mobile number. The ERRMA creates 406 an equivalent RCS message on the GBM channel for the user's mobile number by translating the RCS message into a GBM message. The ERRMA transmits 407 the created equivalent RCS message on the GBM channel to the GBM channel-specific ID, for example, the conversation ID, mapped to the user's mobile number. For example, the ERRMA receives a message from the entity for sending a rich message on a first rich messaging channel, i.e., RCS messaging channel, with an API call. The ERRMA determines the type of message being sent to the user's mobile number. The ERRMA checks the mapping of how the type of message is supported in the alternative messaging channel, i.e., GBM channel, as disclosed in detailed description of FIGS. 11A-11D. The ERRMA determines format of the message on the GBM channel, and an API used to deliver the message to the GBM channel. The ERRMA applies the mapping, and delivers a GBM message to the user on the GBM channel. Second example, the ERRMA receives a signal or a message from the user for sending it to the entity via the alternative messaging channel. The ERRMA determines the type of the signal or the message being received, and checks the mapping of the type of the signal or the message is supported in the first rich messaging channel. The ERRMA determines the format of the signal or the message on first rich messaging channel, and an API used to deliver the signal or the message to the entity on first rich messaging channel. The ERRMA applies the mapping, and delivers the signal or the message to the entity on first rich messaging channel.

Upon determining that the user's mobile number has not previously exchanged the equivalent rich communication services (RCS) messages on the Google Business Messages (GBM) channel, the expanded reach rich messaging application (ERRMA) creates 408 an internal identifier, for example, an internal ERRMA identifier, configured to securely map to the user's mobile number, as disclosed in detailed description of FIG. 10. The ERRMA creates a mapping between the user's mobile number and the internal ERRMA identifier. The ERRMA creates 409 a uniform resource locator (URL) link for a URL entry point to the entity's GBM agent with the internal ERRMA identifier mapped to the user's mobile number as a custom context value. The ERRMA creates 410 an equivalent short message service (SMS) message comprising the created URL link, as exemplarily illustrated in FIG. 7B. The URL is encoded with the internal ERRMA identifier. The ERRMA maintains a secure mapping between the internal ERRMA identifier and the user's mobile number. The ERRMA maintains a mapping of the user's mobile number and the internal ERRMA identifier used to construct the URL instead of including user's mobile number in the URL transmitted to the user's mobile number. By using the internal ERRMA identifier, the ERRMA ensures that the URL does not include the user's mobile number, the user's name, a universally unique identifier (ID), a globally unique ID, the user's device ID, the user's network ID, or any other identifier of the user, thereby ensuring security and confidentiality of the user. Furthermore, the user's name, the universally unique ID, the globally unique ID, the user's device ID, the user's network ID, and any other identifier of the user, are excluded in the URL transmitted to the user's mobile number. The ERRMA creates an equivalent short message service (SMS) message with the created URL link to the entity's GBM agent, to exchange the RCS messages on the GBM channel. For example, the ERRMA creates 410 an SMS message using the generated URL link, optionally shortened using a shortener service, informing the user to click on the link to view the RCS message and interact with the entity. The ERRMA transmits 411 the created equivalent SMS message with the URL link to the user's mobile number. Upon receiving the SMS message on a user device of the user, the user clicks on the URL link in the SMS message received on the user's mobile number to start 412 interacting with the GBM agent of the entity and view the RCS message sent by the entity. That is, the user exchanges the equivalent RCS messages on the GBM channel upon clicking the URL. In another embodiment, after the user clicks the URL link, the user is directed to an alternative rich messaging channel, for example, a progressive web application (PWA) or any other web application, that enables the user to view and start interacting with the RCS message sent by the entity.

The expanded reach rich messaging application (ERRMA) receives 413 a Google Business Messages (GBM) channel-specific identifier (ID) of the user along with the internal ERRMA identifier of the user, creates a secure internal mapping between the user's mobile number and the GBM channel-specific ID of the user, and stores the mapping for future use. After creating the secure internal mapping, the ERRMA creates 406 an equivalent RCS message on the GBM channel for the user's mobile number by translating the RCS message into a GBM message. The ERRMA transmits 407 the created equivalent RCS message on the GBM channel to the GBM channel-specific ID, for example, the conversation ID, mapped to the user's mobile number. In an embodiment, the ERRMA creates a mapping between the user's mobile number and the GBM channel-specific ID and stores the mapping for future use. The ERRMA receives the GBM channel-specific ID from the GBM channel and the internal ERRMA identifier that was included while creating the URL. The ERRMA uses the mapping of the GBM channel-specific ID and the internal ERRMA identifier to identify the user's mobile number and creates mapping from the GBM channel-specific ID to the user's mobile number to use used in future. The ERRMA transmits subsequent equivalent RCS messages to the GBM channel-specific ID of the user, on the GBM channel, once the URL has been clicked. Therefore, the ERRMA does not need to send an SMS message with the URL link for every new equivalent RCS message. In an embodiment, the GBM channel-specific ID of the user is the conversation ID. In another embodiment, the internal ERRMA identifier is passed over the GBM channel using the custom context value.

Figure 5A:
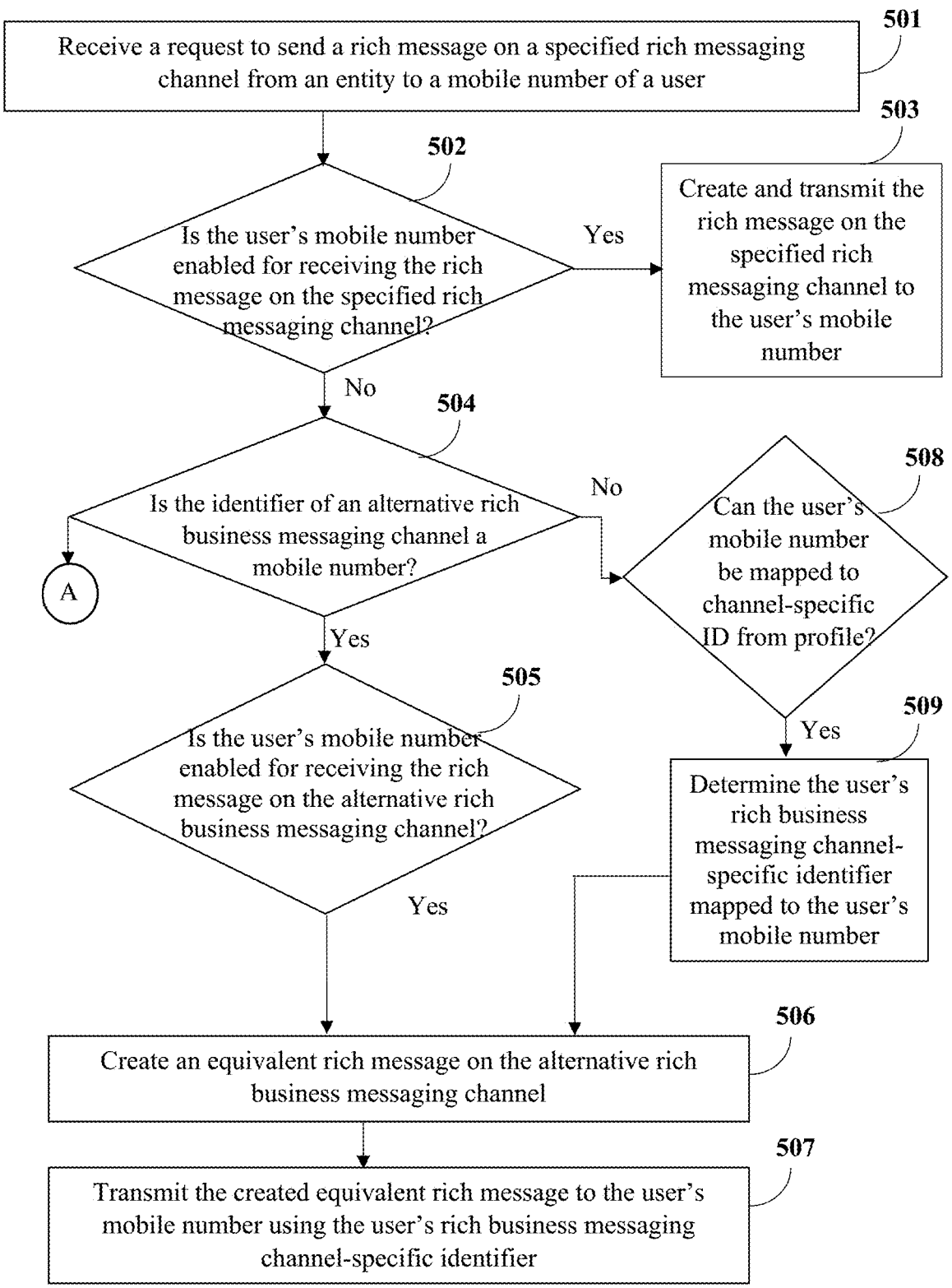
FIGS. 5A-5C exemplarily illustrates a flowchart of an embodiment of a method for creating and transmitting a rich message.
Figure 5B:
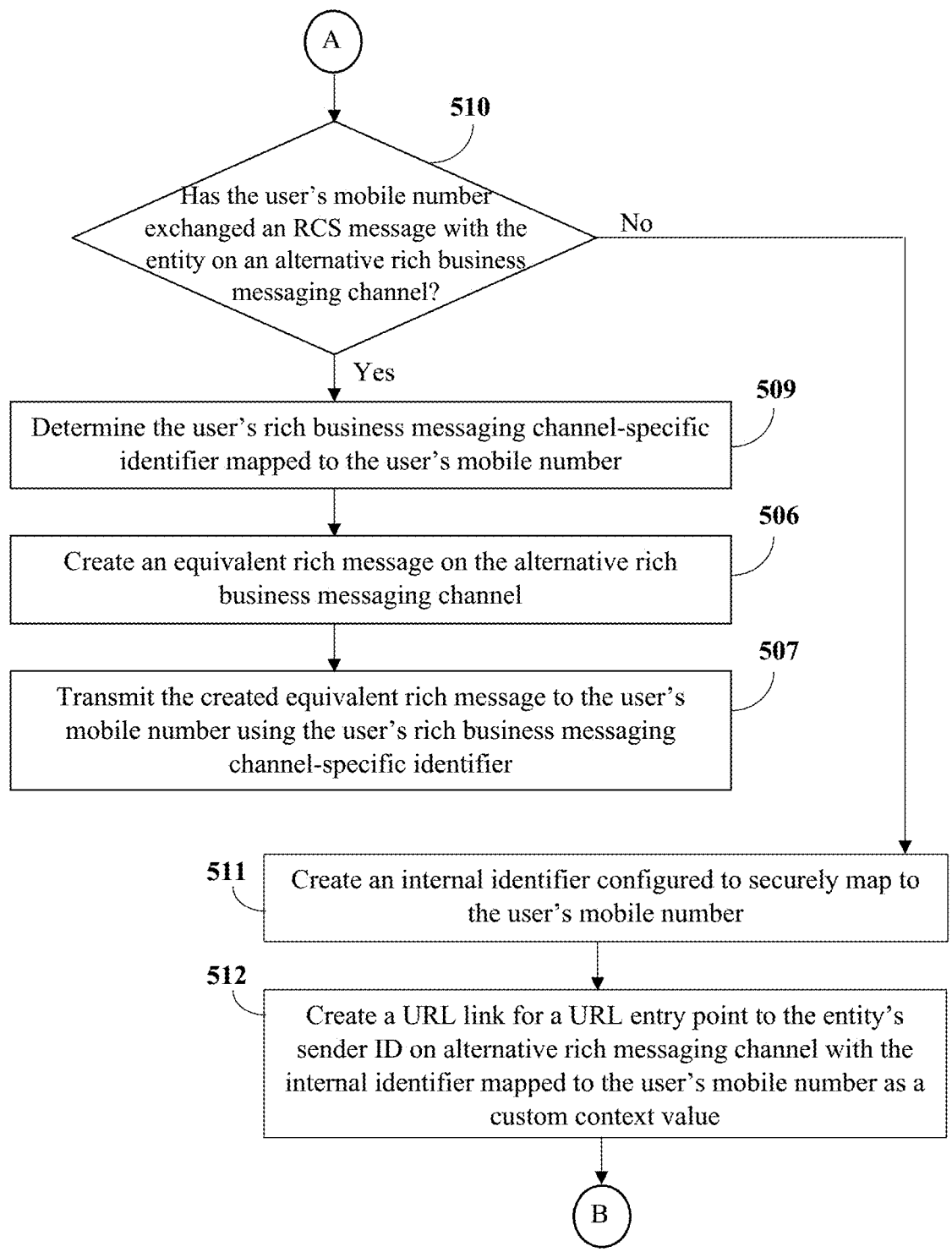
Figure 5C:
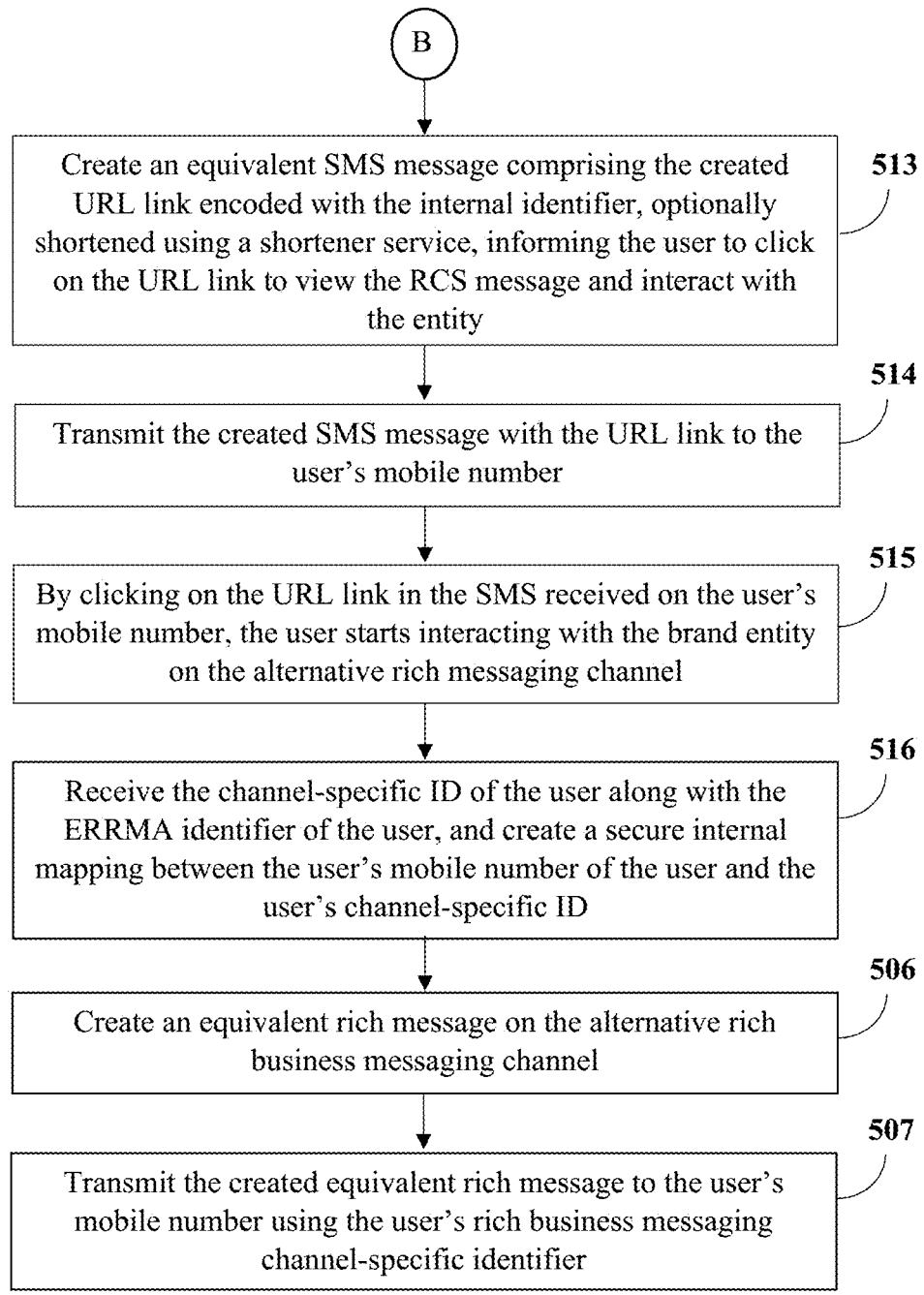

FIGS. 5A-5C exemplarily illustrates a flowchart of an embodiment of a method for creating and transmitting a rich message. In the method disclosed herein, the expanded reach rich messaging application (ERRMA) receives 501 a request to send a rich message on a specified rich messaging channel from an entity to a mobile number of a user. The ERRMA determines 502 whether the user's mobile number is enabled for receiving the rich message on the specified rich messaging channel. Upon successful determination that the user's mobile number is enabled for receiving the rich message on the specified rich messaging channel, the ERRMA creates and transmits 503 the rich message on the specified rich messaging channel to the user's mobile number. Upon determining that the user's mobile number is not enabled for receiving the rich message on the specified rich messaging channel, the ERRMA determines 504 whether an identifier of an alternative rich business messaging channel is a mobile number. Upon determining that the mobile number is the identifier for the alternative rich business messaging channel, the ERRMA determines 505 whether the user's mobile number is enabled for receiving the rich message on the alternative rich business messaging channel. Upon determining that the mobile number is the user's mobile number is enabled for receiving the rich message on the alternative rich business messaging channel, the ERRMA creates 506 an equivalent rich message on the alternative rich business messaging channel. The ERRMA transmits 507 the created equivalent rich message to the user's mobile number using the rich business messaging channel-specific identifier of the user.

Upon determining that the identifier of the alternative rich business messaging channel is not a mobile number, the ERRMA determines 508 whether the user's mobile number can be mapped to channel-specific ID from a profile, for example, user profile. Upon successful determination the user's mobile number can be mapped to channel-specific ID from the profile, the ERRMA determines 509 a rich business messaging channel-specific identifier of the user mapped to the mobile number of the user. The ERRMA creates 506 an equivalent rich message on the alternative rich business messaging channel. The ERRMA transmits 507 the created equivalent rich message to the user's mobile number using the rich business messaging channel-specific identifier of the user.

Upon determining that the identifier of the alternative rich business messaging channel is not a mobile number, the ERRMA determines 510 whether the user's mobile number has exchanged a rich communication services (RCS) message with the entity on an alternative rich business messaging channel. In an embodiment, the ERRMA determines whether the user's mobile number has exchanged a RCS message with the entity on an alternative rich business messaging channel by saving the history of past interactions (for example in a database) with users on the alternative rich channels and searching in the Database (or memory cache). In another embodiment, the ERRMA determines whether the user's mobile number has exchanged a RCS message with the entity on an alternative rich business messaging channel by looking for a mapping between the user's mobile number and a channel-specific identifier. If the mapping exists, it indicates that the user has interacted on the alternative channel. Upon successful determination that the user's mobile number has exchanged the RCS message with the entity on the alternative rich business messaging channel, the ERRMA determines 509 a rich business messaging channel-specific identifier of the user mapped to the mobile number of the user. The ERRMA creates 506 an equivalent rich message on the alternative rich business messaging channel. The ERRMA transmits 507 the created equivalent rich message to the user's mobile number using the rich business messaging channel-specific identifier of the user. Upon determining that the user's mobile number has not exchanged the RCS message with the entity on the alternative rich business messaging channel, the ERRMA creates 511 an internal identifier, for example, an internal ERRMA identifier, configured to securely map to the user's mobile number, as disclosed in detailed description of FIG. 10. The ERRMA creates a mapping between the user's mobile number and the internal ERRMA identifier. The ERRMA creates 512 a uniform resource locator (URL) link for a URL entry point to the entity's sender ID with the internal ERRMA identifier mapped to the user's mobile number as a custom context value. The ERRMA creates 513 an equivalent short message service (SMS) message comprising the created URL link, as exemplarily illustrated in FIG. 7B. The URL is encoded with the internal ERRMA identifier. The ERRMA maintains a secure mapping between the internal ERRMA identifier and the user's mobile number. For example, the ERRMA creates 513 an SMS message using the generated URL link, optionally shortened using a shortener service, informing the user to click on the link to view the RCS message and interact with the entity. The ERRMA transmits 514 the created equivalent SMS message with the URL link to the user's mobile number. Upon receiving the SMS message on a user device of the user, the user clicks on the URL link in the SMS message received on the user's mobile number to start 515 interacting with the brand entity and view the RCS message sent by the entity. That is, the user exchanges the equivalent RCS messages on the alternative rich messaging channel upon clicking the URL. In another embodiment, after the user clicks the URL link, the user is directed to an alternative rich messaging channel, for example, a progressive web application (PWA) or any other web application, that enables the user to view and start interacting with the RCS message sent by the entity.

The expanded reach rich messaging application (ERRMA) receives 516 a channel-specific identifier (ID) of the user along with the internal ERRMA identifier of the user, creates a secure internal mapping between the user's mobile number and the channel-specific ID of the user, and stores the mapping for future use. After creating the secure internal mapping, the ERRMA creates 506 an equivalent rich message on the alternative rich business messaging channel. The ERRMA transmits 507 the created equivalent rich message to the user's mobile number using the rich business messaging channel-specific identifier of the user. The ERRMA uses the mapping of the channel-specific ID and the internal ERRMA identifier to identify the user's mobile number and creates mapping from the channel-specific ID to the user's mobile number to use used in future. The ERRMA transmits subsequent equivalent rich messages to the channel-specific ID of the user, on the alternative rich business messaging channel, once the URL has been clicked. Therefore, the ERRMA does not need to send an SMS message with the URL link for every new equivalent rich message.

Figure 6:
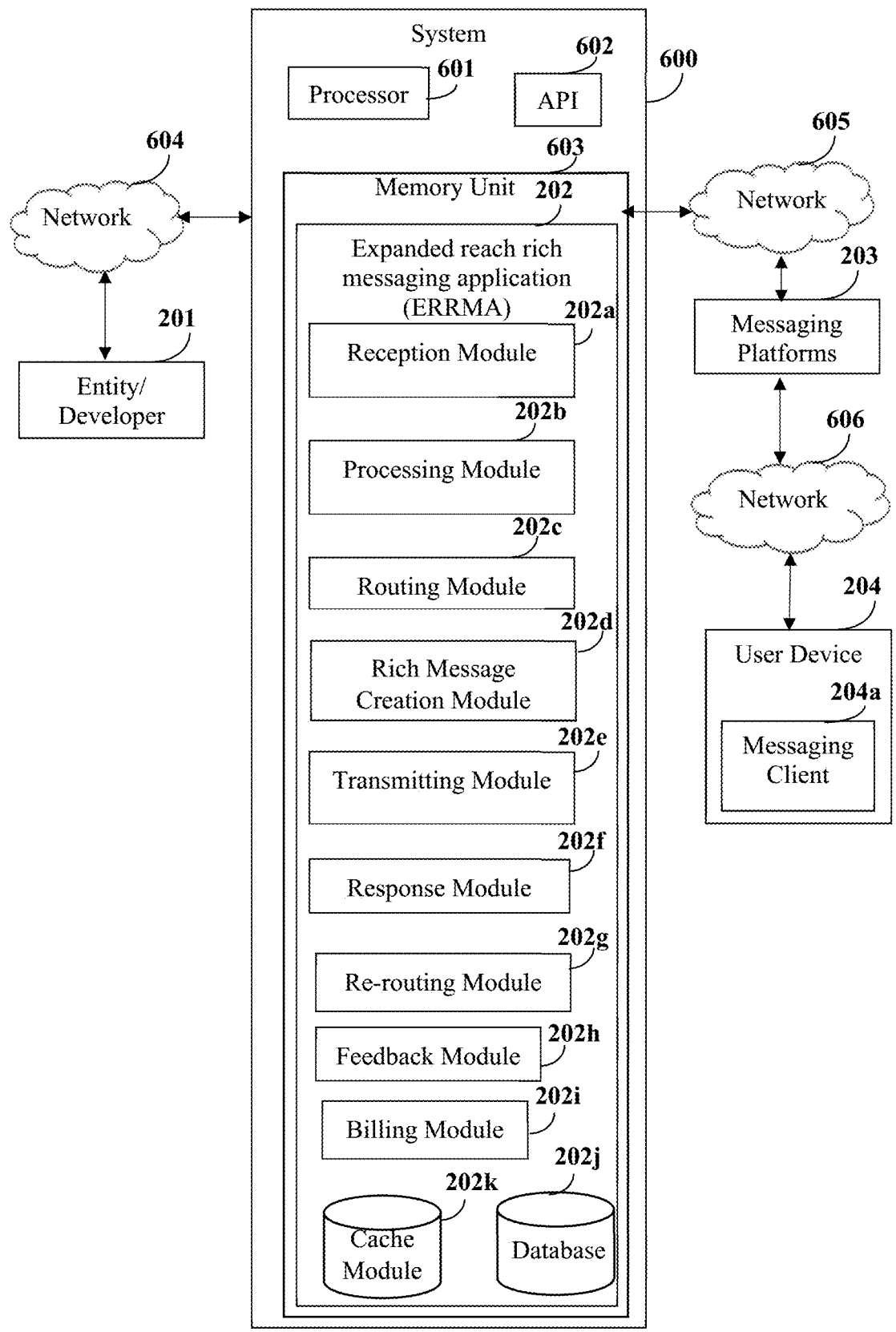
FIG. 6 exemplarily illustrates an architectural block diagram of an exemplary implementation of a system for creating and transmitting a rich message.

FIG. 6 exemplarily illustrates an architectural block diagram of an exemplary implementation of a system 600 for creating and transmitting a rich message. The system 600 disclosed herein is a computer system programmable using high-level computer programming languages. The system 600 is accessible to an entity, for example, a brand entity, or a developer 201 on behalf of the entity via a network 604 through a broad spectrum of technologies and devices such as personal computers with access to the internet, laptops, mobile computing devices, smart phones, tablet computing devices, servers, workstations, a portable electronic device, a network-enabled computing device, an interactive network-enabled communication device, any other suitable computing equipment, combinations of multiple pieces of computing equipment, etc. Furthermore, the system 600 communicates with multiple messaging platforms 203 that host rich messaging channels, via a network 605. The messaging platforms 203 comprise, for example, Google Business Messages (GBM), WhatsApp®, Rich Communication Services (RCS), iMessage®, Viber®, Facebook® Messenger, etc. Furthermore, the messaging platforms 203 are accessible to a user device 204 of a user via a network 606. The user device 204 is an electronic device, for example, one or more of a personal computer, a tablet computing device, a mobile computer, a mobile phone, a smartphone, a portable computing device, a laptop, a personal digital assistant, a wearable computing device such as smart glasses, a smart watch, etc., a touch centric device, a workstation, a client device, a portable electronic device, a network-enabled computing device, an interactive network-enabled communication device, an image capture device, any other suitable computing equipment, combinations of multiple pieces of computing equipment, etc.

The user device 204 comprises a messaging client 204*a* implemented, for example, on the Android® platform of Google Inc., the iOS platform of Apple Inc., the Windows® platform of Microsoft Corporation, or other platforms. The messaging client 204*a* is configured to receive messages, for example, rich messages, short message service (SMS) messages, etc., via the network 606. The messaging client 204*a* is, for example, the WhatsApp® instant messaging application, the iMessage® instant messaging application, the Viber® messaging application, Facebook® Messenger, etc. The networks 604, 605, and 606 that connect the system 600 to the entity 201, the messaging platforms 203, and the user device 204, respectively, are each, for example, one of the internet, satellite internet, a wireless network, a network that implements Wi-Fi® of Wi-Fi Alliance Corporation, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks.

The system 600 disclosed herein interfaces with the devices of the entity or developer 201 on behalf of the entity and the messaging platforms 203, and in turn, with the user device 204, and in an embodiment, with one or more database systems (not shown) and servers (not shown) to implement the expanded reach rich messaging service, and therefore more than one specifically programmed computing system is used for implementing the expanded reach rich messaging service. As exemplarily illustrated in FIG. 6, the system 600 comprises at least one processor 601, an application programming interface (API) 602 configured for rich messages, and a non-transitory, computer-readable storage medium, for example, a memory unit 603. As used herein, "non-transitory, computer-readable storage medium" refers to all computer readable media that contain and store computer programs and data. Examples of the computer-readable media comprise hard drives, solid state drives, optical discs or magnetic disks, memory chips, a read-only memory (ROM), a register memory, a processor cache, a random-access memory (RAM), etc. The system 600 further comprises the expanded reach rich messaging application (ERRMA) 202 configured to define computer program instructions executable by at least one processor 601. The non-transitory, computer-readable storage medium, herein exemplarily referred to as the memory unit 603, is configured to store the computer program instructions defined by the ERRMA 202. In an embodiment, the memory unit 603 stores the modules 202*a*, 202*b*, 202*c*, 202*d*, 202*e*, 202*f*, 202*g*, 202*h*, 202*i*, 202*j*, and 202*k* of the ERRMA 202 as exemplarily illustrated in FIG. 6.

The processor 601 is operably and communicatively coupled to the memory unit 603 for executing the computer program instructions defined by the modules, for example, 202*a*, 202*b*, 202*c*, 202*d*, 202*e*, 202*f*, 202*g*, 202*h*, 202*i*, 202*j*, and 202*k* of the expanded reach rich messaging application (ERRMA) 202. The memory unit 603 is a storage unit used for recording, storing, and reproducing data, program instructions, and applications. In an embodiment, the memory unit 603 comprises a random-access memory (RAM) or another type of dynamic storage device that serves as a read and write internal memory and provides short-term or temporary storage for information and instructions executable by the processor 601. The memory unit 603 also stores temporary variables and other intermediate information used during execution of the instructions by the processor 601. In another embodiment, the memory unit 603 further comprises a read-only memory (ROM) or another type of static storage device that stores firmware, static information, and instructions for execution by the processor 601. The modules, for example, 202*a*, 202*b*, 202*c*, 202*d*, 202*e*, 202*f*, 202*g*, 202*h*, 202*i*, 202*j*, and 202*k* of the ERRMA 202, when loaded into the memory unit 603 and executed by the processor 601, transform the system 600 into a specially-programmed, special purpose computing device configured to implement the functionality disclosed herein. The processor 601 refers to one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. In an embodiment, the processor 601 is implemented as a processor set comprising, for example, a programmed microprocessor and a math or graphics co-processor. The ERRMA 202 is not limited to employing the processor 601. In an embodiment, the ERRMA 202 employs a controller or a microcontroller.

The expanded reach rich messaging application (ERRMA) 202 defines computer program instructions, which when executed by the processor 601, causes the processor 601 to manage actions associated with creating and transmitting a rich message. In the exemplary implementation of the system 600 illustrated in FIG. 6, the ERRMA 202 comprises a reception module 202*a*, a processing module 202*b*, a routing module 202*c*, a rich message creation module 202*d*, a transmitting module 202*e*, a response module 202*f*, a re-routing module 202*g*, a feedback module 202*h*, a billing module 202*i*, a database 202*j*, and a cache module 202*k*. The reception module 202*a* is configured to receive a request to send a rich message on a specified rich messaging channel from an entity or a developer 201 on behalf of the entity to a mobile number of a user.

The processing module 202*b* is configured to process the request to send the rich message on the specified rich messaging channel. The routing module 202*c* is configured to determine whether the user's mobile number is enabled for receiving the rich message on one of the specified rich messaging channel and one or more alternative rich messaging channels 203 by executing a channel specific command for the user's mobile number. For example, a rich communication services (RCS) contacts capability check command is executed to determine whether the user's mobile number is enabled for RCS. The specified rich messaging channel and each of the alternative rich messaging channels comprise, for example, any one of an RCS channel, an instant messaging channel, a business messaging channel, and a social media messaging channel as disclosed in the description of FIG. 1A. Upon determining that the user's mobile number is enabled for receiving the rich message on the specified rich messaging channel, the rich message creation module 202*d* creates a rich message comprising, for example, one of a text, media, a rich card, a rich card carousel, a suggested reply button, a suggested action button, a suggested chip list, and any combination thereof.

In an embodiment, the database 202*j* stores the created rich message. The database 202*j* is any storage area or medium that can be used for storing the rich messages and rich media contained in the rich messages. In an embodiment, the database 202*j* is any of a structured query language (SQL) database or a not only SQL (NoSQL) database. In another embodiment, the database 202*j* is a location on a file system. In another embodiment, the database 202*j* is configured to be remotely accessible by the expanded reach rich messaging application (ERRMA) 202 in the system 600 via the network 605. In another embodiment, the database 202*j* is configured as a cloud-based database implemented in a cloud computing environment. The cache module 202*k* is configured as a local cache, for example, a rich messaging cache, configured to store an enabled status for each mobile number based on a response received to an explicit or implicit capability check command for RCS or an equivalent command for other rich messaging channels. As used herein, "explicit capability check" (or equivalent command on other rich messaging channels) is one where the only purpose/outcome of the check is to determine if the user's mobile number is reachable on the specified rich messaging channel. Also as used herein, "implicit capability check" is one where the ERRMA tries to send a message on the specified rich messaging channel, and if the message is successfully sent, it implies that the user's mobile number is enabled on the channel. whereas if the number is not reachable, the ERRMA will get a response that indicates that the user's mobile number is not enabled/reachable. The transmitting module 202*e* is configured to transmit the created rich message to the user's mobile number on the specified rich messaging channel. Upon determining that the user's mobile number is not enabled for receiving the rich message on the specified rich messaging channel, the routing module 202*c* determines whether the user's mobile number is enabled for receiving the rich message on an alternative rich messaging channel. Upon determining that the user's mobile number is enabled for receiving the rich message on the alternative rich messaging channel, the rich message creation module 202*d* creates an equivalent rich message. The transmitting module 202*e* is configured to transmit the created equivalent rich message on the alternative rich messaging channel to the user device 204 addressed by one of the user's mobile number and an identifier mapped to the user's mobile number.

In an embodiment, the routing module 202*c* is configured to determine whether the mobile number is enabled for one or more of multiple alternative rich messaging platforms 203, and the rich message creation module 202*d* is configured to determine the type of the rich message to be transmitted to the mobile number via the alternative rich messaging platforms 203, and to create the appropriate equivalent rich message. In another embodiment, the routing module 202*c* is configured to determine whether the user's mobile number is enabled on the specified rich messaging channel, for example, a rich communication services (RCS) channel; the rich message creation module 202*d* is configured to create the RCS message; and the transmitting module 202*e* is configured to transmit the created RCS message to the user's mobile number via the enabled RCS channel. In an embodiment, the routing module 202*c* executes the RCS contacts capability check command for the mobile number to determine whether the mobile number is enabled for RCS. In an embodiment, the routing module 202*c* is configured to determine whether the user's mobile number is linked to a business messaging channel-specific identifier, and the transmitting module 202*e* is configured to transmit the created equivalent rich message to the business messaging channel-specific identifier.

In an embodiment, the routing module 202*c* saves the enabled status of the mobile number for one of the specified rich messaging channel and the alternative rich messaging channel 203 in a local cache, for example, a rich messaging cache, configured for one of the specified rich messaging channel and the alternative rich messaging channel, and an RCS cache configured for the RCS messaging channel. In an embodiment, an entry in the RCS cache comprises one entry for every unique mobile number, with the following exemplary attributes:

(1) Key of each entry in the RCS cache: Mobile number;
(2) Mandatory attribute stored in the entry for each key in the RCS cache: RCS enabled status (Enabled/Not Enabled); and
(3) Additional (optional) attributes stored in the entry for each key in the RCS cache, comprising, for example:
  a) List of capabilities and/or features supported for that mobile number.
  b) Messaging as a Platform (MaaP) identifier (ID) of the RCS MaaP serving the mobile number;
  c) Last timestamp when the RCS enabled status was known based on an explicit or implicit capability check; and
  d) Expiry time of the cache entry.

In an embodiment, the routing module 202*c* searches for an entry of the user's mobile number in the rich messaging cache or the RCS cache before executing the RCS capability check command. If there is no entry for the mobile number in the RCS cache, or if the entry for the mobile number has expired, then the expanded reach rich messaging application (ERRMA) 202 performs an explicit capability check or an implicit capability check.

In another embodiment, the routing module 202*c* is configured to determine whether the user's mobile number is enabled for an alternative rich messaging channel, for example, the WhatsApp® messaging channel; the rich message creation module 202*d* is configured to create the WhatsApp® message; and the transmitting module 202*e* is configured to transmit the created WhatsApp message to the user's mobile number. In an embodiment, the routing module 202*c* executes the WhatsApp® contacts command for the mobile number to determine whether the mobile number is enabled for WhatsApp®. In another embodiment, the rich message creation module 202*d* and the transmitting module 202*e* are configured to create and transmit a standard short message service (SMS) message to the user's mobile number, respectively, if the routing module 202*c* determines that the mobile number is not enabled for any of the rich messaging channels, for example, Rich Communication Services (RCS), WhatsApp®, iMessage®, Viber®, etc. The transmitting module 202*e* transmits the rich message to the user's mobile number over the networks 605 and 606. The transmitting module 202*e* delivers the rich message into a default messaging application, that is, the messaging client 204*a* deployed on the user device 204 with a subscriber identity module (SIM) that represents the user's mobile number. In an embodiment, the transmitting module 202*e* delivers the rich message into a data messaging application on the user device 204 that is registered to the user's mobile number. In an embodiment, the routing module 202*c* saves the enabled status of the mobile number for one of the specified rich messaging channel and the alternative rich messaging channels in a local cache, for example, a rich messaging cache, configured for one of the specified rich messaging channel and the alternative rich messaging channels, and a WhatsApp cache configured for the WhatsApp® messaging channel. In an embodiment, an entry in the WhatsApp® cache comprises one entry for every unique mobile number, with the following exemplary attributes:

(1) Key of each entry in the WhatsApp cache: Mobile number;
(2) Mandatory attribute stored in the entry for each key in the WhatsApp cache: WhatsApp enabled status (Enabled/Not Enabled); and
(3) Additional (optional) attributes stored in the entry for each key in the WhatsApp cache, comprising, for example:
  a) Last timestamp when the WhatsApp enabled status was known based on an explicit or implicit capability check; and
  b) Expiry time of the cache entry.

In an embodiment, the routing module 202c searches for an entry of the user's mobile number in the rich messaging cache or the WhatsApp cache before executing the WhatsApp® contacts command. If there is no entry for the mobile number in the WhatsApp® cache, or if the entry for the mobile number has expired, then the expanded reach rich messaging application (ERRMA) 202 performs an explicit capability check or an implicit capability check.

The input for the creation and the transmission of the rich message is received from one of an expanded reach rich messaging application (ERRMA) application programming interface (API) 602, an API configured for sending rich messages, a protocol configured for sending the rich messages, and an application configured for sending the rich messages. In an embodiment, the API 602 receives a request to send a rich message on a specified rich messaging channel from the entity or the developer 201 on behalf of the entity. The routing module 202c determines whether the user's mobile number is enabled for the specified and alternative rich messaging channels hosted by the messaging platforms 203 and other data messaging applications, for example, Google Business Messages (GBM), Rich Communication Services (RCS), WhatsApp, iMessage, Viber, etc. The rich message creation module 202d creates the rich message based on the rich messaging channel determined by the routing module 202c and the identified rich message template. The transmitting module 202e transmits the rich message to the user's mobile number via one or more of the specified and alternative rich messaging channels. In an embodiment, the routing module 202c relies on the transmitting module 202e to implicitly determine whether the mobile number of the recipient is enabled on one or more of the specified and the alternative rich messaging channels.

In an embodiment, the application programming interface (API) 602 receives a request to send a rich message on a specified rich messaging channel from the entity to a user's mobile number. The reception module 202a receives the request from the API 602 and passes the request to the processing module 202b. The processing module 202b parses the request and passes the parsed request to the routing module 202c. The routing module 202c determines whether the user's mobile number is enabled on the specified rich messaging channel. The rich message creation module 202d creates a rich message if the user's mobile number is enabled on the specified rich messaging channel. The transmitting module 202e transmits the created rich message to the user device 204 via the specified rich messaging channel. If the mobile number is not enabled on the specified rich messaging channel, the routing module 202c determines whether the user's mobile number is enabled on one or more alternative rich messaging channels. The routing module 202c transmits a standard short message service (SMS) message if the mobile number is identified as not enabled for one or more of the alternative rich messaging channels.

The messaging client 204a on the user device 204 associated with the user's mobile number receives the transmitted rich message as exemplarily illustrated in FIGS. 7A-9C. The transmitting module 202e delivers the rich message from a verified sender identifier (ID), for example, Safe Screening as exemplarily illustrated in FIG. 7A, or from a sender ID generated by an entity that is sending the rich message, for example, "United Airlines", "ALDI", "MMA Connect", "Newark Museum", etc. In an embodiment, a service provider verifies the identity of the entity, for example, a brand identity, included in the rich message. In an embodiment, the rich message further comprises one or more of multiple interactive buttons comprising, for example, a suggested reply button, a suggested action button, and an entity-specific action button. The user responds to the entity or sends a user response to the entity by selecting the suggested reply button. The user executes an action on the user device 204 by selecting the suggested action button or the entity-specific action button. The response module 202f receives a selection of the suggested reply button, the suggested action button, or the entity-specific action button contained in the rich message, from the user device 204. In an embodiment, the response module 202f is configured to receive a status message comprising, for example, one or more of a delivery receipt, a delivery failure, a read receipt, etc., from the messaging client 204a on the user device 204. In an embodiment, the response module 202f is configured to receive one or more messages from the user's mobile number over the alternative rich messaging channel(s) and send the messages to the entity/developer 201 over the specified rich messaging channel. The message(s) received from the user's mobile number comprises one or more of a user response to a suggested reply, an indication of the user selecting a suggested action, a text, and a media message composed by the user.

The feedback module 202h is configured to send a delivery status, a read status, timeouts, and the user's selection of a suggested reply and/or a suggested action to the entity or the developer 201 on behalf of the entity. The user conveys the suggested reply by selecting or tapping on the suggested reply button displayed on a graphical user interface (GUI) 204b of the messaging client 204a to communicate a response to the entity as exemplarily illustrated in FIGS. 7A-9C. The user conveys the suggested action by selecting or tapping on the suggested action button displayed on the GUI 204b of the messaging client 204a to execute an action on the user device 204, for example, make a phone call, open a website, share a location, etc. In an embodiment, the reception module 202a is configured to receive the user's selections from the messaging client 204a of the user device 204 and pass the user's selections to the feedback module 202h. The feedback module 202h is configured to process an action corresponding to a status, for example, a delivery status, a read status, etc., and the selections received from the reception module 202a and/or the response module 202f.

In an embodiment, the feedback module 202h is configured to provide feedback to the entity about the selections received by the reception module 202a and/or the response module 202f, by sending a callback of the user's replies and/or actions to the entity 201 over the application programming interface (API) 602. The entity 201 is free to process the feedback received from the expanded reach rich messaging application (ERRMA) 202 about the user's replies and/or actions, or take some other action in response to the user's replies and/or actions. The feedback module 202h also provides feedback to the entity or the developer 201 on behalf of the entity about the delivery status and the read receipt of the rich message, to allow the entity to take an appropriate action. For example, if the rich message is read, the feedback module 202h informs the entity/developer 201 that the rich message has been read. In another embodiment, the feedback module 202h is configured to provide feedback to the entity/developer 201 about the messaging platforms 203 used to send the rich message to the user's mobile number. In another embodiment, the feedback module 202h is configured to provide feedback to the entity/developer 201 when the routing module 202c determines that the mobile number is not enabled for any of the rich messaging channels, and the entity/developer 201 has not chosen the option to have the ERRMA 202 transmit a standard short message service (SMS) message to the user's mobile number, thereby allowing the entity/developer 201 to take an alternative action, for example, sending the SMS message as a standard SMS message on its own. In an embodiment, the feedback module 202h is configured to receive a status message from the alternative rich messaging channel and send the status message to the entity/developer 201 on the specified rich messaging channel. Sending of the status message comprises sending one or more of a delivery receipt and a read receipt to the entity/developer 201.

The routing module 202c is configured to determine rich data messaging capabilities of multiple messaging platforms 203, and the rich message creation module 202d maps a request from the entity/developer 201 to the messaging platform-specific capabilities to create the rich message and instruct the transmitting module 202e to transmit the created rich message to the user device 204. For example, rich communication services (RCS) channel supports the rich element "Rich Card Carousel"; Google Business Messages (GBM), Instagram and Facebook® messenger also support a carousel. On the other hand, WhatsApp® does not support carousel. However, WhatsApp® support List Message element that can be used to map a carousel (in RCS as specified channel) to List message in WhatsApp (as the alternative channel). The rich message creation module 202d is configured to translate the request for a rich message into a rich message that can be delivered to the messaging platform(s) 203 determined by the routing module 202c, using information in a rich message template defined by the entity or the developer 201 on behalf of the entity. The response module 202f is configured to monitor the delivery of the rich message or the equivalent rich message to the user's mobile number or the user device 204, and the delivery of the user's replies/actions in response to the rich message. The re-routing module 202g is configured to potentially deliver the rich message to the user device 204 via one or more additional messaging platforms when there is a delivery failure or a delay in delivery of the rich message to the user's mobile number via a first messaging platform. The additional messaging platforms comprise, for example, alternative data messaging platforms and short message service (SMS) platforms. In an embodiment, the re-routing module 202g is configured to transmit the rich message via multiple rich messaging channels to increase the overall chances of successful delivery of the rich message. In an example, the re-routing module 202g delivers the rich message to the user's mobile number via the WhatsApp® messaging channel if the rich message is not delivered over the rich communication services (RCS) channel within a predetermined time interval.

In an embodiment, the re-routing module 202g delivers the rich message to the user's mobile number as a standard short messaging service (SMS) message if the rich message cannot be delivered over any rich messaging platforms or rich messaging channels within a predetermined time interval. In another embodiment, the re-routing module 202g is configured to revoke the rich message from a first messaging platform before attempting to deliver the rich message over a second messaging platform. Revoking the rich message from the first messaging platform is helpful to avoid duplicate rich messages being received by the user, and in an embodiment, helps avoid additional charges for delivery over multiple messaging platforms. The second messaging platform is another data messaging platform or an SMS platform. In an embodiment, the re-routing module 202g uses the rich message creation module 202d and the transmitting module 202e to create and deliver the rich message to the user device 204, respectively, via the second messaging platform. In an embodiment, the re-routing module 202g is configured to monitor the delivery of the rich message to the user's mobile number via the second messaging platform. The re-routing module 202g is further configured to deliver the rich message to the user's mobile number via one or more of a third messaging platform and a fourth messaging platform if there is a delivery failure or a delay in the delivery of the rich message to the user's mobile number via the second messaging platform. The rich message creation module 202d is configured to translate the SMS message to the rich message to be transmitted to the mobile number based on the selected second messaging platform, the third messaging platform, and the fourth messaging platform, and the rich message template defined by the entity or the developer 201 on behalf of the entity. In another embodiment, the re-routing module 202g is configured to revoke the rich message from other multiple rich messaging channels as soon as the rich message is delivered via one or more of multiple rich messaging channels.

The billing module 202i is configured to charge the entity/developer 201 a fee for creating and transmitting the rich message to the user device 204. Data messaging platforms, for example, Rich Communication Services (RCS), WhatsApp®, iMessage®, Viber®, etc., may charge a fee for application-to-person (A2P) messages, that could be at a premium or a fee lower than the fee for a short messaging service (SMS) message. Therefore, when the expanded reach rich messaging application (ERRMA) 202 transmits the rich message to the user's mobile number, the rich message would typically be charged an A2P message fee applicable to the data messaging platform used to send the rich message. Moreover, some data messaging platforms may charge a per session fee in lieu of a per message fee when the user responds to the rich message. Furthermore, there may be a need to charge the rich message at a price different from the per A2P message fee or the per session fee charged for sending other A2P messages or for other sessions on the data messaging platforms. The processing module 202b keeps track of the number of rich messages sent and the suggested replies or suggested actions received, in the database 202j, and enables the billing module 202i to charge the rich message in a way that is different from standard A2P and session pricing, which helps in the implementation of flexible pricing for the rich messages sent by entities.

The processor 601 of the system 600 disclosed herein retrieves instructions defined by the reception module 202a, the processing module 202b, the routing module 202c, the rich message creation module 202d, the transmitting module 202e, the response module 202f, the re-routing module 202g, the feedback module 202h, the billing module 202i, the cache module 202k, etc., from the memory unit 603 for executing their respective functions disclosed above. The modules 202a, 202b, 202c, 202d, 202e, 202f, 202g, 202h, 202i, 202j, and 202k of the expanded reach rich messaging application (ERRMA) 202 are disclosed above as software executed by the processor 601. In an embodiment, the modules 202a, 202b, 202c, 202d, 202e, 202f, 202g, 202h, 202i, 202j, and 202k of the ERRMA 202 are implemented completely in hardware. In another embodiment, the modules 202a, 202b, 202c, 202d, 202e, 202f, 202g, 202h, 202i, 202j, and 202k of the ERRMA 202 are implemented by logic circuits to carry out their respective functions disclosed above. In another embodiment, the system 600 is also implemented as a combination of hardware and software including the application programming interface (API) 602 and one or more processors, for example, 601, that are used to implement the modules, for example, 202a, 202b, 202c, 202d, 202e, 202f, 202g, 202h, 202i, 202j, and 202k of the ERRMA 202.

For purposes of illustration, the disclosure herein refers to the modules 202a, 202b, 202c, 202d, 202e, 202f, 202g, 202h, 202i, 202j, and 202k of the expanded reach rich messaging application (ERRMA) 202 being run locally on a single computer system 600; however the scope of the ERRMA 202 and the method disclosed herein is not limited to the modules 202a, 202b, 202c, 202d, 202e, 202f, 202g, 202h, 202i, 202j, and 202k being run locally on a single computer system 600 via an operating system and the processor 601, but extends to running the modules 202a, 202b, 202c, 202d, 202e, 202f, 202g, 202h, 202i, 202j, and 202k remotely over the network 605 by employing a web browser and a remote server, a mobile phone, or other electronic devices. In an embodiment, one or more portions of the system 600 disclosed herein are distributed across one or more computer systems (not shown) coupled to the network 605.

The non-transitory, computer-readable storage medium, herein exemplarily referred to as the memory unit 603, stores computer program instructions of the expanded reach rich messaging application (ERRMA) 202 executable by at least one processor 601 for creating and transmitting a rich message. The computer program instructions when executed by the processor 601 cause the processor 601 to: receive a request to send a rich message on a specified rich messaging channel from an entity to a mobile number of a user; determine whether the user's mobile number is enabled for receiving the rich message on the specified rich messaging channel; upon successful determination that the user's mobile number is enabled for receiving the rich message on the specified rich messaging channel, create and transmit the rich message on the specified rich messaging channel to the user's mobile number; upon determining that the user's mobile number is not enabled for receiving the rich message on the specified rich messaging channel, determine whether the user's mobile number is enabled for receiving the rich message on an alternative rich messaging channel; and upon determining that the user's mobile number is enabled for receiving the rich message on the alternative rich messaging channel, create and transmit an equivalent rich message on the alternative rich messaging channel to the user device 204 addressed by one of the user's mobile number and an identifier mapped to the user's mobile number.

The computer program instructions disclosed above implement the processes of various embodiments disclosed above and perform additional steps that may be required and contemplated for creating and transmitting a rich message. When the computer program instructions are executed by the processor(s) 601, the computer program instructions cause the processor(s) 601 to perform the steps of the method for creating and transmitting a rich message as disclosed in the descriptions of FIGS. 1-5. In an embodiment, a single piece of computer program code comprising computer program instructions performs one or more steps of the method disclosed in the descriptions of FIGS. 1-5. The processor(s) 601 retrieves these computer program instructions and executes them.

A module, or an engine, or a unit, as used herein, refers to any combination of hardware, software, and/or firmware. As an example, a module, or an engine, or a unit includes hardware such as a microcontroller, associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be held on a non-transitory, computer-readable storage medium. In an embodiment, the computer program codes comprising computer readable and executable instructions are implemented in any programming language, for example, C, C++, C#, Java®, JavaScript®, Fortran, Ruby, Perl®, Python®, Visual Basic®, hypertext pre-processor (PHP), Microsoft®.NET, Objective-C®, the Swift™ programming language of Apple Inc., etc. In another embodiment, other object-oriented, functional, scripting, and/or logical programming languages are also used. In an embodiment, the computer program codes or software programs are stored on or in one or more mediums as object code. In another embodiment, the term "module" or "engine" or "unit" refers to the combination of the microcontroller and the non-transitory, computer-readable storage medium. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

FIG. 7A exemplarily illustrates a screenshot of a graphical user interface (GUI) 204b rendered by a messaging client on a user device 204 shown in FIGS. 2-3 and FIG. 6, displaying a rich message 700 received from a verified sender identifier (ID), for example, "Safe Screening" 701, of an entity, for example, a brand entity, to a mobile number of a user. Consider an example where an entity identified by or associated with a brand, requests the expanded reach rich messaging application (ERRMA) 202 shown in FIGS. 2-3 and FIG. 6, to send a rich message 700 comprising a text description 702 regarding an interview with details, for example, an organization's name, date, time, etc., to a mobile number of a user on a specified rich messaging channel, for example, a rich communication services (RCS) channel. The ERRMA 202 processes the request and determines whether the user's mobile number is enabled for receiving the rich message on the RCS channel. Upon successful determination that the user's mobile number is enabled for receiving the rich message on the RCS channel, the ERRMA 202 creates and transmits the rich message 700 on the RCS channel to the user's mobile number. The user receives the rich message 700 from a verified sender ID of the entity, for example, the sender ID "Safe Screening" 701, along with a brand icon 703, a verification mark 704, and a suggested reply button 705, over the RCS channel. The GUI 204*b* rendered by the messaging client on the user device 204 displays the rich message 700 to the user as exemplarily illustrated in FIG. 7A. The verification mark 704, for example, a checkmark, disposed next to one or more of the sender ID 701, the brand name, the brand icon 703, and the brand logo, indicates that the entity is verified and can be trusted by the recipient of the rich message 700. The transmitted rich message 700 shows the description of the sender ID 701 or the entity 703 as exemplarily illustrated in FIG. 7A.

The rich message 700, shown in FIG. 7A, is an initial message transmitted to the user with a rich communication services (RCS)-enabled user device 204. The user can start an interaction with a chatbot, for example, an RCS Agent "Safe Screening", by selecting/clicking the suggested reply button "Start" 705 on the user device 204 as disclosed in the description of FIGS. 8A-8C. The chatbot implements a "Safe Screening" questionnaire for safe screening of the user before allowing or denying permission, for example, to one or more of a school, an office, or some other workspace that the user needs to enter. After receiving a selection from the user device 204, the chatbot displays a subsequent question based on the user's response. This process continues till the user answers the necessary questions needed to assess whether the user can be safely allowed to enter the workplace. After the completion of the "Safe Screening" questionnaire, the chatbot displays a green pass or a red pass with the user's identity and validity period. The "Safe Screening" questionnaire is implemented using RCS rich message elements comprising, for example, a rich card carousel, suggested replies, and/or a suggested chip list. The "Safe Screening" interaction experience disclosed herein is an example of a rich conversational experience implemented using RCS rich messaging capability. In another embodiment, another entity, for example, United Airlines, can implement a rich messaging journey questionnaire for a user to check-in for a flight and obtain a boarding pass using RCS messaging.

Figure 7B:
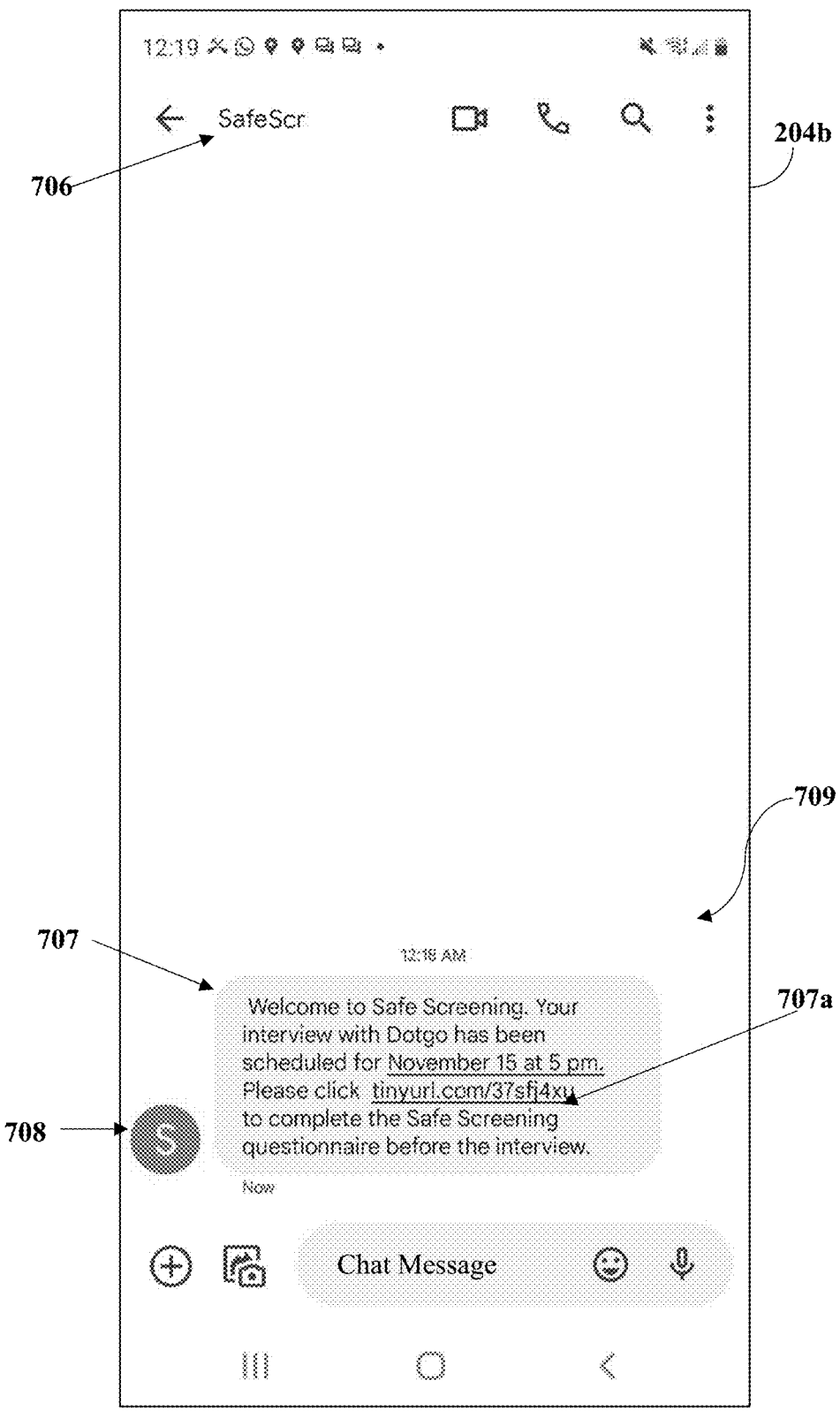
FIG. 7B exemplarily illustrates a screenshot of a graphical user interface rendered by the messaging client on the user device, displaying an equivalent short message service message received by a user at the user's mobile number from the verified sender identifier of the entity.
Figure 7C:
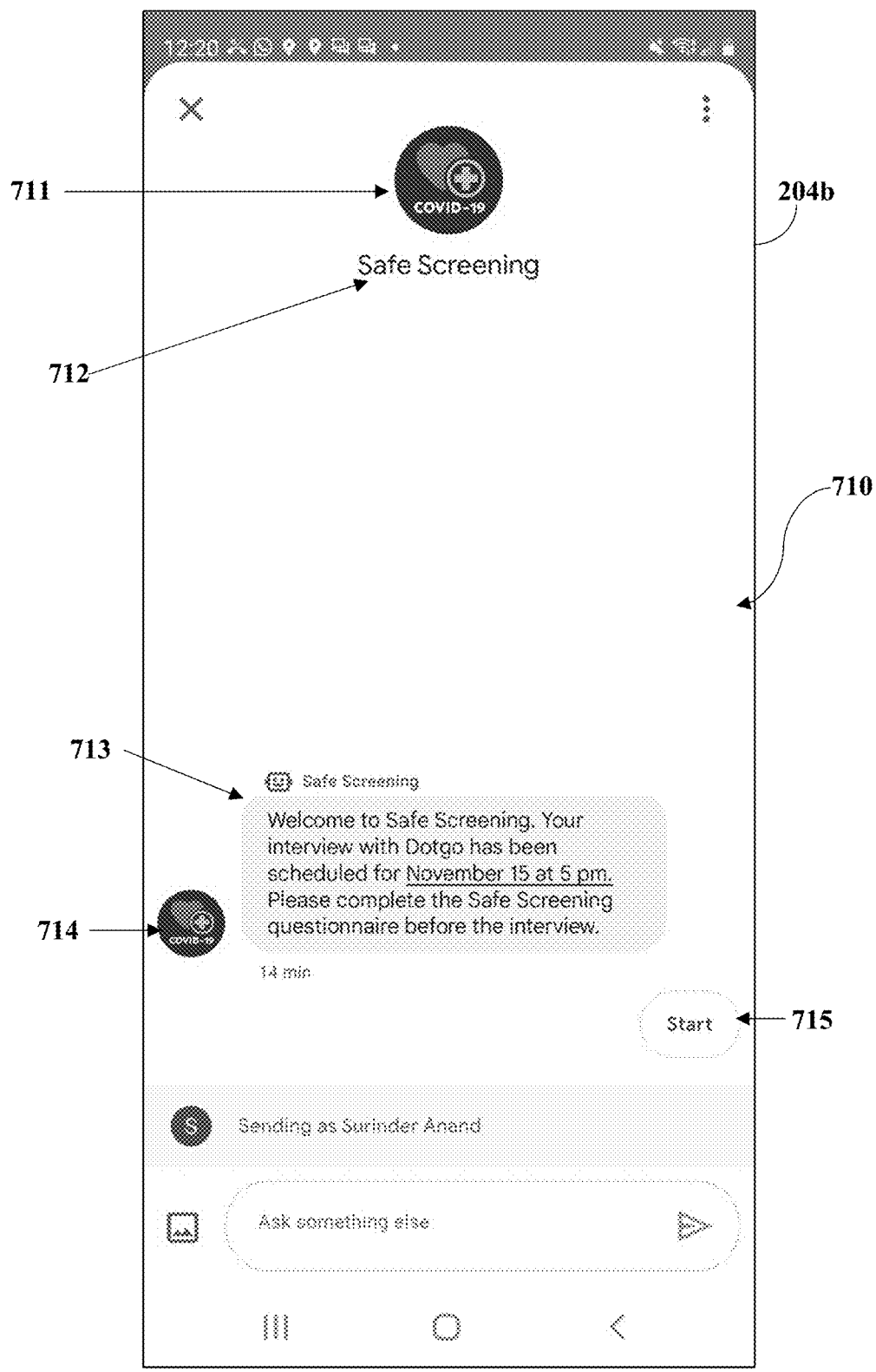
FIG. 7C exemplarily illustrates a screenshot of a graphical user interface rendered by the messaging client on the user device, displaying a rich message received over a Google Business Messages channel.

In an embodiment, if the user's mobile number is not enabled for the rich communication services (RCS) channel, the expanded reach rich messaging application (ERRMA) 202 creates and transmits an equivalent short message service (SMS) message 709 comprising a text message 707 with a uniform resource locator (URL) 707*a* to exchange RCS messages on an alternative rich messaging channel, for example, the Google Business Messages (GBM) channel, to the user's mobile number. FIG. 7B exemplarily illustrates a screenshot of a graphical user interface (GUI) 204*b* rendered by the messaging client on the user device 204, displaying an equivalent SMS message 709 received by a user at the user's mobile number from the verified sender ID of the entity, for example, the sender ID "SafeScr" 706. The equivalent SMS message 709, shown in FIG. 7B, is an initial SMS message to a user without an RCS-enabled user device. The user receives the equivalent SMS message 709 from the verified sender ID of the brand, for example, the sender ID "SafeScr" 706, along with a brand icon 708 and a text message 707. The GUI 204*b* rendered by the messaging client on the user device 204 displays the equivalent SMS message 709 to the user as exemplarily illustrated in FIG. 7B. Upon receiving the equivalent SMS message 709, the user clicks on the URL link 707*a* in the text message 707 received on the user's mobile number to start interacting with the Google Business Messages (GBM) agent of the entity and view the rich message 700 sent by the entity. FIG. 7C exemplarily illustrates a screenshot of a GUI 204*b* rendered by the messaging client on the user device 204, displaying a rich message 710 received over the GBM channel. The user receives the rich message 710 from a verified sender ID of the entity, for example, the sender ID "Safe Screening" 712, along with a brand logo 711, a brand icon 714, a text message 713, and a suggested reply button 715, over the GBM channel. The user interacts with the GBM agent on the GBM channel after clicking on the embedded URL link 707*a* in the equivalent SMS message 709 illustrated in FIG. 7B, received by the user to further engage with the entity.

Figure 8A:
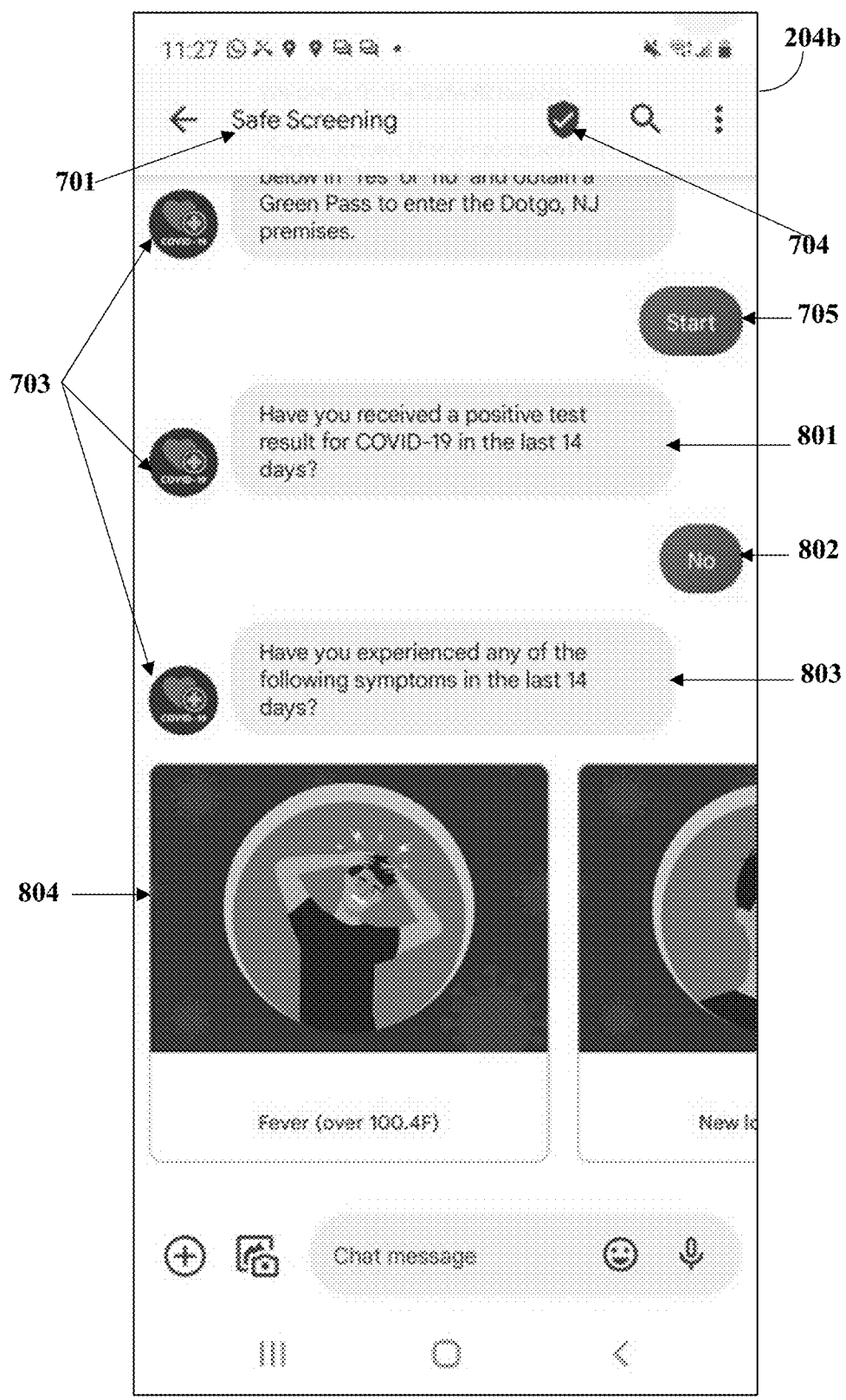
FIGS. 8A-8C exemplarily illustrate screenshots of a graphical user interface (GUI) rendered by a messaging client on a user device, displaying a user's interaction with a chatbot on the user device via a rich communication services channel.
Figure 8B:
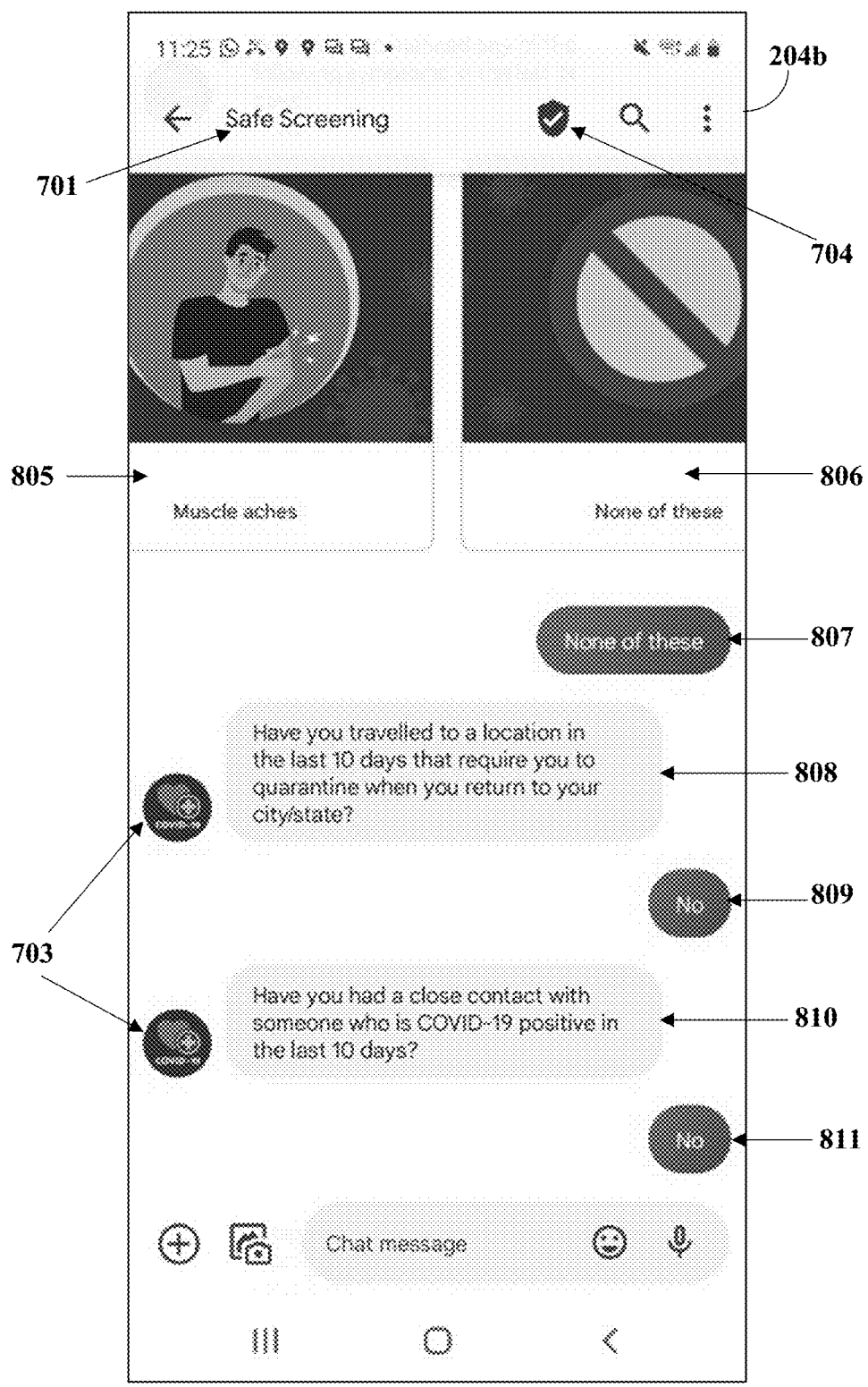
Figure 8C:
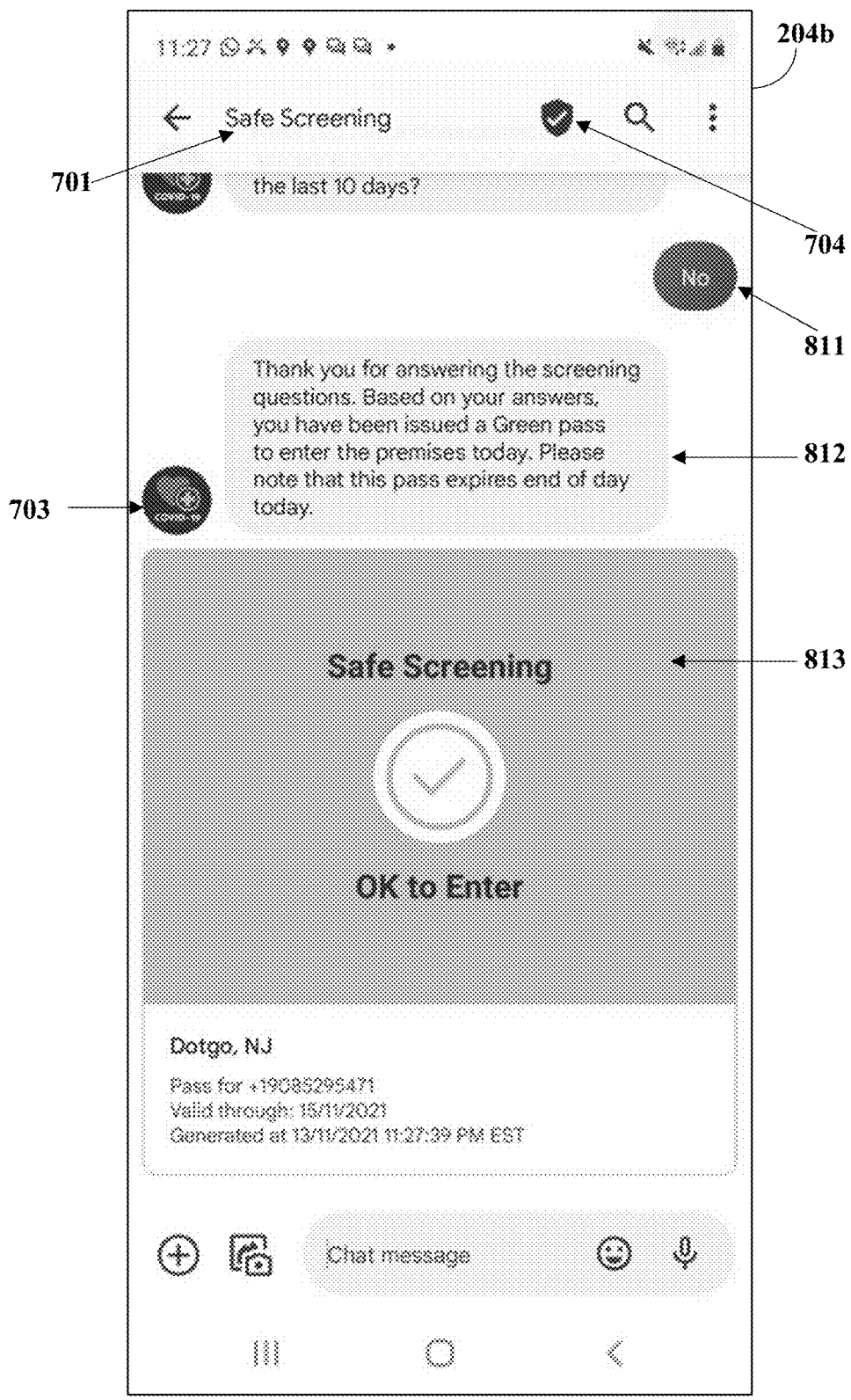

FIGS. 8A-8C exemplarily illustrates screenshots of a graphical user interface (GUI) 204*b* rendered by a messaging client on a user device 204 shown in FIGS. 2-3 and FIG. 6, displaying a user's interaction with a chatbot on the user device 204 via a rich communication services (RCS) channel. As disclosed in the description of FIG. 7A, the user starts an interaction with the chatbot by selecting/clicking the suggested reply button "Start" 705 shown in FIG. 7A, on the user device 204. In response, the chatbot displays a questionnaire corresponding, for example, to safe screening, on the user device 204. The chatbot implements a questionnaire for safe screening of the user before allowing or denying permission, for example, to a school, an office, or some other workspace that the user needs to enter. After receiving a selection from the user device 204, the chatbot displays a subsequent question based on the user's response. This process continues till the user answers the necessary questions needed to assess whether the user can be safely allowed to enter the workplace. After the completion of the questionnaire, the chatbot displays a green pass or a red pass with the user's identity and validity period on the GUI 204*b*. In this example, the Safe Screening questionnaire is implemented using RCS rich message elements comprising, for example, a rich card carousel, suggested replies, and a suggested chip list.

Consider an example where the user receives a rich message 700 from a verified sender ID of an entity, for example, the sender ID "Safe Screening" 701 displayed along with a verification mark 704 on the GUI 204*b*. The rich message 700 comprises a text message 702, for example, "Welcome to Safe Screening. Your interview with Dotgo has been scheduled for November 15 at 5 pm. Please complete the Safe Screening questionnaire before the interview", along with a suggested reply button "Start" 705 as illustrated in FIG. 7A. The user initiates communication with the Safe Screening chatbot by selecting/clicking the suggested reply button "Start" 705 on the user device 204. The GUI 204*b* displays the brand icon 703 of the entity adjacent to each of the chatbot's questions. As illustrated in FIG. 8A, the chatbot responds to the user by displaying a question 801, for example, "Have you received a positive test result for COVID-19 in the last 14 days?", along with two or more suggested reply buttons "Yes", "No", etc., (not shown) on the GUI 204*b*. If the user selects/clicks the suggested reply button "Yes", the chatbot issues a red pass (not shown) prohibiting entry to the workplace.

If the user selects/clicks the suggested reply button "No" 802, the chatbot displays the next question 803, for example, "Have you experienced any of the following symptoms in the last 14 days?" along with one or more rich cards comprising, for example, "Fever (over 100.4 F)" 804, "Muscle aches" 805, "None of these" 806, etc., on the GUI 204*b* as illustrated in FIGS. 8A-8B. If the user selects/clicks the rich card "None of these" 806, a reply "None of these" 807 is sent to the chatbot. In response, the chatbot displays the next question 808, for example, "Have you travelled to a location in the last 10 days that requires you to quarantine when you return to your city/state?", along with two or more suggested reply buttons "Yes", "No", etc., (not shown) on the GUI 204*b*. If the user selects/clicks the suggest reply button "No" 809, the chatbot displays the next question 810, for example, "Have you had a close contact with someone who is COVID-19 positive in the last 10 days?" along with two or more suggested reply buttons "Yes", "No", etc., (not shown) on the GUI 204*b*. If the user selects/clicks the suggested reply button "No" 811 as illustrated in FIG. 8B, the chatbot displays a message 812, for example, "Thank you for answering the screening questions. Based on your answers, you have been issued a green pass to enter the premises today. Please note that this pass expires end of day today." on the GUI 204*b*, and issues a "Green Pass" 813 on the GUI 204*b* as illustrated n FIG. 8C. The "Green Pass" 813 is a rich card comprising an image "Safe Screening OK to Enter" along with a tick mark, the entity's name "Dotgo, NJ", a user identity "Pass for+19085295471", a validity period "Valid through: Nov. 11, 2021", and "Green Pass" generation details "Generated at Nov. 11, 2021 11:27:39 PM EST", etc.

Figure 9A:
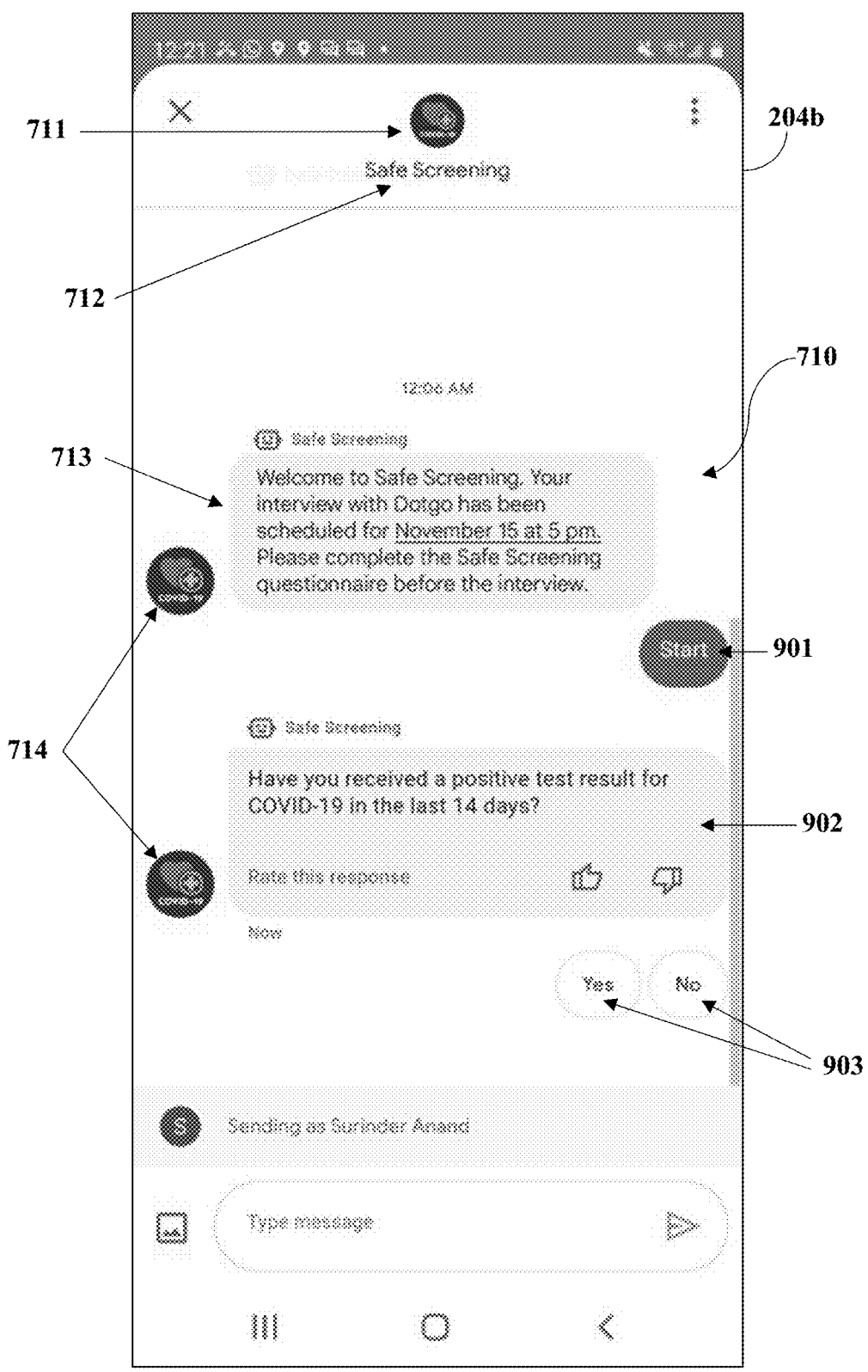
FIGS. 9A-9C exemplarily illustrate screenshots of a graphical user interface (GUI) rendered by a messaging client on a user device, displaying a user's interaction with a chatbot on the user device via a Google Business Messages channel.
Figure 9B:
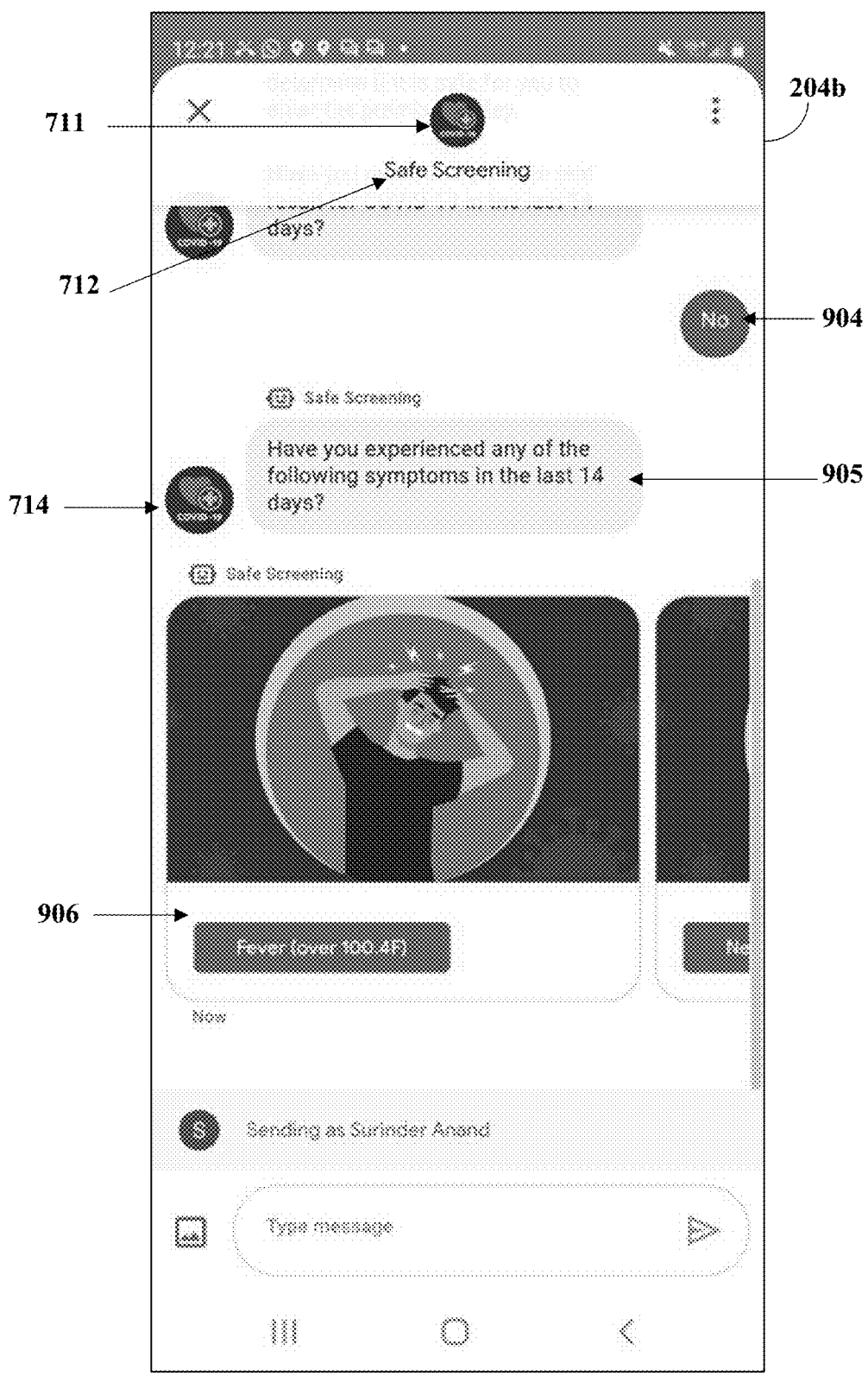
Figure 9C:
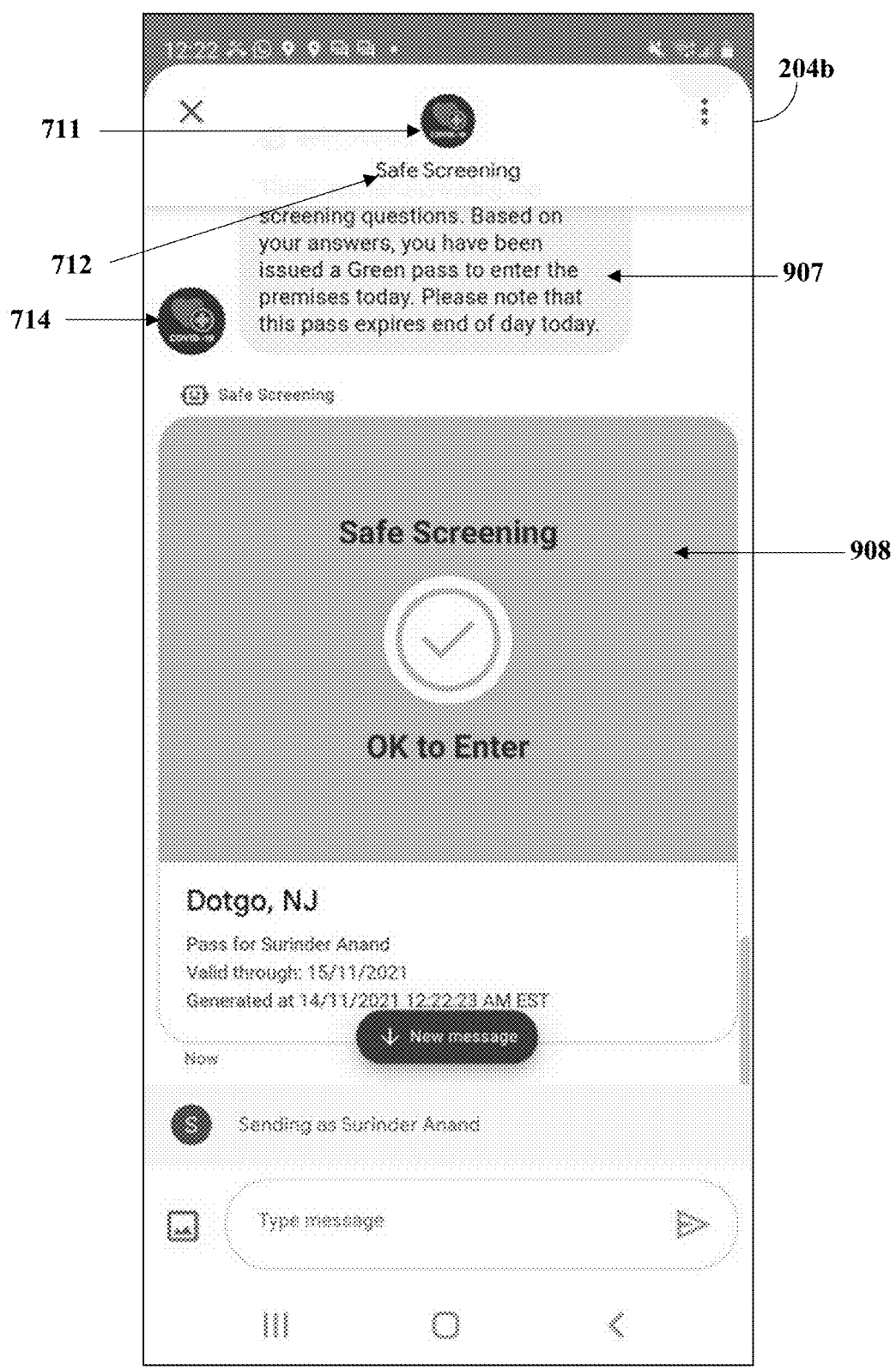

FIGS. 9A-9C exemplarily illustrate screenshots of a graphical user interface (GUI) 204*b* rendered by a messaging client on a user device 204 shown in FIGS. 2-3 and FIG. 6, displaying a user's interaction with a chatbot on the user device 204 via a Google Business Messages (GBM) channel. The user starts an interaction with the chatbot, for example, a GBM Agent "Safe Screening", by selecting/clicking the suggested reply button "Start" 901 on the GUI 204*b*. The chatbot implements a questionnaire for safe screening of the user before allowing or denying permission, for example, to a school, an office, or some other workspace that the user needs to enter. After receiving a selection from the user device 204, the chatbot displays the next question based on the user's response as illustrated in FIGS. 9A-9C. This process continues till the user answers the necessary questions needed to assess whether the user can be safely allowed to enter the workspace. After the completion of the questionnaire, the chatbot displays one of a green pass or a red pass with the user's identity and validity period. In this example, the "Safe Screening" questionnaire is implemented using GBM rich message elements. The "Safe Screening" interaction experience disclosed herein is an example of a rich conversational experience implemented using the GBM rich messaging capability. In another embodiment, another entity, for example, United Airlines, can implement a rich messaging journey for a user to check-in for a flight and obtain a boarding pass using GBM messaging as illustrated in FIG. 7C.

As illustrated in 9A, the user receives a rich message 710 comprising a text message 713, for example, "Welcome to Safe Screening. Your interview with Dotgo has been scheduled for November 15 at 5 pm. Please complete the Safe Screening questionnaire before the interview", along with a suggested reply button "Start" 901. The GUI 204*b* displays the brand icon 714 of the entity adjacent to each of the chatbot's questions. The user initiates communication with the Safe Screening chatbot by selecting/clicking the suggested reply button "Start" 901 on the GUI 204*b*. The chatbot responds by displaying a question 902, for example, "Have you received a positive test result for COVID-19 in the last 14 days?", along with two or more suggested reply buttons "Yes" and "No" 903 on the GUI 204*b*. If the user selects/clicks the suggested reply button "Yes", the chatbot issues a red pass (not shown) prohibiting entry to the workplace. If the user selects/clicks the suggested reply button "No" 904, the chatbot displays the next question 905, for example, "Have you experienced any of the following symptoms in the last 14 days?", along with one or more rich cards, for example, "Fever (over 100.4 F)" 906, "Muscle aches", "None of these", etc., on the GUI 204*b* as illustrated in FIG. 9B. After the user selects/clicks the rich card "None of these" (not shown), a reply "None of these" (not shown) is sent to the chatbot. In response, the chatbot displays the next question, for example, "Have you travelled to a location in the last 10 days that requires you to quarantine when you return to your city/state?" (not shown), along with two or more suggested reply buttons "Yes", "No", etc., (not shown). If the user selects/clicks the suggested reply button "No" (not shown), the chatbot displays the next question (not shown), for example, "Have you had a close contact with someone who is COVID-19 positive in the last 10 days?", along with two or more suggested reply buttons "Yes", "No", etc., (not shown). If the user selects/clicks the suggested reply button "No", the chatbot displays a message 907, for example, "Thank you for answering the screening questions. Based on your answers, you have been issued a Green pass to enter the premises today. Please note that this pass expires end of day today.", and issues a "Green Pass" 908 on the GUI 204*b* as illustrated in FIG. 9C. The "Green Pass" 908 is a rich card comprising, for example, an image "Safe Screening OK to Enter" along with a tick mark, the entity's name "Dotgo, NJ", a user identity "Pass for Surinder Anand", a validity period "Valid through: Nov. 11, 2021", "Green Pass" generation details "Generated at Nov. 11, 2021 12:22:23 AM EST", etc.

FIG. 10 exemplarily illustrates a flowchart of an embodiment of a method for generating a uniform resource locator (URL) for allowing an exchange of equivalent rich communication services (RCS) messages on a rich business messaging channel, for example, a Google Business Messages (GBM) channel. In this embodiment, the expanded reach rich messaging application (ERRMA) 202 shown in FIGS. 2-3 and FIG. 6, further comprises a URL link generator configured to generate a URL link for inclusion in an equivalent short message service (SMS) message for facilitating viewing of an RCS message. The URL link generator generates or creates a URL link as follows: In Step 1 1001, the URL link generator maps the user's mobile number, for example, "19085295471", to an internal identifier, for example, "a28dPw17bG43q". In Step 2 1002, the URL link generator uses an Agent ID, for example, "35e5ec04-3d3e-431a-b17a-372e4f809c21", and the value of the mapped internal identifier as the context to generate the URL link, for example, "https://businessmessages.google.com/widget/agent/35e5ec04-3d3e-431a-b17a-372e4f809c21?i=null&ctx=a28dPw17bG43q". In Step 3 1003, the URL link generator optionally shortens the URL link, for example, to https://safe.scr/yc5e5wh6, using a shortener service.

FIGS. 11A-11D exemplarily illustrate a mapping of features of rich messages sent over a rich communication service (RCS) channel and a Google Business Messages (GBM) channel. A text message sent over the RCS channel and an equivalent text message sent over the GBM channel are exemplarily illustrated in FIG. 11A. A rich card with a suggested action, for example, data usage of a user, sent over the RCS channel, and an equivalent rich card with a suggested action sent over the GBM channel, are also exemplarily illustrated in FIG. 11A. A rich card with a text message sent over the RCS channel and an equivalent rich card with a text message sent over the GBM channel are exemplarily illustrated in FIG. 11B. A rich card carousel with a suggested reply sent over the RCS channel and an equivalent rich card carousel with a suggested reply sent over the GBM channel are exemplarily illustrated in FIG. 11C. FIG. 11C also illustrates a suggested chip list sent over the RCS channel and an equivalent suggested chip list sent over the GBM channel. All forms of custom replies sent over the RCS channel are supported in the GBM channel as indicated in FIG. 11D. FIG. 11D also illustrates the mapping between suggested actions in the RCS and the GBM. For example, "Dial a number" in the RCS is mapped to "Dial action" in the GBM; "Open a uniform resource locator (URL)" in the RCS is mapped to "Open URL action" in the GBM. Furthermore, a suggested action, for example, "View a location" in the RCS is not currently supported in the GBM, and is mapped to an Open URL action to an equivalent location on Google Maps or another map website. Furthermore, a suggested action, for example, "Share a location", in the RCS is not currently supported in the GBM, and is mapped to an Open URL action seeking permission from the user to share their location. Furthermore, a suggested action, for example, "Create a calendar event", in the RCS is not currently supported in the GBM, and is mapped to an Open URL action to Google Calendar or another calendar application. Therefore, the RCS features that are not supported are mapped to an open URL action. The unsupported suggested actions of the RCS may be supported in a future release of the GBM.

In an embodiment, an entity or a developer on behalf of the entity, can optionally register for the expanded reach, rich messaging service. The expanded reach rich messaging (ERRM) provider is a service provider that manages an instance of the expanded reach rich messaging application (ERRMA) 202 shown in FIGS. 2-3 and FIG. 6, and offers the ERRMA 202 as a service to entities, for example, brand entities, developers, etc. The ERRM provider receives information about the brand identity of the entity, submitted by the entity or the developer. The brand identity comprises, for example, one or more of a brand name, a brand icon, and a brand logo. The ERRMA 202 receives an expanded reach mapping configuration submitted by the entity or the developer. The expanded reach mapping configuration captures the specified rich message channel, the list of alternative rich messaging channels to consider to send rich messages, the sender ID for each of the alternative rich messaging channels, etc. In an embodiment, the sender ID to be used for sending a short message service (SMS) message is also provided in the expanded reach mapping configuration.

Figure 12A:

FIGS. 12A-12B exemplarily illustrate screenshots of user interfaces 1201 and 1202 provided by the expanded reach rich messaging (ERRM) provider for an ERRM service registration. An entity or a developer on behalf of the entity, that is identified by or associated with a brand, registers for the ERRM service by submitting entity details comprising, for example, a company name, a last name and a first name of a contact person, an electronic mail (email) address, a mobile number, an industry type, a website uniform resource locator (URL), a privacy policy URL, a callback URL, etc., on the user interface 1201 as exemplarily illustrated in FIG. 12A. After registration, the entity or the developer submits an expanded reach mapping configuration template 1202 as exemplarily illustrated in FIG. 12B, to be used for sending rich messages and equivalent rich messages by the expanded reach rich messaging application (ERRMA) 202 shown in FIGS. 2-3 and FIG. 6, to a user. A rich card image tab and a display name tab (not shown) enable the entity or the developer to edit and save an image, for example, a brand logo, a brand icon, etc. In an embodiment, the entity or the developer registers for the ERRM services by submitting information about the brand identity of the entity. The entity or the developer submits the details of a specified channel, that is, a specified rich messaging channel, and one or more alternative channels, that is, the alternative rich messaging channels, to transmit rich messages or equivalent rich messages to users.

Each expanded reach mapping configuration template 1202 comprises multiple elements. For example, the expanded reach mapping configuration template 1202 comprises: specified channel, alternative channel 1, alternative channel 2, alternative channel 3, etc., as exemplarily illustrated in FIG. 12B. The specified channel details section of the expanded reach mapping configuration template 1202 allows the entity, for example, Dotgo or the developer, to submit specified channel details comprising, for example, the type/name of the specified rich messaging channel such as rich communication services (RCS), an entity name such as Dotgo, an agent name such as "Safe Screening", and an agent identifier (ID) such as safe-screening@rbm.goog, as exemplarily illustrated in FIG. 12B. The first alternative channel details section of the expanded reach mapping configuration template 1202 allows the entity/developer to submit the details of the first alternative channel to transmit an equivalent rich message to the user. The first alternative channel details comprise the type/name of the first alternative rich messaging channel such as Google Business Messages, an entity name such as Dotgo, an agent name such as "Safe Screening", an agent ID such as "35e5ec04-3d3e-431a-b17a-372e4f809c21", and a Sender ID for SMS such as "Mask: Safe Screening" and "Code: 783212", as exemplarily illustrated in FIG. 12B. The second alternative channel details section of the expanded reach mapping configuration template 1202 allows the entity/developer to submit the details of the second alternative channel to transmit an equivalent rich message to the user. The second alternative channel details comprise the type/name of the second alternative rich messaging channel such as "WhatsApp", an entity name such as Dotgo, a sender name such as "Safe Screening", and a sender ID such as "1-912-321-6239", as exemplarily illustrated in FIG. 12B. The third alternative channel details section of the expanded reach mapping configuration template 1202 allows the entity/developer to submit the details of the third alternative channel to transmit an equivalent rich message to the user. The third alternative channel details comprise the type/name of the third alternative rich messaging channel such as "Progressive Web Application (PWA)", an entity name such as Dotgo, a sender name such as "Safe Screening", and a sender ID for SMS such as "Mask: Safe Screening and Code: 78212", as exemplarily illustrated in FIG. 12B.

Furthermore, in an embodiment, the elements in the expanded reach mapping configuration template are configured to be modified based on the rich messaging channel, for example, RCS, iMessage®, WhatsApp®, Viber®, Telegram®, Facebook® Messenger, Google Business Messages, Signal®, etc., used to send the rich message. For example, some of the elements of the expanded reach mapping configuration template may be common to all rich messaging channels, for example, RCS, iMessage®, WhatsApp®, Viber®, Telegram®, Facebook® Messenger, Google Business Messages, Signal®, etc., whereas other elements may have values that are different and specific to a particular rich messaging channel depending on the type of the rich messaging channel used to send the rich message. The expanded reach rich messaging (ERRM) provider performs a verification of the entity and the identity of the entity, for example, the brand identity. The ERRM provider also reviews and approves the submitted expanded reach mapping configuration templates. The entity or the developer specifies the approved expanded reach mapping configuration templates to be used by the expanded reach rich messaging application (ERRMA) 202 shown in FIGS. 2-3 and FIG. 6, for sending rich messages or equivalent rich messages. The ERRMA 202 sends the rich messages or the equivalent rich messages using the approved expanded reach mapping configuration templates to the user device 204 shown in FIGS. 2-3 and FIG. 6. Furthermore, the entity or the developer can add multiple expanded reach mapping configuration templates to the ERRMA 202, for use by the ERRMA 202 in sending the rich messages or the equivalent rich messages to the user's mobile number or the user device 204.

The expanded reach rich messaging application (ERRMA) 202 expands the reach of rich messaging channels to a large target audience of users that the entity wants to target, similar to the widespread reach of a short message service (SMS). By expanding the reach of the rich messaging channels, the entity is able to send the rich messages to its entire target audience of users. The ERRMA 202 allows existing applications that support sending of rich messages to one specified rich messaging channel to benefit from its rich messaging service that expands the reach of rich messaging channels by allowing the rich messages to be delivered over other rich messaging channels. For example, the ERRMA 202 allows RCS applications that support sending and receiving of RCS messages to benefit from its rich messaging service that expands the reach of RCS by allowing RCS applications to send and receive RCS messages over the Google Business Messages channel.

It is apparent in different embodiments that the various methods, algorithms, and computer-readable programs disclosed herein are implemented on non-transitory, computer-readable storage media appropriately programmed for computing devices. The non-transitory, computer-readable storage media participate in providing data, for example, instructions that are read by a computer, a processor, or a similar device. In different embodiments, the "non-transitory, computer-readable storage media" also refer to a single medium or multiple media, for example, a centralized database, a distributed database, and/or associated caches and servers that store one or more sets of instructions that are read by a computer, a processor, or a similar device. The "non-transitory, computer-readable storage media" also refer to any medium capable of storing or encoding a set of instructions for execution by a computer, a processor, or a similar device and that causes a computer, a processor, or a similar device to perform any one or more of the steps of the method disclosed herein. In an embodiment, the computer programs that implement the method and algorithms disclosed herein are stored and transmitted using a variety of media, for example, the computer-readable media in various manners. In an embodiment, hard-wired circuitry or custom hardware is used in place of, or in combination with, software instructions for implementing the processes of various embodiments. Therefore, the embodiments are not limited to any specific combination of hardware and software. Various aspects of the embodiments disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. Various aspects of the embodiments disclosed herein are implemented as programmed elements, or non-programmed elements, or any suitable combination thereof.

Where databases are described such as the database 202j exemplarily illustrated in FIG. 6, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. In another embodiment, despite any depiction of the databases as tables, other formats including relational databases, object-based models, and/or distributed databases are used to store and manipulate the data types disclosed herein. In an embodiment, object methods or behaviors of a database are used to implement various processes such as those disclosed herein. In another embodiment, the databases are, in a known manner, stored locally or remotely from a device that accesses data in such a database. In embodiments where there are multiple databases, the databases are integrated to communicate with each other for enabling simultaneous updates of data linked across the databases, when there are any updates to the data in one of the databases.

The embodiments disclosed herein are configured to operate in a network environment comprising one or more computers that are in communication with one or more devices via one or more networks. In an embodiment, the computers communicate with the devices directly or indirectly, via a wired medium or a wireless medium such as the Internet, satellite internet, a local area network (LAN), a wide area network (WAN) or the Ethernet, or via any appropriate communications mediums or combination of communications mediums. Each of the devices comprises processors that are adapted to communicate with the computers. In an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers.

The embodiments disclosed herein are not limited to a particular computer system platform, processor, operating system, or network. One or more of the embodiments disclosed herein are distributed among one or more computer systems, for example, servers configured to provide one or more services to one or more client computers, or to perform a complete task in a distributed system. For example, one or more of embodiments disclosed herein are performed on a client-server system that comprises components distributed among one or more server systems that perform multiple functions according to various embodiments. These components comprise, for example, executable, intermediate, or interpreted code, which communicate over a network using a communication protocol. The embodiments disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting of the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments herein extend to all functionally equivalent structures, methods, systems, and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

We claim:

1. A method employing an expanded reach rich messaging application defining computer program instructions executable by at least one processor for transmitting a rich message, said method comprising:
    receiving said rich message from a rich message application programming interface for a specified rich messaging channel;
    identifying whether a recipient of said rich message is active on said specified rich messaging channel;
    upon identifying that said recipient of said rich message is active on said specified rich messaging channel, transmitting said rich message on said specified rich messaging channel to said recipient;
    upon identifying that said recipient of said rich message is inactive on said specified rich messaging channel, identifying whether said recipient of said rich message is active on one or more of a plurality of alternative rich messaging channels;
    upon identifying that said recipient of said rich message is active on one or more of a plurality of alternative rich messaging channels, creating an equivalent rich message for transmitting on said identified one or more plurality of alternative rich messaging channels; and
    transmitting said created equivalent rich message to said recipient on said identified one or more plurality of alternative rich messaging channels.

2. The method of claim 1, further comprising:
    transmitting said rich message to said recipient as a standard short message service message if said recipient of said rich message is identified as inactive on said specified rich messaging channel and said one or more of said alternative rich messaging channels.

3. The method of claim 1, further comprising:
    concurrently (a) sending said rich message over said specified rich messaging channel and (b) sending said created equivalent rich message over at least one of said plurality of alternative rich messaging channels, to increase chances of delivery of said rich message or said created equivalent rich message; and
    revoking said created equivalent rich message as soon as said rich message is delivered or revoking said rich message as soon as said created equivalent rich message is delivered.

4. The method of claim 1, wherein said one or more of said alternative rich messaging
    channels are selected based on one or more factors comprising:
    size of said rich message;
    cost of sending said rich message via said specified rich messaging channel and
    said one or more of said alternative rich messaging channels in terms of standard
    pricing and dynamic pricing based on traffic patterns;
    history of said recipient in terms of message delivery status, message delivery time, message read status, message read time, and user response; and
    maintaining consistency by sending said rich message on a single rich messaging channel instead of switching between a plurality of rich messaging channels.

5. A method employing an expanded reach rich messaging application defining computer program instructions executable by at least one processor for exchanging rich communication services messages via a rich business messaging channel, said method comprising:
    receiving a request to send said rich communication services message on a rich communication services channel from an entity to a mobile number of a user, wherein said rich communication services message is created using an application programming interface;
    determining whether said mobile number of said user is enabled for receiving said rich communication services message on said rich communication services channel;
    upon determination that said mobile number of said user is not enabled for receiving said rich communication services message on said rich communication services channel, determining whether said mobile number of said user has exchanged equivalent rich communication services messages on said rich business messaging channel;
    upon successful determination that said mobile number of said user has exchanged said equivalent rich communication services messages on said rich business messaging channel, performing steps comprising:
        determining a rich business messaging identifier mapped to said mobile number of said user;
        creating an equivalent rich communication services message on said rich business messaging channel for said mobile number of said user by translating said rich communication services message into a rich business message; and
        transmitting said created equivalent rich communication services message on said rich business messaging channel to said rich business messaging identifier mapped to said mobile number of said user; and
    upon determination that said mobile number of said user has not exchanged said equivalent rich communication services messages on said rich business messaging channel, performing steps comprising:
        creating an internal identifier configured to securely map to said mobile number of said user;
        creating an equivalent short message service message comprising a uniform resource locator encoded with said internal identifier;
        transmitting said created equivalent short message service message with said uniform resource locator to said mobile number of said user; and exchanging said equivalent rich communication services messages on said rich business messaging channel upon clicking said uniform resource locator by said user.

6. The method of claim 5, further comprising transmitting subsequent equivalent rich communication services messages to said mapped rich business messaging identifier on said rich business messaging channel once said uniform resource locator has been clicked.

7. The method of claim 5, wherein a username of said user, a universally unique identifier, and a globally unique identifier are excluded in said uniform resource locator transmitted to said mobile number of said user.

8. The method of claim 5, further comprising:
   receiving a mapping between said mobile number of said user and a business messaging channel-specific identifier and storing said mapping for future use; and
   maintaining a mapping of said mobile number of said user and said internal identifier used to construct said uniform resource locator instead of including said mobile number of said user in said uniform resource locator transmitted to said mobile number of said user.

9. A method employing an expanded reach rich messaging application defining computer program instructions executable by at least one processor for creating and transmitting a rich message, said method comprising:
   receiving a request to send a rich message on a specified rich messaging channel from an entity to a mobile number of a user;
   determining whether said mobile number of said user is enabled for receiving said rich message on said specified rich messaging channel;
   upon successful determination that said mobile number of said user is enabled for receiving said rich message on said specified rich messaging channel, creating and transmitting said rich message on said specified rich messaging channel to said mobile number of said user;
   upon determination that said mobile number of said user is not enabled for receiving said rich message on said specified rich messaging channel, determining whether said mobile number of said user has exchanged a rich communication services message with said entity on an alternative rich business messaging channel;
   upon successful determination that said mobile number of said user has exchanged said rich communication services message with said entity on said alternative rich business messaging channel, determining a rich business messaging channel-specific identifier of said user mapped to said mobile number of said user;
   creating an equivalent rich message on said alternative rich business messaging channel; and
   transmitting said created equivalent rich message to said mobile number of said user using said rich business messaging channel-specific identifier of said user.

\* \* \* \* \*